(12) United States Patent
Ohshima

(10) Patent No.: US 6,867,563 B2
(45) Date of Patent: Mar. 15, 2005

(54) JAMMING PROTECTION DEVICE FOR MOVING MEMBER

(75) Inventor: Shunzou Ohshima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/473,579

(22) PCT Filed: Apr. 2, 2002

(86) PCT No.: PCT/JP02/03306

§ 371 (c)(1),
(2), (4) Date: Oct. 1, 2003

(87) PCT Pub. No.: WO02/082613

PCT Pub. Date: Oct. 17, 2002

(65) Prior Publication Data

US 2004/0104701 A1 Jun. 3, 2004

(30) Foreign Application Priority Data

Apr. 2, 2001 (JP) .......................... 2001-103860

(51) Int. Cl.[7] ................................. H02P 1/00
(52) U.S. Cl. .................. 318/434; 318/280; 318/283; 318/469
(58) Field of Search ............... 318/245–293, 318/430–466; 388/800, 806

(56) References Cited

U.S. PATENT DOCUMENTS

| | | | | |
|---|---|---|---|---|
| 4,246,526 A | * | 1/1981 | Phillips | 318/626 |
| 4,562,387 A | * | 12/1985 | Lehnhoff | 318/285 |
| 4,875,000 A | | 10/1989 | Fry et al. | 318/798 |
| 5,220,634 A | * | 6/1993 | Yaguchi et al. | 388/819 |
| 5,341,077 A | | 8/1994 | Chen et al. | 318/434 |
| 5,525,876 A | * | 6/1996 | Filippi | 318/282 |
| 5,559,375 A | * | 9/1996 | Jo et al. | 307/10.1 |
| 5,734,245 A | * | 3/1998 | Terashima et al. | 318/453 |
| 5,963,001 A | * | 10/1999 | Peter et al. | 318/563 |
| 5,977,732 A | * | 11/1999 | Matsumoto | 318/283 |
| 6,051,945 A | * | 4/2000 | Furukawa | 318/280 |
| 6,081,085 A | * | 6/2000 | Ohashi et al. | 318/283 |
| 6,359,408 B1 | * | 3/2002 | Tyckowski | 318/469 |
| 6,509,705 B2 | * | 1/2003 | Bastholm et al. | 318/434 |
| 2002/0117982 A1 | * | 8/2002 | Jehn | 318/280 |

* cited by examiner

*Primary Examiner*—Paul Ip
(74) *Attorney, Agent, or Firm*—Finnegan, Henderson, Farabow, Garrett & Dunner, L.L.P.

(57) ABSTRACT

When abnormal current due to jamming is detected through motor current (ID), the motor current (ID) performs an operation in which an ON/OFF operation and a continuous ON operation are repeated, so that increment of the motor current (ID) is restrained. At this time, determination of jamming is performed based on the ON/OFF operation and the continuous ON operation. When the jamming is determined, the motor current (ID) is stopped, and the motor is reversed.

27 Claims, 33 Drawing Sheets

FIG.14
(a)
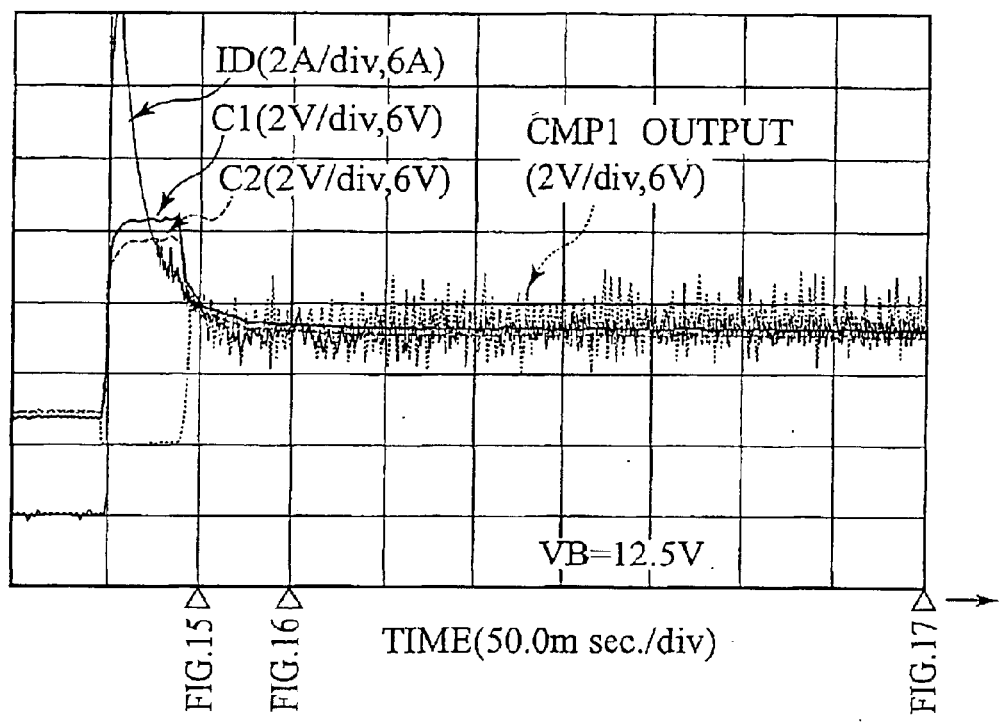
(b)
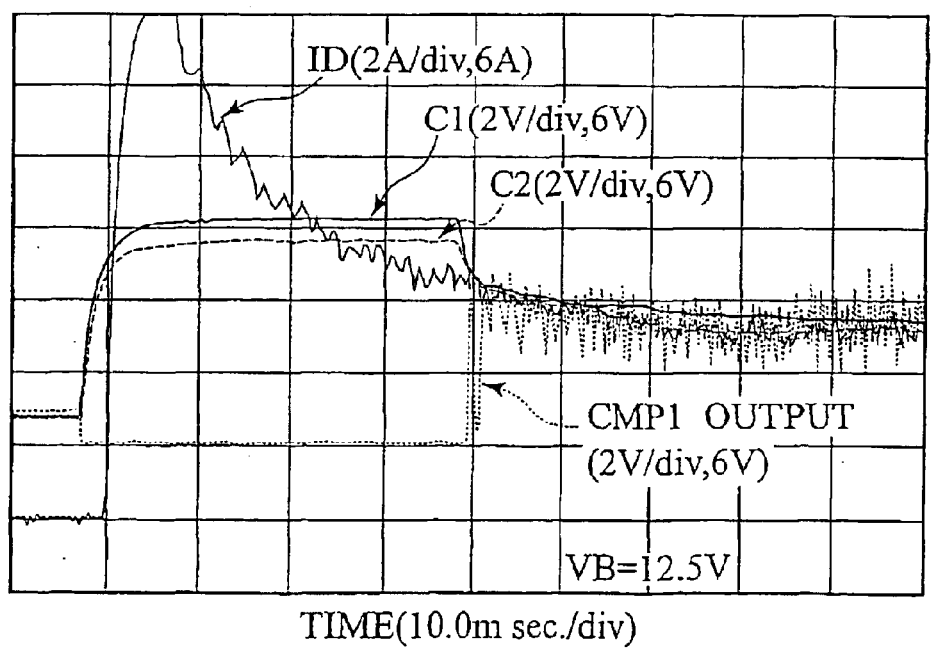

FIG.15
(a)
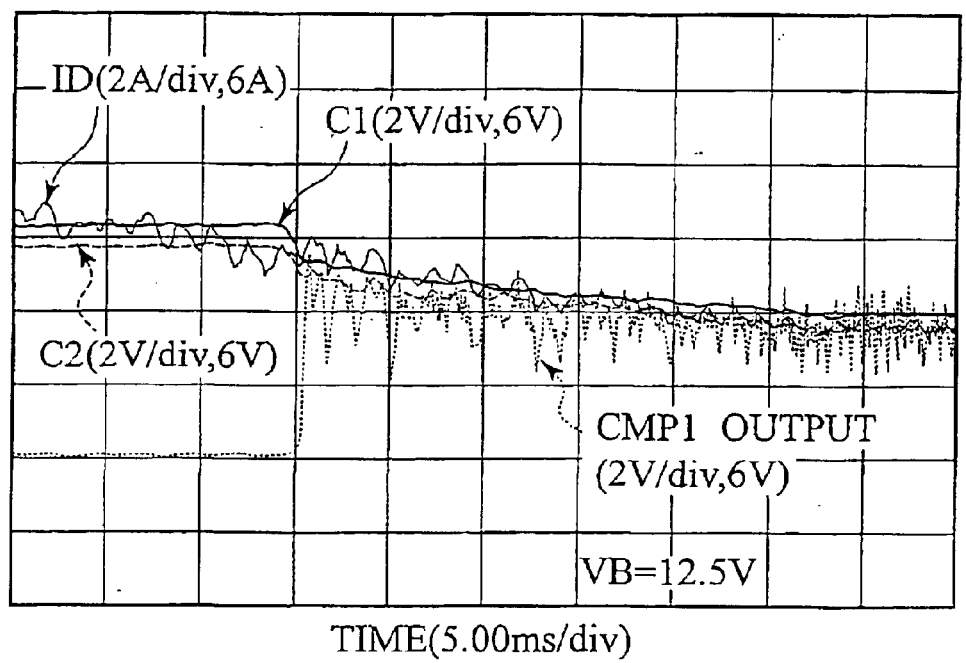
(b)
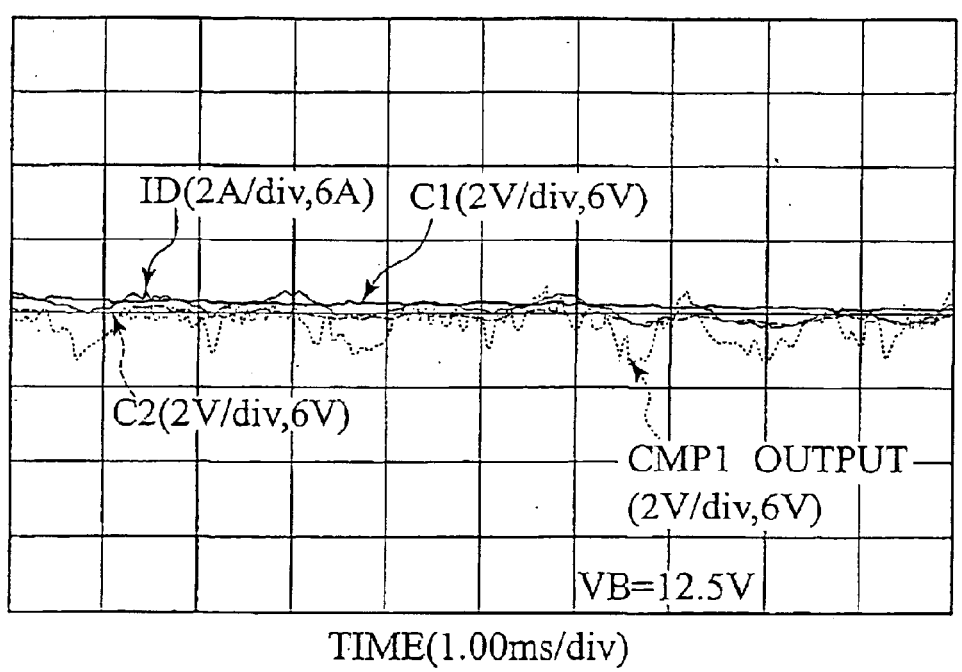

FIG. 16
(a)
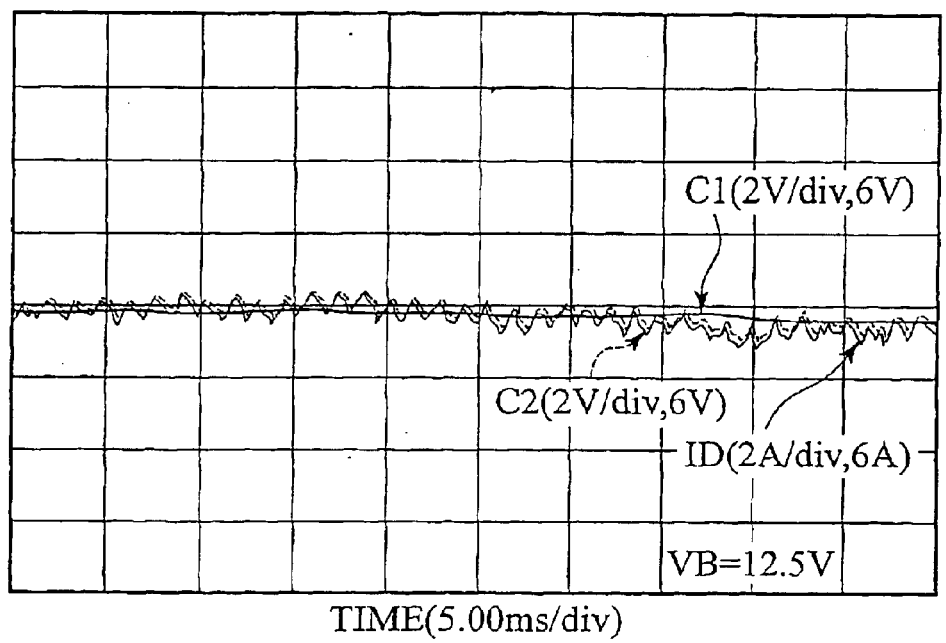
(b)
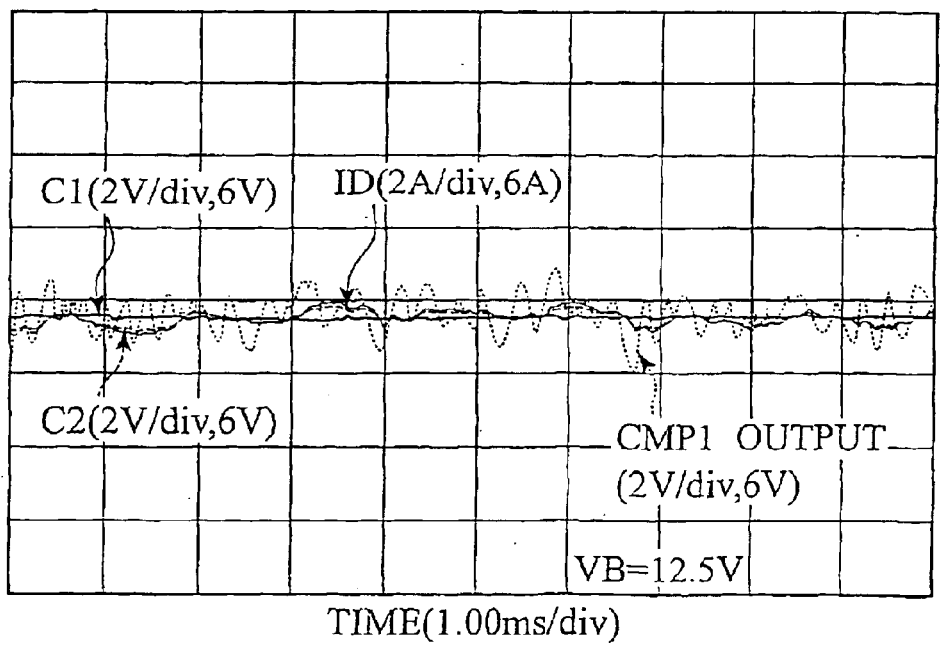

FIG.17
(a)
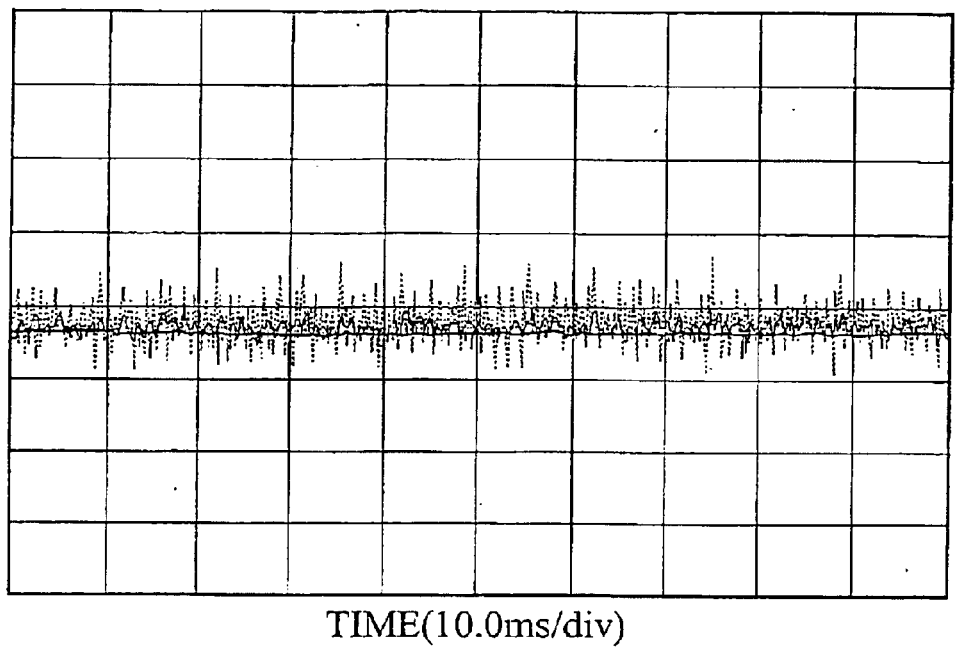
TIME(10.0ms/div)
(b)
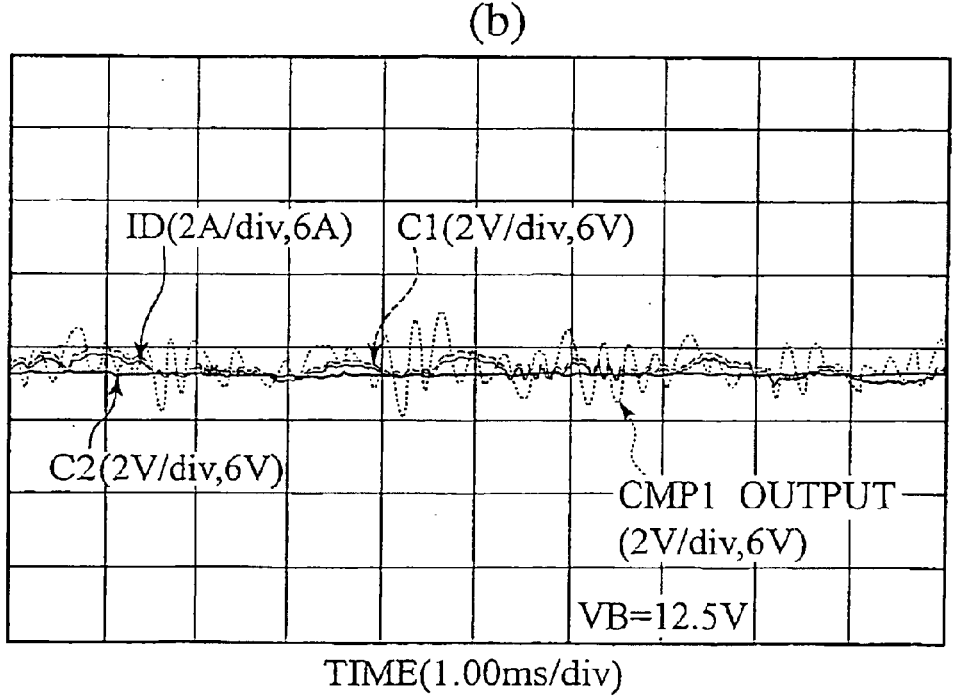
TIME(1.00ms/div)

FIG.18
(a)
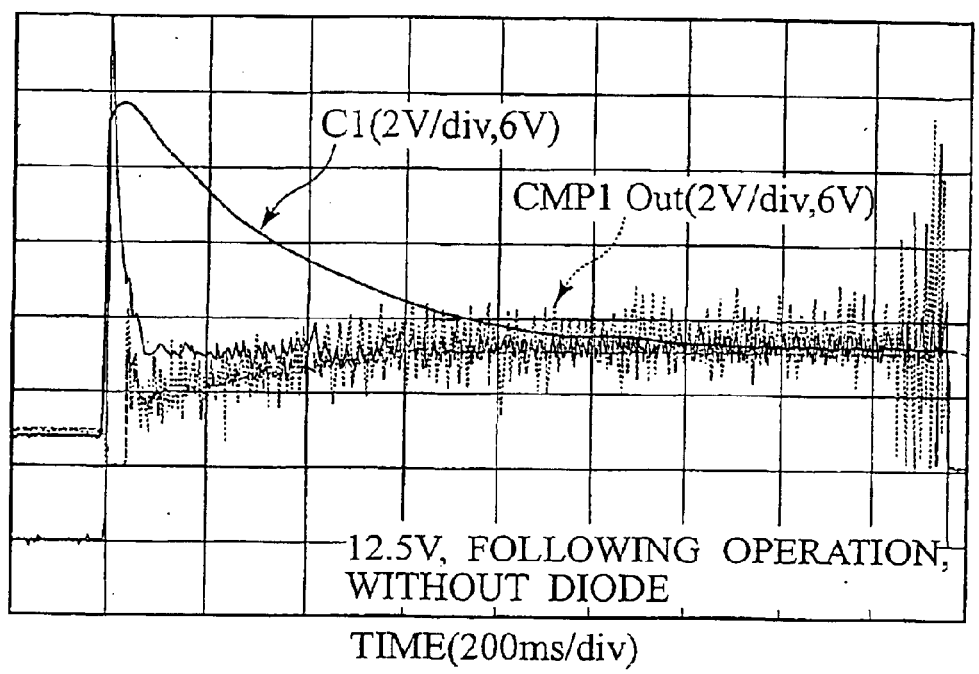
(b)
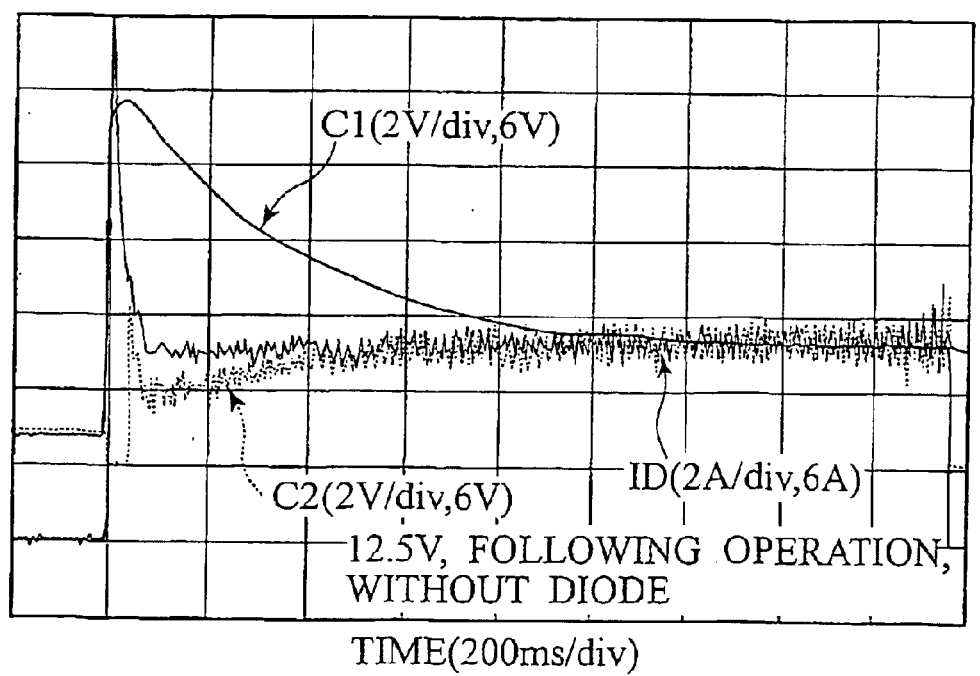

FIG. 19
(a)
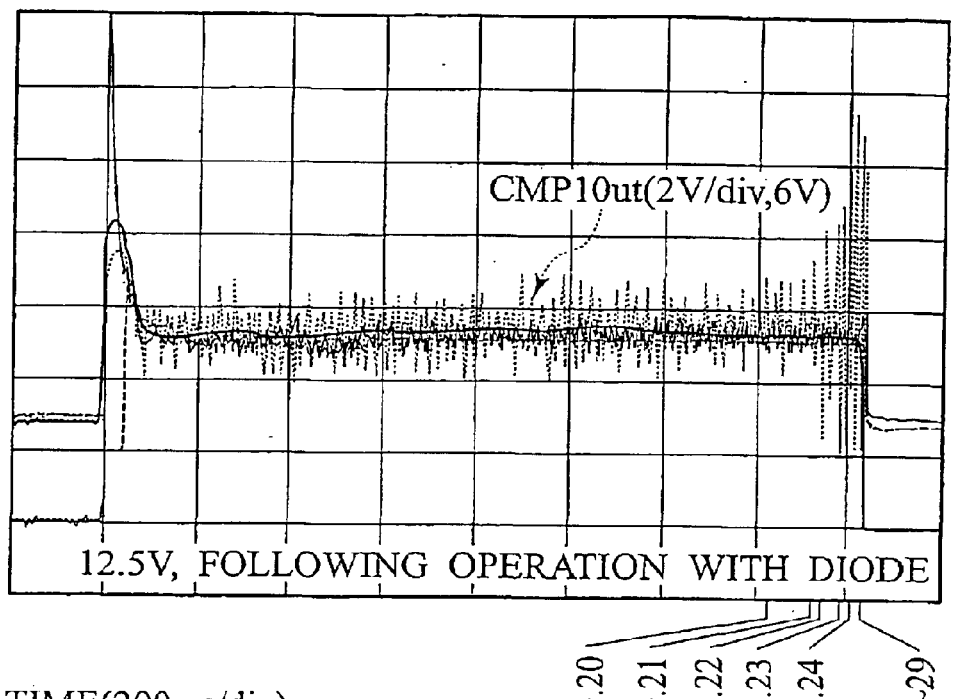
(b)
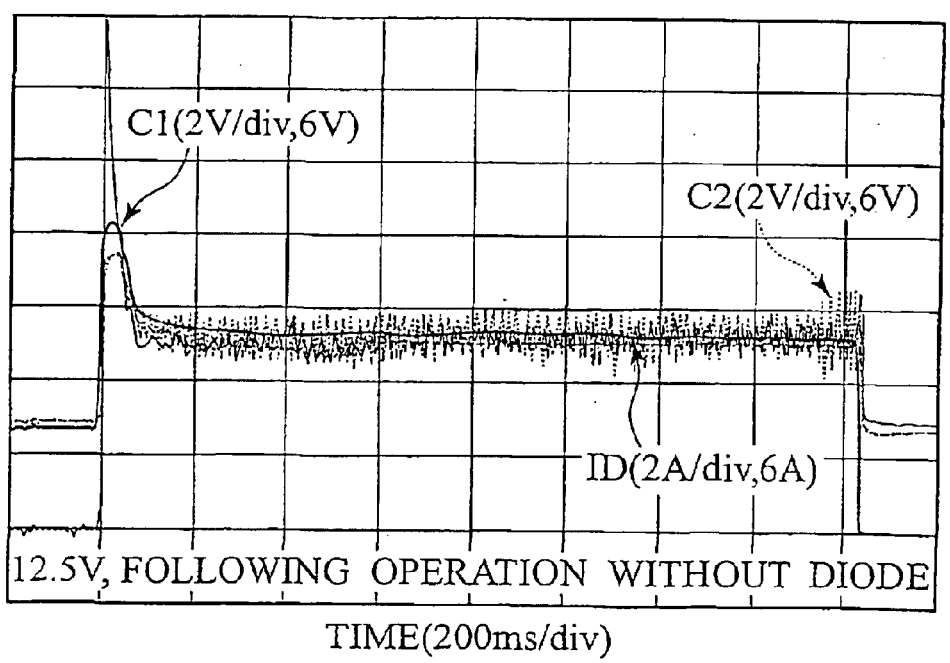

FIG.20
(a)
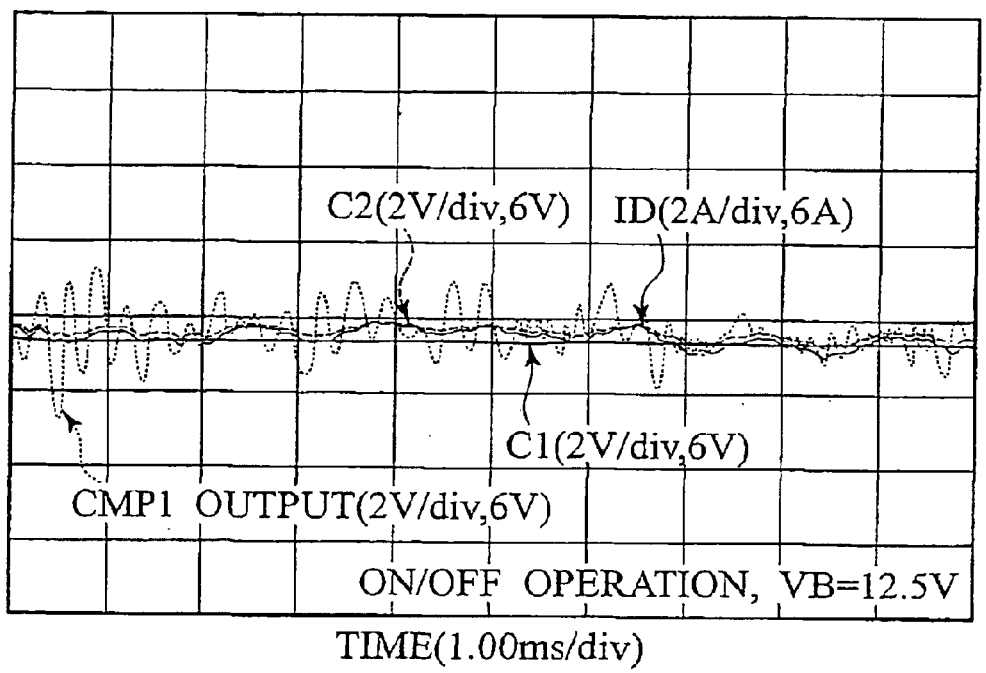
(b)
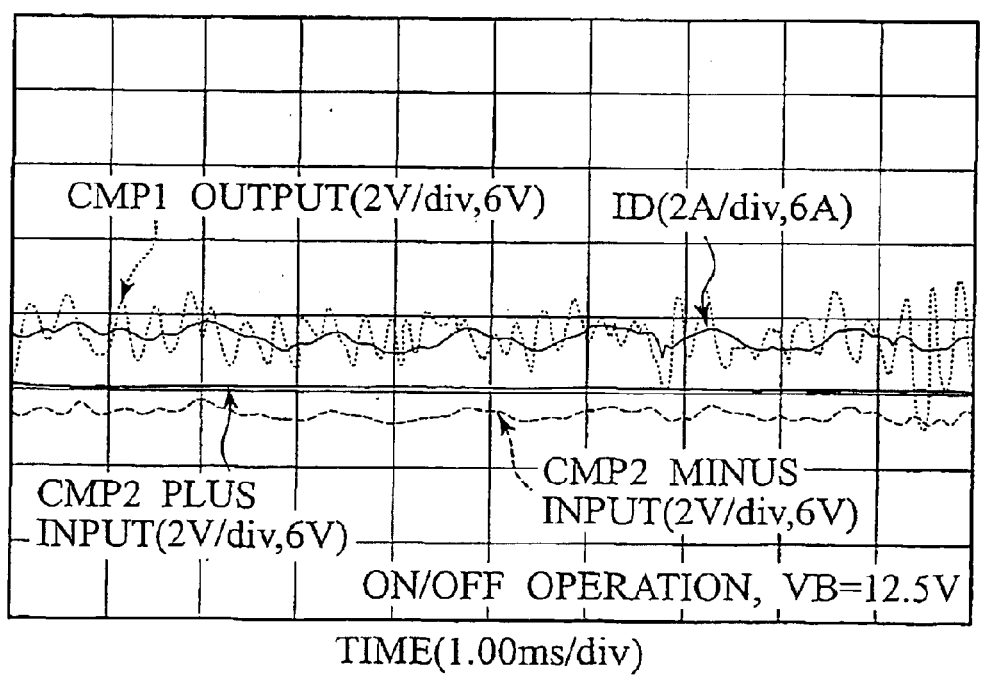

FIG.24
(a)
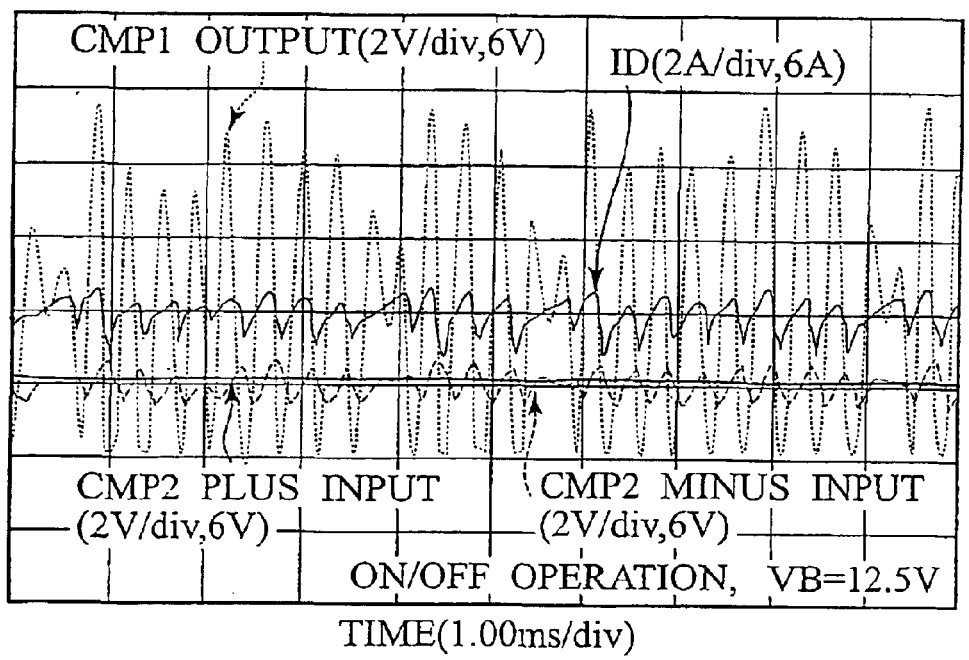
(b)
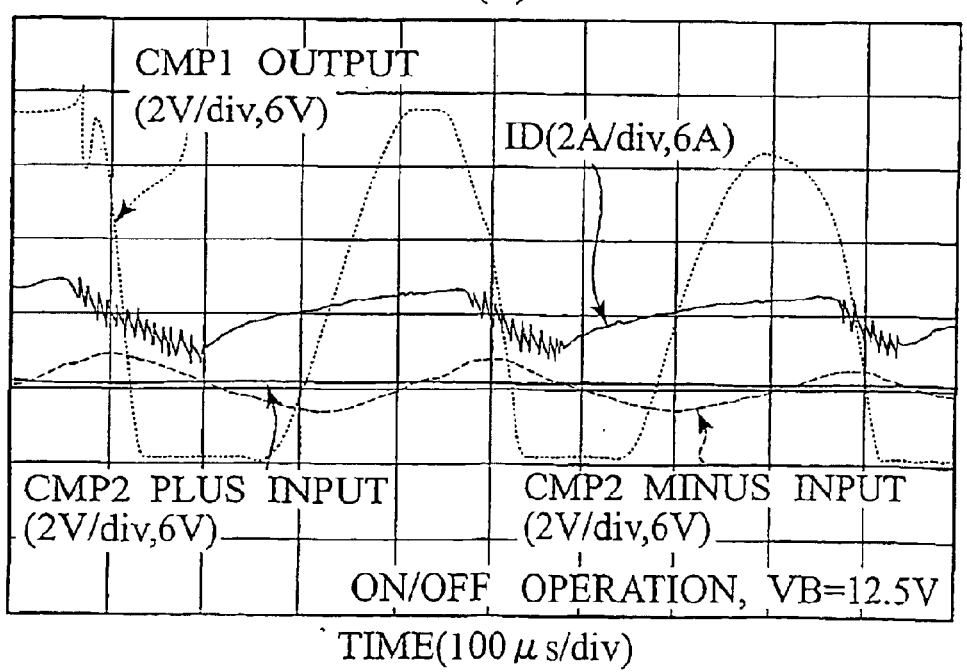

FIG.26
(a)
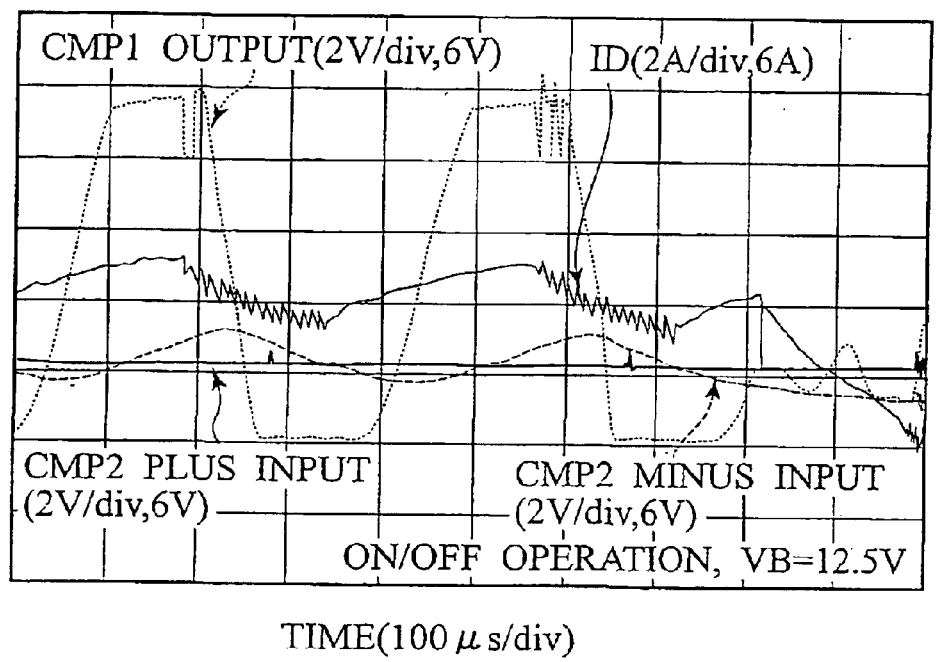
(b)
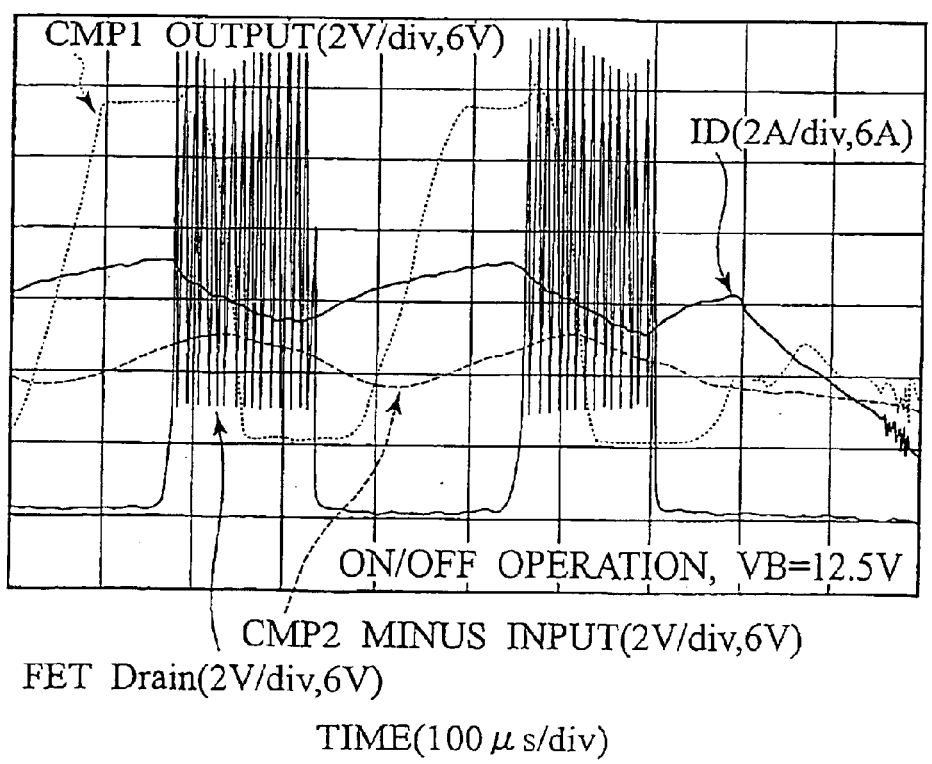

FIG.27
(a)
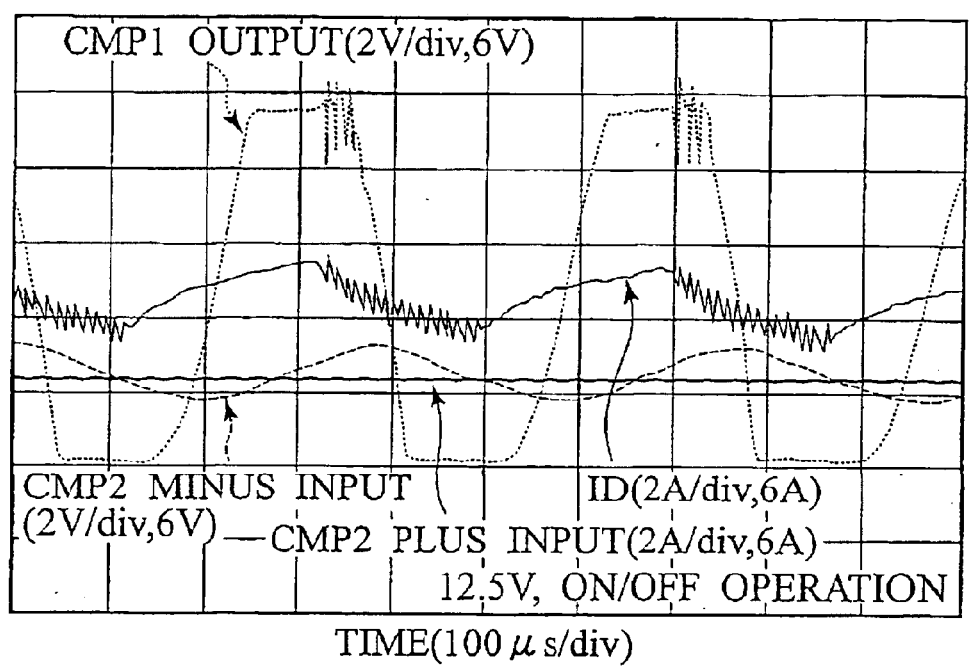
(b)
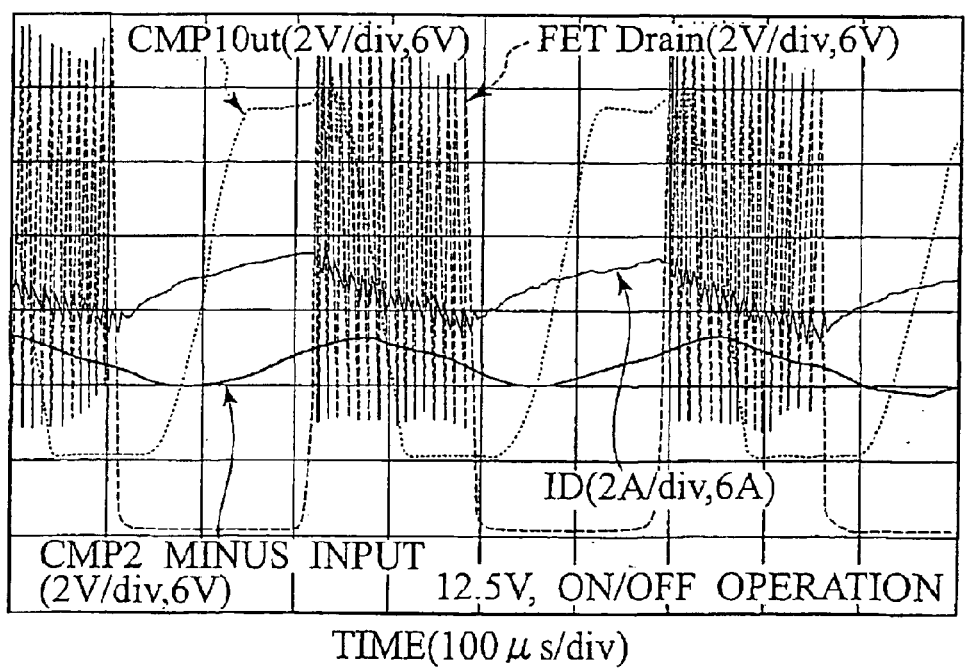

FIG.29
(a)
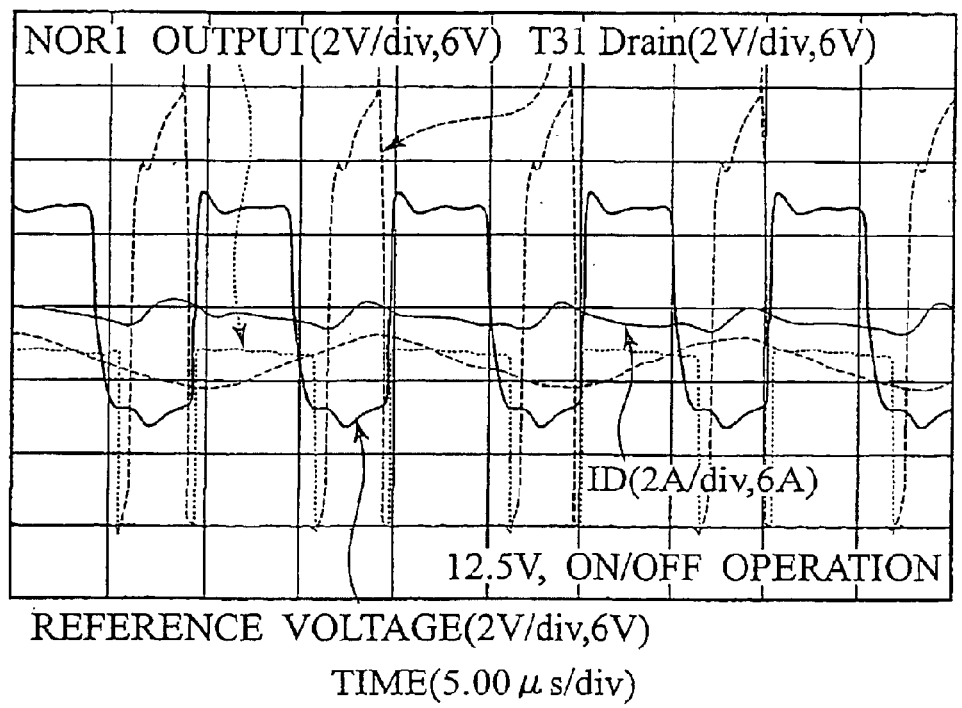
(b)
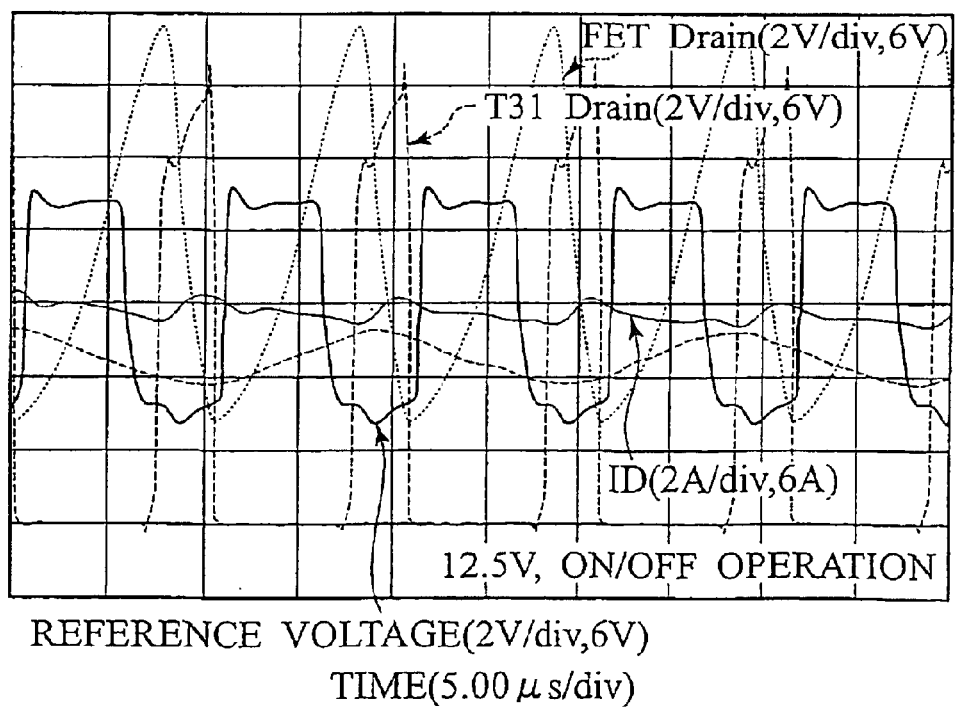

FIG.30
(a)
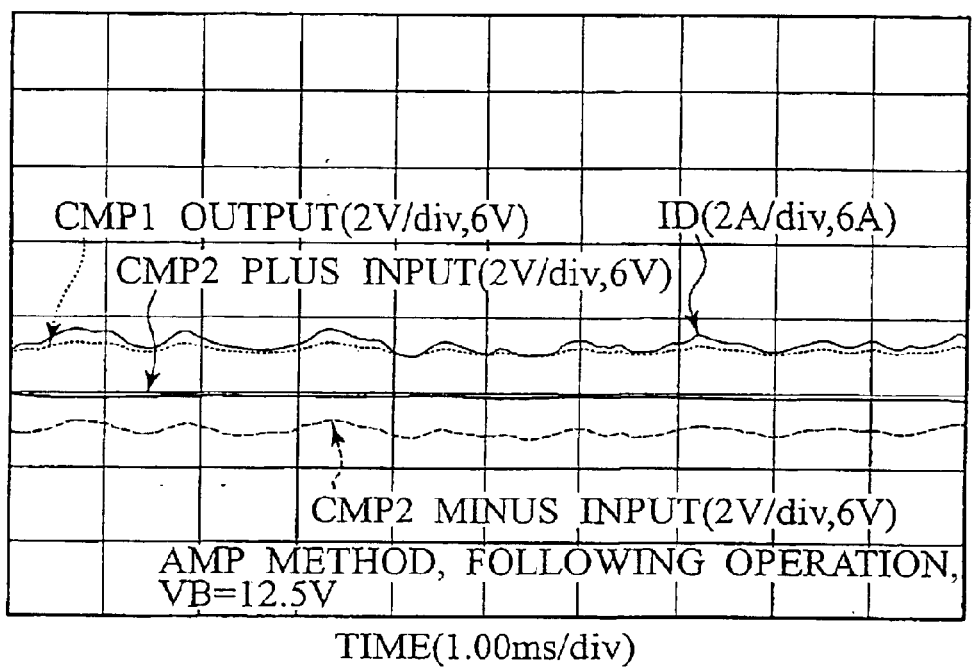
(b)
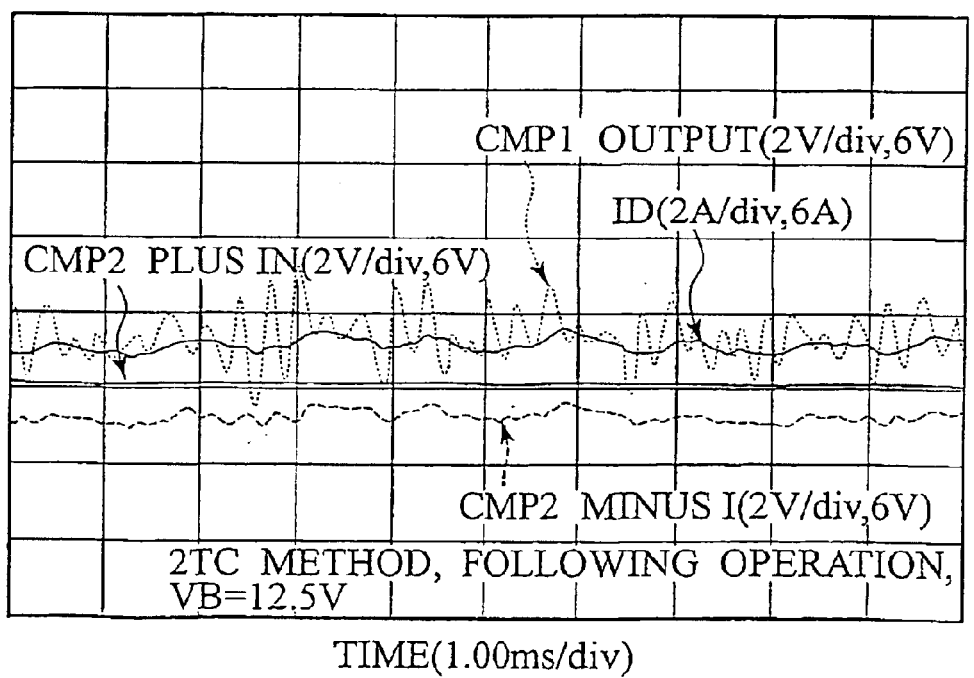

FIG.32
(a)
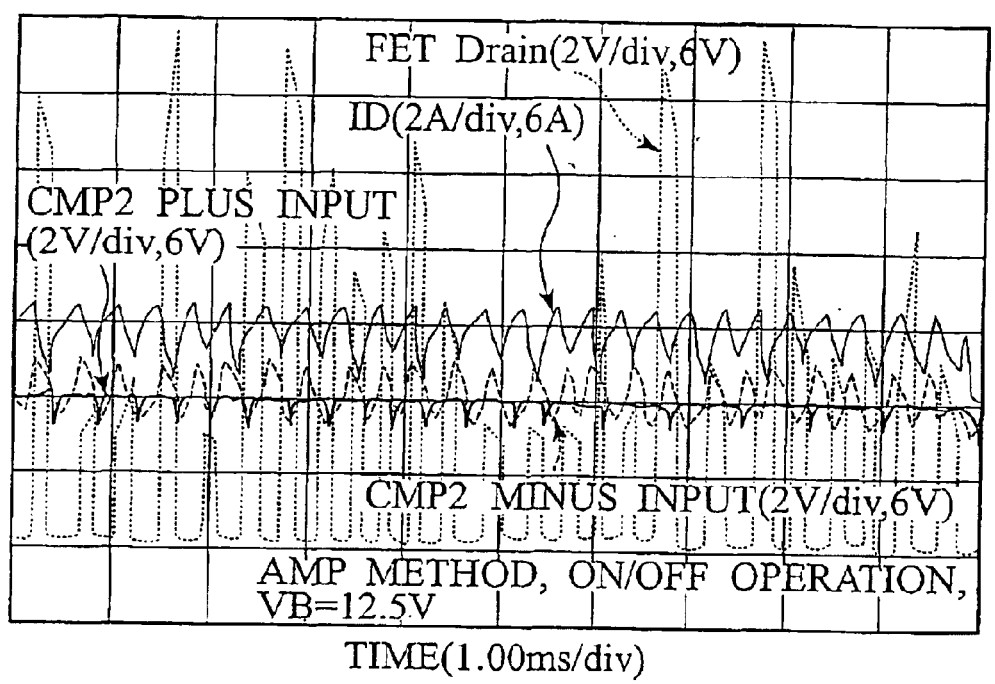
(b)
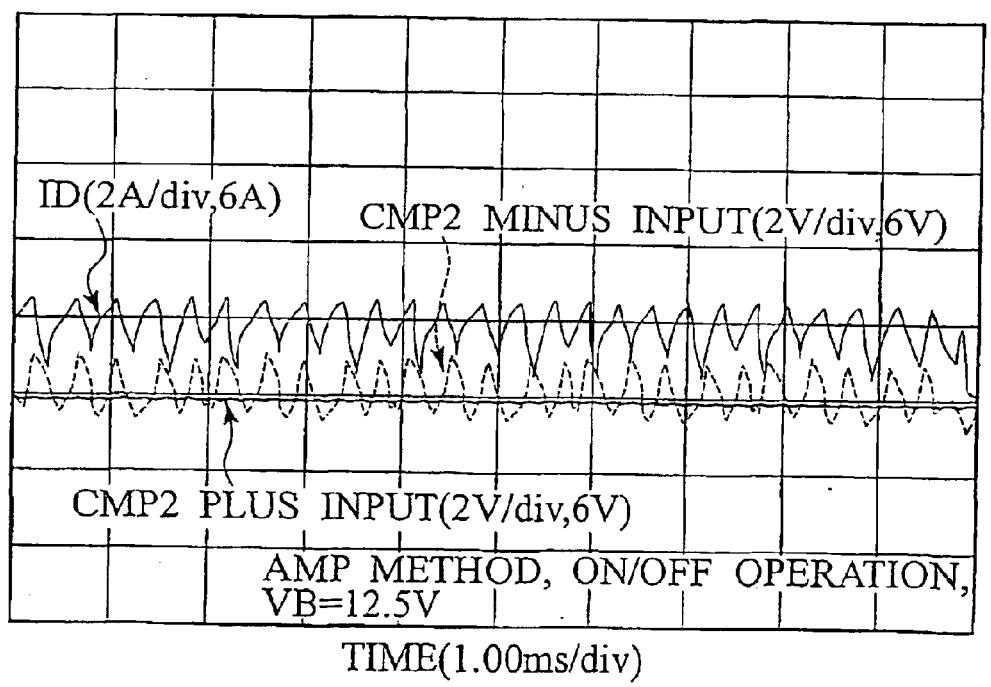

FIG.33
(a)
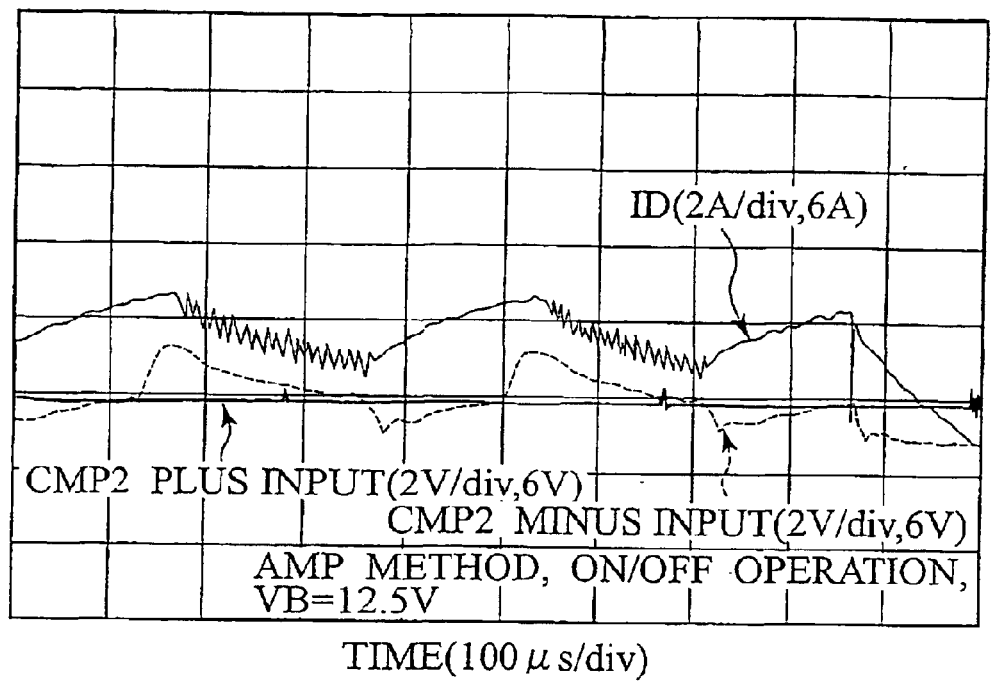
(b)
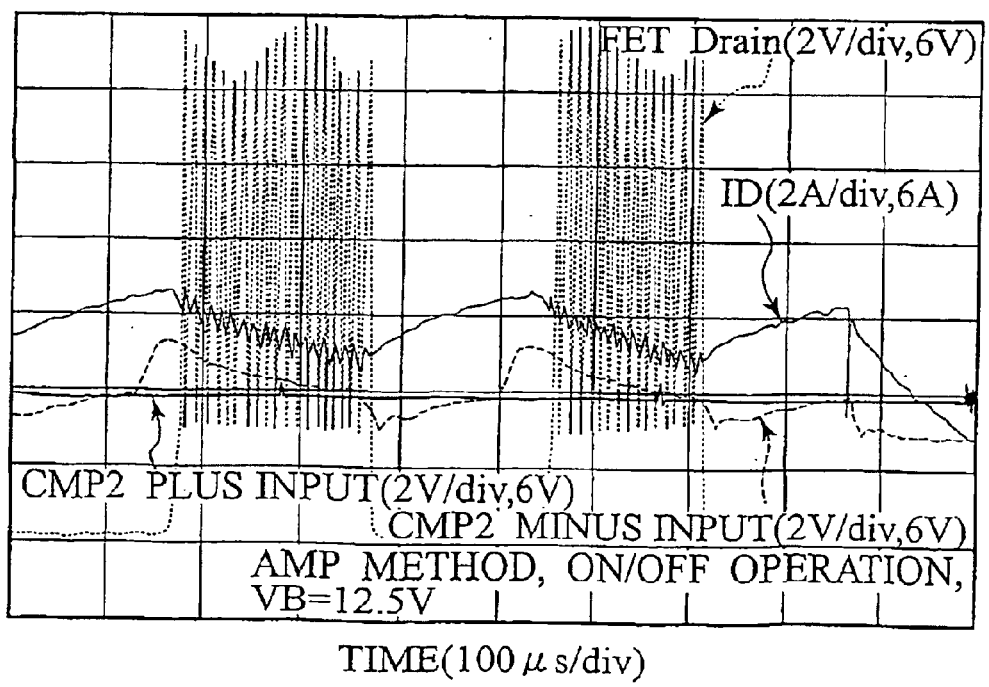

FIG.34
(a)
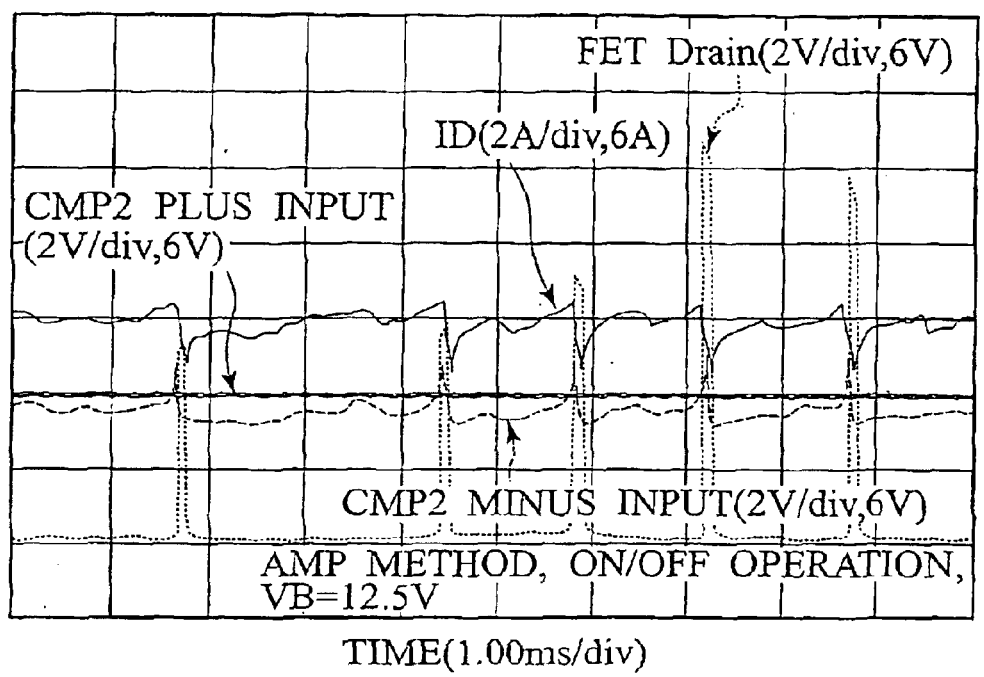
(b)
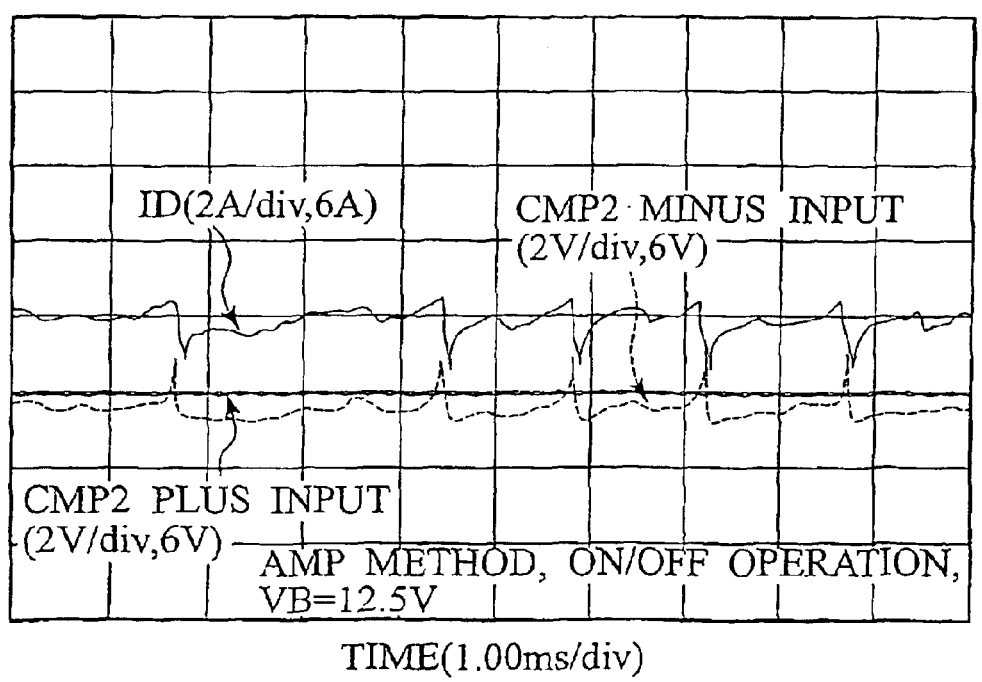

JAMMING PROTECTION DEVICE FOR MOVING MEMBER

TECHNICAL FIELD

The present invention relates to a device for preventing the jamming of a human finger or the like by a moving member driven by a direct current motor, for example, a power window of a vehicle. Particularly the present invention relates to a device for quickly detecting an abnormal current generated in the motor current by such a jamming without errors.

BACKGROUND ART

The glass windows of the vehicle is called a power window and can be automatically opened/closed by a motor. In this type of automatic opening/closing, a countermeasure for preventing the jamming of a foreign object such as a hand, a neck, or the like (jamming protection) is provided.

The load imposed on a foreign object jammed should be limited to 100 N at the maximum. However, there are cases where the load is imposed on the foreign object is over the specified value of 100 N. This problem is observed especially when the jamming of the foreign object occurs immediately after the power window starts rising. That is, the load imposed on the foreign object is not kept below a specified value in any case.

DISCLOSURE OF INVENTION

It was found that the motor current ID increases in the case when a force is imposed on a foreign object. Due to the increment of the motor current ID, the load is increased. Thus, the invention controls the motor current ID in order to restrain the increment of the motor current ID. A jamming protection device for a moving member driven by a motor (5) being able to rotate in the reverse direction supplied with a motor current (ID) by a power supply unit (VB) according to embodiments of the present invention includes a current detection circuit (2) being connectable to a plus terminal or a minus terminal of the power supply unit (VB), configured to conduct the motor current (ID) and to detect an increment of the motor current (ID), and a current limiting circuit (7) configured to conduct the motor current (ID) and to decrease and increase the motor current (ID) within a predetermined region when the increment of the motor current (ID) exceeds a predetermined value. The motor current (ID) after the jamming start is greater than a mean value of the motor current (ID) before the jamming start by the predetermined value.

BRIEF DESCRIPTION OF DRAWINGS

FIG. 14(a) to FIG. 17(b) show signal waveforms showing following operations of a current detection circuit 2 of a jamming protection device according to operation verifying example 1.

FIG. 18(a) and FIG. 18(b) show signal waveforms showing a following operation of a current detection circuit 2 of a jamming protection device according to operation verifying example 2.

FIG. 19(a) and FIG. 19(b) show signal waveforms showing a following operation of a current detection circuit 2 of a jamming protection device according to operation verifying example 3.

FIG. 20(a) to FIG. 29(b) show signal waveforms showing the ON/OFF operation of a current limiting circuit 7 of a jamming protection device according to operation verifying example 4.

FIG. 30(a) and FIG. 30(b) show signal waveforms showing a following operation of a current detection circuit 2 of a jamming protection device according to operation verifying example 5.

FIG. 31 to FIG. 34(b) show signal waveforms showing the ON/OFF operation of a current limiting circuit 7 of a jamming protection device according to operation verifying example 6.

BEST MODE FOR CARRYING OUT THE INVENTION

Figure 1:
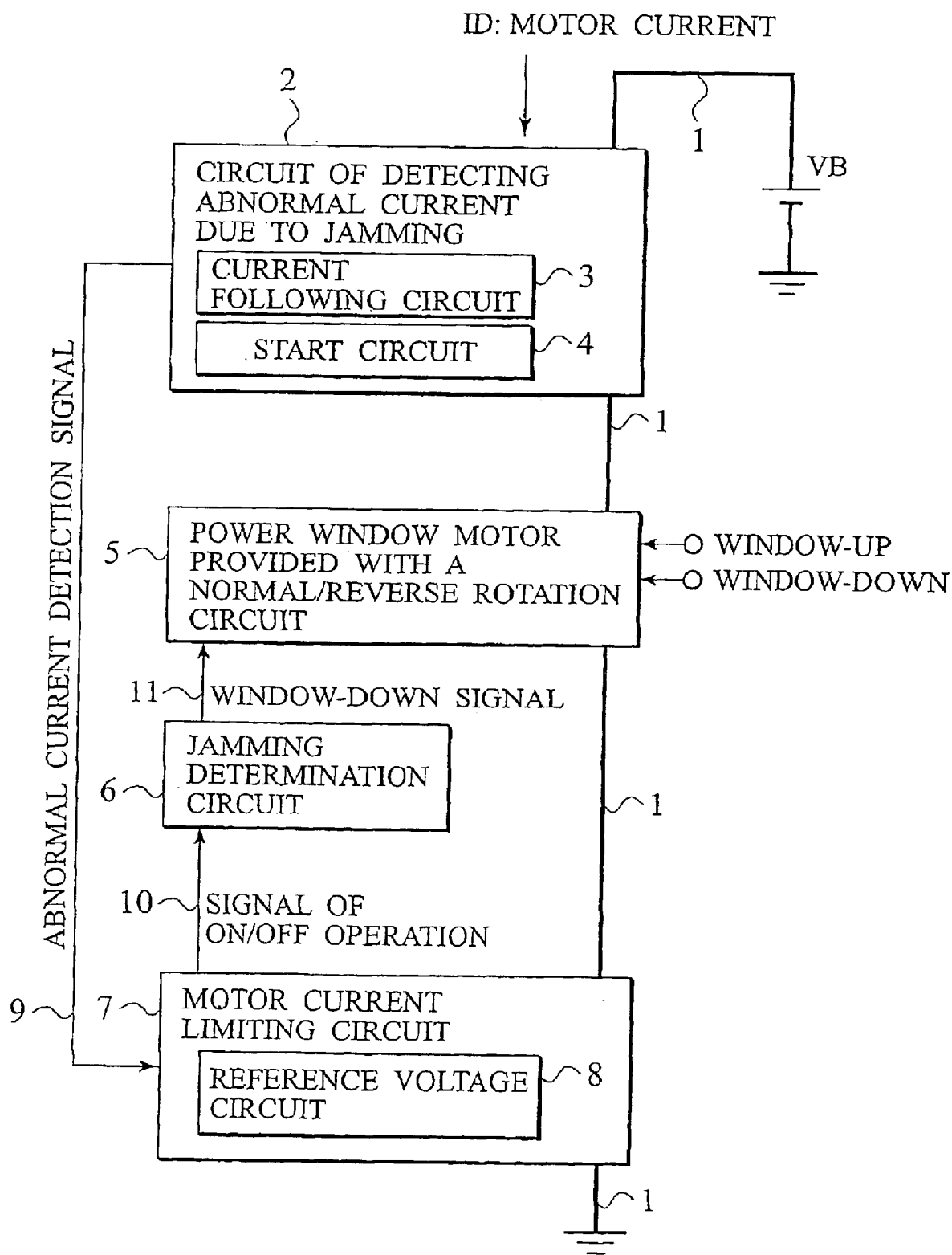
FIG. 1 is a block diagram of the jamming protection device according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment
(Outline of Jamming Protection Device)
As shown in FIG. 1, the power window jamming protection device according to the first embodiment has an abnormal current detection circuit 2 detecting an abnormal current due to the jamming, a power window motor 5 provided with a normal/reverse rotation circuit, a jamming determination circuit 6 determining the jamming, and a motor current limiting circuit 7 limiting the motor current ID. The power window motor 5 provided with the normal/reverse rotation circuit may be deemed to be a normal/reverse rotation circuit 5 containing a motor M. Three circuits of the current detection circuit 2, the normal/reverse rotation circuit 5, and the current limiting circuit 7 are connected in series with a wire 1 in which the motor current ID flows to be connected to a power supply unit (battery) VB. The abnormal current detection circuit 2 has a current following circuit 3 and a start circuit 4. The abnormal current detection circuit 2 outputs an abnormal current detection signal 9 to the motor current limiting circuit 7. The motor current limiting circuit 7 has a reference voltage circuit 8. The motor current limiting circuit 7 outputs an ON/OFF operation signal 10 to the jamming determination circuit 6. The jamming determination circuit 6 outputs a WINDOW-DOWN signal to the power window motor 5. The power window motor 5 inputs a WINDOW-UP signal and the. WINDOW-DOWN signal. Based on these WINDOW-UP signal and WINDOW-DOWN signal, the power window motor 5 switches an up switch and a down switch in the power window motor 5.

Figure 2:
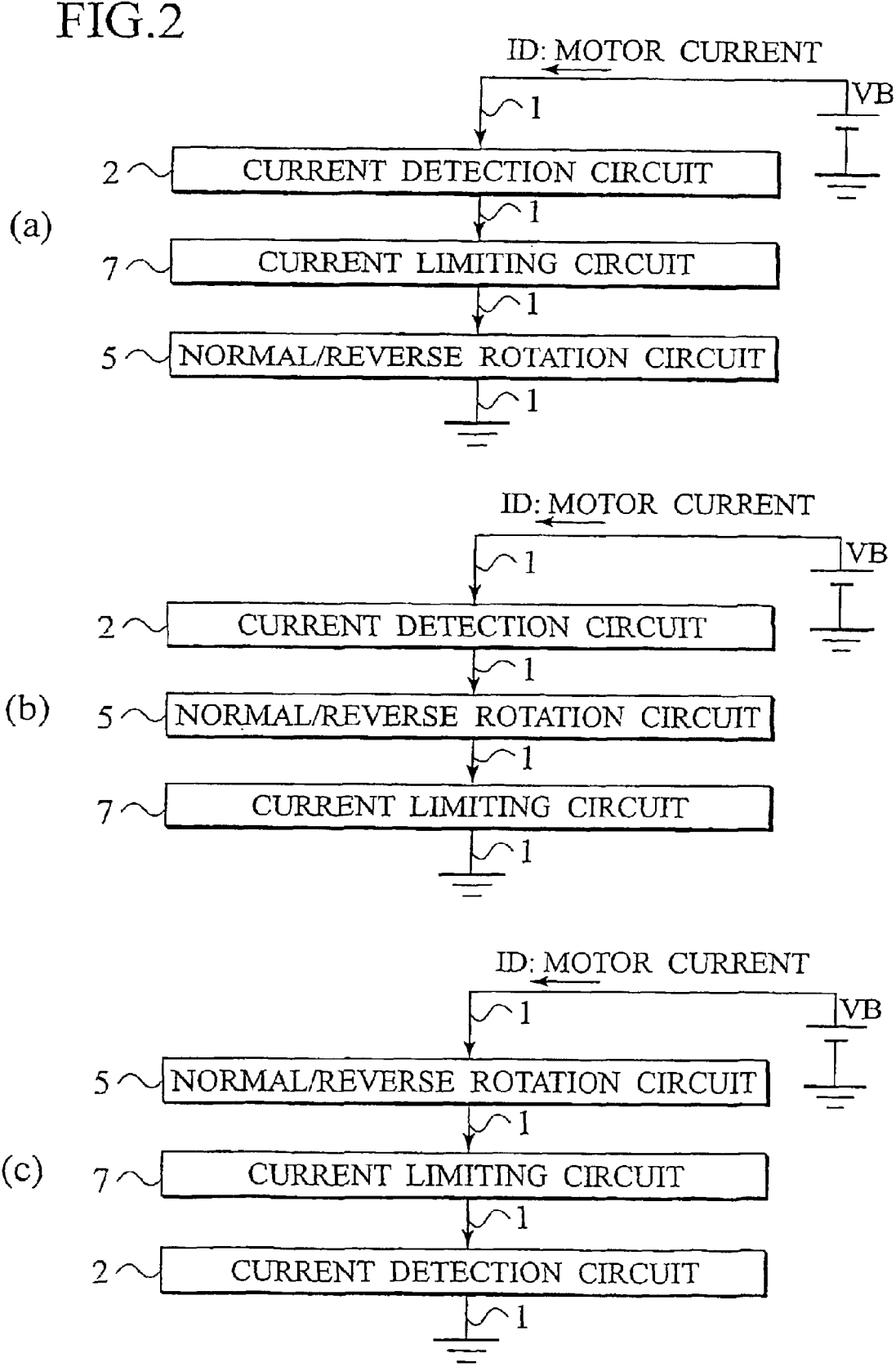
FIGS. 2(a) to 2(c) are block diagrams for explaining modified examples of the jamming protection device according to the first embodiment.

As shown in FIGS. 2(a) and 2(b), the current detection circuit 2 is connectable to the plus terminal of the power supply unit VB. Or, as shown in FIG. 2(c), the current detection circuit 2 can be connected to the grounding terminal equivalent to the minus terminal of the power supply unit VB. There is no matter regarding the order of flow of the motor current ID in the normal/reverse rotation circuit 5 and the current limiting circuit 7. Specifically, the order of flow of the motor current ID may be the order from the current detection circuit 2 to the current limiting circuit 7, from the current limiting circuit 7 to the normal/reverse rotation circuit 6 as FIG. 2(a). The order of flow of the motor current ID may be the same order as in FIG. 1, that is, from the current detection circuit 2 to the normal/reverse rotation circuit 5, from the normal/reverse rotation circuit 5 to the current limiting circuit 7 as FIG. 2(b). The order of flow of the motor current ID may be the order from the normal/reverse rotation circuit 5 to the current limiting circuit 7, from the current limiting circuit 7 to the current detection circuit 2 and the like as FIG. 2(c).

(Outline of Abnormal Current Detection Circuit 2)

Figure 3:
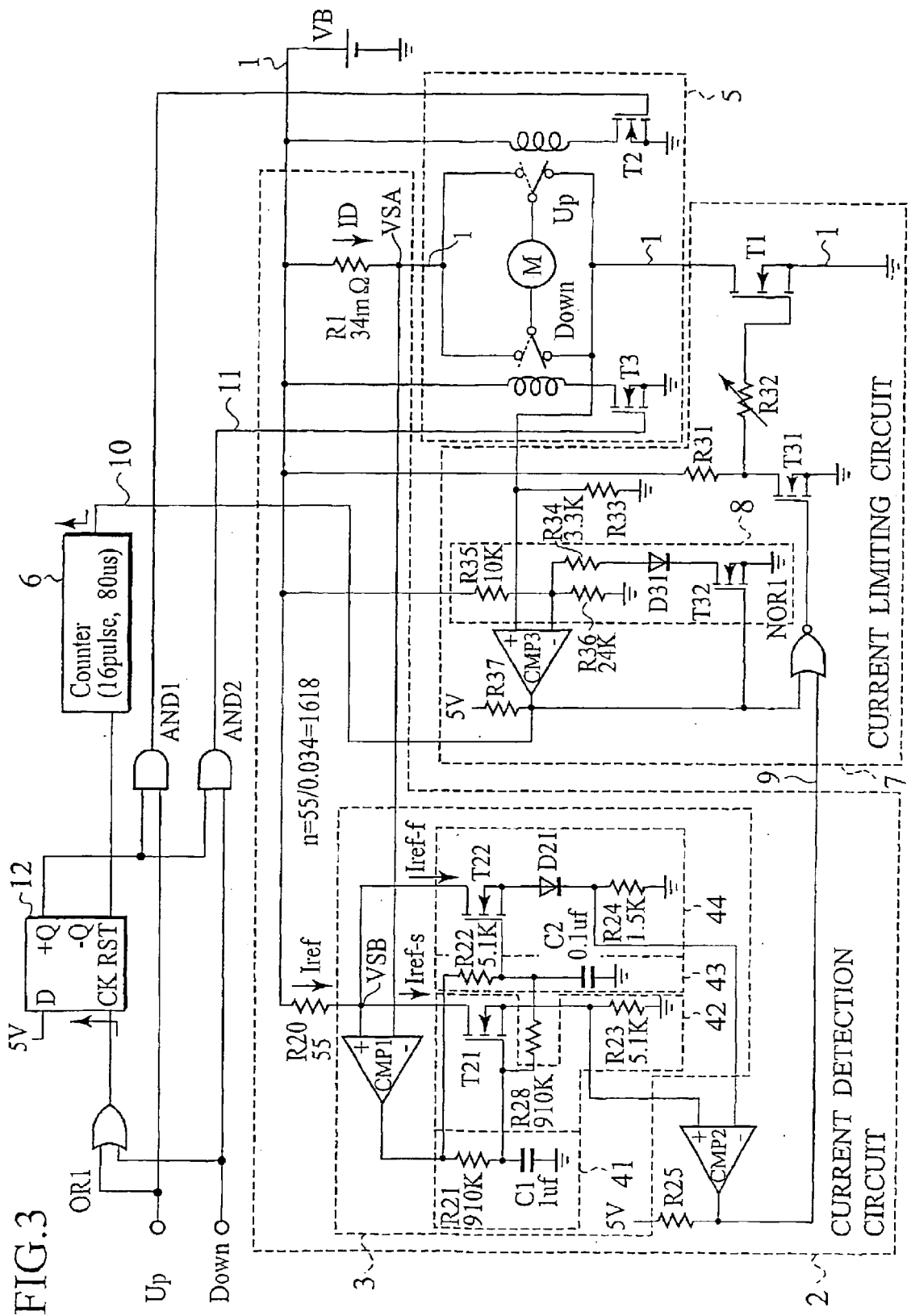
FIG. 3 is a circuit diagram of the jamming protection device according to the first embodiment.

The abnormal current detection circuit 2 detects the abnormal current in the motor current ID due to the jamming. As shown in FIG. 3, the current detection circuit 2 outputs the abnormal current detection signal 9 that is the result of detection to the current limiting circuit 7 via a signal line 9. The current detection circuit 2 has a multi-resistor (R1 and R20) or a multi-source field effect transistor (FET). The current detection circuit 2 includes the current following circuit 3 and the start circuit 4 shown in FIG. 9. The abnormal current detection signal 9 transmitted on the signal line 9 is also designated as 9 that is the same as the reference numeral 9 of the signal line 9 for the sake of convenience. Other signals are also similarly treated.

As shown in FIG. 3, the multi-resistor (R1 and R20) is composed of a shunt resistor R1 and a reference resistor R20. The current sensing ratio of the multi resistor, n, is the ratio of the resistance of the reference resistor R20 to the resistance of the shunt resistor R1. The current sensing ratio n is set to a value greater than 1, preferably to 100 or greater. In FIG. 3, the current sensing ratio n is set to 1618. The motor current ID flows in the shunt resistor R1. The reference current Iref is controlled so that the reference current Iref meet the condition of (ID=n*Iref) flows in the reference resistor R20.

In the case where the shunt resistor R1 connects to the high side of the motor 5 (to a power supply side with respect to the motor 5), it is necessary for the electrical potential VSA of the motor M side of the shunt resistor R1 and the grounding side electrical potential VSB of the reference resistor R20 to meet the condition of VSA=VSB in order to meet the condition of ID=n*Iref. When the motor M is rotating normally, if the motor current ID changes due to a fluctuation in the driving force for moving the window glass, although the VSA such as a electrical potential of the shunt resistor R1 also changes, the reference current Iref is controlled to maintain the condition of VSA=VSB.

Next, a methods of detecting abnormal current generated due to the jamming is explained. The reference current Iref is divided into two electrical current components whose following speeds are different. The reference current Iref is divided into a slow following current Iref-s with a low following speed and a fast following current Iref-f with high following speed. The slow following current Iref-s is set so that the slow following current Iref-s can follow the changes in the motor current ID when the motor 5 normally rotates, but cannot follow rapid changes in the motor current ID when the jamming occurs. On the other hand, the fast following current Iref-f is set so that the fast following current Iref-f not only can follow the current changes when the jamming occurs but can also follow a pulsating current component contained in the motor current ID. The more following of the fast following current Iref-f, the more constant of the slow following current Iref-s. In order to meet such condition, the following speed of the fast following current Iref-f is set to 800 to 1000 times of that of the slow following current Iref-s.

The fast following current Iref-f correctly reflects changes of the motor current ID except for a time of the ON/OFF operation of the semiconductor switching element T1. By causing the fast following current Iref-f to flow in a resistor R24 whose resistance value is greater than that of the reference resistor R20, a change in the motor current ID is converted to a change of a voltage. Through this conversion into a voltage, a fine fluctuation amplified by converting a change in the motor current ID into a voltage by the shunt resistor R1 can be detected.

When the jamming occurs, although the fast following current Iref-f increases while following the motor current ID, the slow following current Iref-s hardly changes. Consequently, a difference is generated between the mean value of the fast following current Iref-f and the slow following current Iref-s, the mean of Iref-f is greater than Iref-s. When the difference between the mean value of the fast following current Iref-f and the slow following current Iref-s exceeds a preset value, the abnormal current detection signal 9 is generated. The semiconductor switching element (a FET or bipolar transistor) T1 is turned off.

(Outline of Motor Current Limiting Circuit 7)

The current limiting circuit 7 includes the semiconductor switching element T1 capable of turning on and off the motor current ID. The current limiting circuit 7 includes the reference voltage circuit 8 generating an upper reference voltage (VH) for turning on the semiconductor switching element T1 and a lower reference voltage (VL) for turning off the semiconductor switching element T1. The current limiting circuit 7 inputs the abnormal current detection signal 9 to restrain the motor current ID so that the motor current ID does not increase when the jamming is occurring. The restraint is performed by the semiconductor switching element T1 alternately repeating the ON/OFF operation and the continuous ON operation. The ON/OFF operation signal 10 is outputted to the jamming determination circuit 6 via the signal line 10. The ON/OFF operation signal 10 is a signal synchronized the timing of the on and off of the semiconductor switching element T1.

When the motor current ID begins the operation of repeating the ON/OFF operation and the continuous ON operation, the current value of the motor current ID is substantially controlled so that the mean value of the motor current ID is maintained at a value that is a little greater than the motor current ID of the time immediately before the jamming occurs. The motor torque is proportional to the motor current ID. Therefore, the motor torque is held at a magnitude of torque that is a little greater than the torque required for driving the window glass. The motor M ensures a minimum torque necessary for the driving of the window glass. The jamming load in this case is the minimum jamming load under the condition that erroneous reverse rotation does not occur even when an instantaneous change in the driving force of the window glass occurs due to driving on a rough and bumpy road.

(Outline of Jamming Determination Circuit 6)

The jamming determination circuit 6 determines whether or not the jamming has occurred based on the inputted ON/OFF operation signal 10. When it is determined that the jamming has occurred, a WINDOW-DOWN signal 11, that the window should be opened, is outputted to the motor 5 via a signal line 11.

For the determination of the jamming, time of the ON/OFF operation or the time; of continuous ON of the semiconductor switching element T1 is utilized. Time of the ON/OFF operation becomes longer and time of the continuous ON becomes shorter as the motor rotational speed is reduced due to the jamming. For example, when a time of the ON/OFF operation reaches a predetermined time, it is determined that the jamming has occurred. When the occurrence of the jamming is determined, the semiconductor switching element T1 is shut off to stop the motor 5. After a predetermined period of time lapses, the motor 5 is driven to reversibly rotate. Thus, the window glass is opened so that the jamming of a foreign object can be alleviated.

(Outline of Power Window Motor 5 with Normal/Reverse Rotation Circuit)

The WINDOW-UP signal is inputted to the Power Window Motor 5 so that the motor 5 is rotated in the direction in which the power window is closed, and the WINDOW-DOWN signal is inputted so that the motor 5 is rotated in the direction in which the power window is opened. Further, in the case where the WINDOW-DOWN signal is inputted via the signal line 11, the rotation of the motor 5 is reversed from the direction in which the power window is closed to the direction in which it is opened. The motor 5 has a relay circuit.

In the jamming protection device according to the first embodiment of FIG. 3, the circuit constitutions and the circuit operations of the current detection circuit 2, the current limiting circuit 7, and the jamming determination circuit 6 are explained in detail.

1. Detailed Explanation of Current Detection Circuit 2

1-1. Circuit Construction of Current Detection Circuit 2

The shunt resistor R1, the motor 5, and the semiconductor switching element T1 performing the ON/OFF operation are connected in series to the electrical wire 1 in which the motor current ID flows. The shunt resistor R1 is connected to the plus terminal of the power supply unit VB. The semiconductor switching element T1 is connected to the grounding terminal as the minus terminal of the power supply unit VB.

As shown in FIG. 3, the current detection circuit 2 includes the shunt resistor R1 and the reference resistor R20 both connected to the plus terminal of the power supply VB. The current following circuit 3 is connected to the resistors R1 and R20. Regarding a second comparator CMP2, the plus input terminal and the minus input terminal are connected to the current following circuit 3. The output terminal of the second comparator CMP2 is connected to the current limiting circuit 7. The second comparator CMP2 outputs the abnormal current detection signal 9 to the current limiting circuit 7. A resistor R25 is connected between a 5 V power supply and the output terminals of the second comparator CMP2.

The current following circuit 3 has a first comparator CMP1. The plus input terminal of the first comparator CMP1 is connected to the reference resistor R20. The minus input terminal of the first comparator CMP1 is connected to the shunt resistor R1. The current following circuit 3 has a slow following circuit (41 and 42) and a fast following circuit (43 and 44). The slow following circuit (41 and 42) has a slow charge discharge circuit 41 and a slow source follower circuit 42. The fast following circuit (43 and 44) has a fast charge discharge circuit 43 and a fast source follower circuit 44.

The slow charge discharge circuit 41 is connected to the output terminal of the first comparator CMP1. A resistor R21 and a capacitor C1 grounded are connected in series to construct the slow charge discharge circuit 41. The fast charge discharge circuit 43 is connected to the output terminal of the CMP1. A resistor R22 and a capacitor C2 grounded are connected in series to construct the fast charge discharge circuit 43. A resistor R28 is connected between the capacitors C1 and C2.

The slow source follower circuit 42 has an n-type metal oxide semiconductor (MOS) field effect transistor (FET) T21 and a resistor R23. The drain of the FET T21 is connected to the plus input terminal of the first comparator CMP1. The gate of the FET T21 is connected to the capacitor C1. One end of the resistor R23 is connected to the source of the FET T21 and the plus input terminal of the second comparator CMP2. The other end of the resistor R23 is connected to the grounding.

The fast source follower circuit 44 includes an n-type MOSFET T22, a diode D21, and the resistor R24. The drain of the FET T22 is connected to the plus input terminal of the first comparator CMP1. The gate of the FET T22 is connected to the capacitor C2. The anode of the diode D21 is connected to the source of the FET T22. One end of the resistor R24 is connected to the cathode of the diode D21 and the minus input terminal of the second comparator CMP2. The other end of the resistor R24 is connected to the grounding. 910K appended to the resistor R21 and the like in FIG. 3 shows that the resistance value of the resistor R21 is 910K Ω. Similarly, 0.1 uf appended to the capacitor C2 and the like shows that the capacitance of the capacitor C2 is 0.10 uF. Similar representations are employed in other drawings.

1-2. Detailed Explanation of Operations of Current Detection Circuit 2

The normal/reverse rotation relay of the motor 5 is driven by transistors T2 and T3 as shown in FIG. 3. In the normal rotation in which the power window is up in an up-operation, the transistor T2 is on. In the reverse rotation in which the power window is down in a down-operation, the transistor T3 is on. In the circuit example of FIG. 3, the resistance value of the shunt resistor R1 is set at 34 m OHMS, and the resistance value of the reference resistor R20 is set at 55 OHMS. The motor current ID flows in the shunt resistor R1, and the reference current Iref flows in the reference resistor R20. Resistance values and capacitance of the shunt resistor R1, the capacitor C2, and the like are represented by R1 and the like that is the same as the reference numeral R1 of the resistor R1 and the like for the sake of convenience. Here, the current sensing ratio n in a condition of R1*ID=R20*Iref is equal to the current ratio ID/Iref as shown in the equation 1.

$$n=ID/Iref=R20/R1=55/0.034=1618 \quad (1)$$

The comparator CMP1 is composed of an operational amplifier. The capacitor C1 is charged/discharged via the resistor R21 by the output signal of the CMP1. The slow following current Iref-s flows in the slow source follower circuit 42. The slow following current Iref-s is in proportion to the electrical potential of the capacitor C1.

On the other hand, the capacitor C2 is charged/discharged via the resistor R22 by the output signal of the CMP1. The fast following current Iref-f flows in the fast source follower circuit 44. The fast following current Iref-f is in proportion to the electrical potential of the capacitor C2. Since ungrounded side terminals of the capacitors C1 and C2 are connected by the resistor R28, when the motor current ID does not change, the electrical potentials of C1 and C2 are equal. The time constant of the slow charge discharge circuit 41 is greater than the time constant of the fast charge discharge circuit 43. In FIG. 3, the time constant of the slow charge discharge circuit 41 is expressed as the equation 2. The time constant of the fast charge discharge circuit 43 is expressed as the equation 3. The ratio of the time constant of the slow charge discharge circuit 41 to the time constant of,the fast charge discharge circuit 43 is one to 894 (1:894).

$$\text{(the time constant of the slow charge discharge circuit 41)}= R21.*(R22+R28)/(R21+R22+R28)*C1=910K*(5.1K+910K)/(910K+5.1K+910K)*1\ \mu F=456\ m\ second \quad (2)$$

$$\text{(the time constant of the fast charge discharge circuit 43)}= R22*C2=5.1K*0.1\ \mu F=0.51\ m\ second \quad (3)$$

Detection of the jamming is executed in the second comparator CMP2. The source electrical potential of T21 is inputted to the plus input terminal of CMP2, and an electrical potential that is lowered at only about 0.7 volts that corresponds to a forward voltage drop of the diode D21 from the source potential of T22 is inputted to the minus input terminal of CMP2. Since the gate-source voltages of the T21 and T22 are approximately equal, the forward voltage drop of D21 serves as the jamming detection voltage for detecting the abnormal current that increases due to the jamming. When the jamming occurs causing the Iref-f to increase, the output of the CMP2 changes from a high level to a low level. The output of non-disjunction NOR1 of the current limiting circuit 7 becomes high level, a transistor T31 is turned on, and the semiconductor switching element T1 is turned off. Detection of the abnormal current due to the jamming is executed as follows.

(a) First of all, the reference current Iref is divided into the slow following current Iref-s and the fast following current Iref-f as shown in FIG. 3. The changes in the motor current ID appear in the fast following current Iref-f, containing even a pulsating component. A change in the motor current ID is correctly reflected in the source potential of T22, that is, in the minus input terminal voltage of the CMP2. As a result, the source potential of the T21 of Iref-s side, that is, the plus input terminal voltage of the CMP2, is not affected by fast fluctuations in the motor current ID. Only the mean value of the motor current ID for a long period of time is reflected in the source potential of the T21. Thus, the source potential of the T21 is maintained at an approximately constant potential while current limiting is performed after the jamming has occurred. The source potential of the T21 is an ideal reference voltage.

(b) The fast following current Iref-f includes a changing quantity due to a pulsating component in the motor current ID. When the amplitude of the pulsating component is regarded as Δ ID-rip and the pulsating element in the Iref-f is regarded as ΔIref-f-rip, it is given that. ΔIref-f-rip=ΔID-rip/n. The current fluctuation part ΔVrip generated in the resistor R24 by ΔIref-f-rip becomes 0.46 volts in the case where R24=1.5K OHMS and ΔID-rip=0.5A as shown in equation 4.

$$\Delta Vrip=\Delta Iref\text{-}f\text{-}rip*R24=\Delta ID\text{-}rip/n*R24=0.5A/1618*1.5K=0.46\ V \quad (4)$$

That is, the minus input voltage of the CMP2 is vibrating at an amplitude, +/−0.23 V (+/−Δ Vrip/2), due to the pulsating component. Consequently, when the mean value of the Iref-f increases by 0.47 V (=0.7 V−0.23 V), the output of CMP2 changes from a high level to a low level.

When this 0.47 V is converted into the motor current ID, it becomes 0.51 A (=0.47 V/R24*n=0.47 V/1.5K*1618). That is, in the circuit example of FIG. 3, the mean value of the motor current ID increases by 0.51A due to the jamming. The CMP2 output becomes low level. The FET T31 is turned on, and the T1 goes to an OFF state.

(c) As shown in FIGS. 4(a) to 4(c), since the motor current ID increases before the CMP2 output changes to low level (before time t1), the output of CMP1 is at high level. When the FET T31 is turned on, the motor current ID begins to decrease, delaying only for a period of time during which excess electrical charge in the gate of the switching element T1 is discharged. At this time the output of the CMP1 begins a transition from high level to low level. The CMP1 is composed of an operational amplifier (OP AMP). Due to a response delay of the OP AMP, a delay time is generated for the change in the output from high level to low level.

The time t1 is a period of time from a time when the output of CMP1 begins to decrease to a time when the CMP1 output is lowered to a level equal to the electrical potential of the capacitor C2. The C2 is charged during the time t1. The Iref-f increases. The minus input terminal voltage of CMP2 increases. Time t2 is a period of time from a time the C2 begins to be discharged when the output of CMP1 becomes lower than the C2 potential after the time t1 until it finishes being discharged the amount of electrical charge charged during the time t1. After the time t2, the minus input terminal voltage of CMP2 returns to original voltage, that is, the voltage of the CMP2 output began the transition from low level to high level. During this period of time the plus input terminal voltage does not change.

After the time t2 passes, the CMP2 output changes to high level, and the FET T1 is turned on. That is, the CMP2 output is maintained at low level during the time t1+t2 since the output of CMP2 changes to low level. When the electrical potential of C2 is at a middle point between the high level and the low level of the output of CMP1, a relationship that t1 is nearly equal to t2 is given. The time t1+t2 is decided by the turn-off delay time of T1, the response speed of the OP AMP, and a decreased speed of the motor current ID, and since the turn-off delay time of T1 and the response speed of OP AMP are constant, the time t1+t2 depends on the decrease speed of the motor current ID and becomes longer as the decrease speed slows down.

When the CMP2 output again changes from low level to high level and the T1 is turned on, the motor current ID begins to increase. Thus, although the output of CMP1 goes from low level to high level, the C2 is kept discharged while the output of CMP1 is lower than the electrical potential of C2. A period of time from the output of CMP2 goes to high level until the CMP1 output becomes equal to the electrical potential of the capacitor C2 is set as time t3. When the output of CMP1 exceeds the C2 potential, the C2 begins to be charged. Time t4 is a period of time during which the electrical charge whose amount is equal to the amount of electrical charge discharged in the time t3 is charged. When the time t4 passes, the output of CMP2 changes to low level, and the T1 is turned off. That is, the output of CMP2 is maintained at high level while the time t3+t4. While the time t3+t4 is decided by the response speed of the OP AMP and an increasing speed of the motor current ID, since the response speed of the OP AMP is constant, the time t3+t4 depends on the increasing speed of the motor current ID and becomes shorter as the increasing speed becomes fast.

(d) The forward voltage drop of the diode D21 is employed to set a jamming detection reference value in order to make the jamming detection voltage constant, although the motor current ID changes, resulting in changes in the mean value of the Iref-f. However, in this method, since the forward voltage drop of the diode D21 cannot be changed in the case where it is needed to change the jamming detection voltage, the value of the resistor R24 is regulated. As seen in the explanation of section (b) described above, when the value of the resistor R24 is made greater, the jamming detection voltage becomes smaller, and conversely, as the value of the resistor R24 is made smaller, the jamming detection voltage becomes greater. It is possible to employ a resistor instead of the diode D21 in order to set the jamming detection reference value. In this case, in proportion to the increase in the motor current ID, the jamming detection voltage becomes greater.

2. Detailed Explanation of Current Limiting Circuit 7

2-1. Circuit Construction of Current Limiting Circuit 7

The current limiting circuit 7 of FIG. 3 has the NOR1, a third comparator CMP3, the reference voltage circuit 8, and the semiconductor switching element T1. The input terminal of the NOR1 is connected to the output terminal of the CMP2. The output terminal of the third comparator CMP3 is connected to the input terminal of the NOR1. The reference voltage circuit 8 is connected to the minus input terminal of the CMP3. The drain of the switching element T1 is connected to the plus input terminal of the CMP3. The source of the switching element T1 is grounded. A variable resistor R32 is connected to the gate of the switching element T1. The gate of the FET T31 is connected to the output of the NOR1. The drain of the FET T31 is connected to the resistor R32. The source of the FET T31 is grounded. A resistor R31 is connected between the plus terminal of the power supply VB and the drain of the T31. A resistor R33 is connected between the plus input terminal of the CMP3 and ground. A resistor R37 is connected between the output terminal of the CMP3 and the 5 V power supply.

The reference voltage circuit 8 has a resistor R35, a resistor R36, a resistor R34, a diode D31, and a FET (T32). The resistor R35 is connected between the minus input terminal of the CMP3 and the plus terminal of the power supply unit VB. The resistor R36 is connected between the minus input terminal of the CMP3 and grounding. The resistor R34 is connected to the minus input terminal of the CMP3. The anode of the diode D31 is connected to the resistor R34. The drain of the FET (T32) is connected to the cathode of the diode D31. The source of the FET (T32) is grounded. The gate of the FET (T32) is connected to the output terminal of the CMP3.

2-2. Explanation of Operations of Current Limiting Circuit 7

Limiting the motor current ID is performed by the combination of the current detection circuit 2 and the current limiting circuit 7 of FIG. 3. When the output of the comparator CMP2 of the current detection circuit 2 is at high level, the output of the NOR1 becomes low level. The transistor T31 is turned off. The switching element T1 is turned on. The case where the switching element T1 is an FET is explained. The plus input terminal voltage of the comparator CMP3 is connected to the drain of the switching element T1. A nearly grounding potential level is inputted to the plus input terminal voltage of the comparator CMP3.

The minus input terminal voltage of the CMP3 depends on the reference voltage circuit 8. It is set that R34=3.3K OHMS, R35=10K OHMS, and R36=24K OHMS. When the power supply voltage VB is 12.5 V, if the T32 is off, the minus input terminal voltage of the CMP3 becomes 8.82 V. If the T32 is on, the minus input terminal voltage of the CMP3 becomes 3.03 V. In any case, since the minus input terminal voltage of the CMP3 is not lower than 3.03 V, the CMP3 output becomes low level. Consequently, the T32 is turned off.

When the jamming occurs, the output of the comparator CMP2 becomes low level. The output of the NOR1 becomes high level. The T31 is turned on. The T1 is turned off. The drain voltage VDS of the T1 begins to increase from the grounding potential level. Since the T32 is off, the minus input terminal voltage of the CMP3 is 8.82 V. When the drain voltage VDS of the T1 becomes 8.82 V or greater, the output of the CMP3 changes to high level. The output of the NOR1 becomes low level. The T31 is turned off. The T1 is turned on. At the same time, the T32 is turned on. The minus input voltage of the CMP3 is lowered to 3.03 V. Accordingly, when the T1 once turned on, the T1 maintains an ON-state until the drain voltage VDS is lowered to 3.03 V or less.

When the drain voltage VDS of the T1 is lowered to 3.03 V or less, the output of the CMP3 again becomes low level. The T1 is turned off. Simultaneously, the T32 is turned off. The minus terminal input of the CMP3 increases to 8.82 V. The T1 maintains an OFF-state until the drain voltage VDS of the T1 exceeds 8.82 V.

This is one cycle of The ON/OFF operation. The state of the ON/OFF operation is continued as long as the output of the CMP2 is at a low level.

2-2-1. Constancy of Motor Current ID in ON/OFF Operation

Next, it is explained that the motor current ID hardly changes in one cycle of the ON/OFF operation when the ON/OFF operation is executed. When the motor is normally rotating before the jamming occurs, the T1 operates at an operating point A of FIG. 5. When the motor current ID changes, the operating point A rises and falls, for example, between the operating point A and an operating point B of the ohmic region. When the jamming occurs, the motor current ID increases. The operating point A of the T1 moves upward. When the operating point A of T1 reaches point B, the T1 is turned off. The current difference between point B and point A is the jamming detection reference value. During the T1 is turned off, the drain-source voltage VDS of the T1 increases. During the drain-source voltage VDS of the T1 increases, the operating point of T1 moves rightward on horizontal line passing through the point B. In other words, the drain current ID (motor current) maintains a current value at the time the T1 is turned off, while the drain-source voltage VDS of the T1 increases. This is because the gate-drain capacitance of the T1 becomes greater in appearance due to Miller effect while the drain-source voltage VDS at the T1 moves between the grounding potential level and the power supply voltage VB. Also, that is because gate-source voltage VGS hardly changes.

2-2-2. Millar Effect

Figure 6:
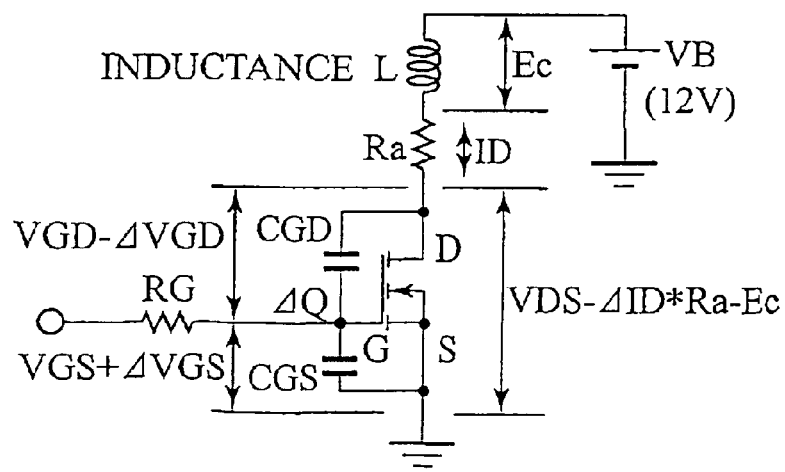
FIG. 6 is an equivalent circuit diagram of the semiconductor switching element T1 of the current limiting circuit 7 of the power window jamming protection device according to the first embodiment.

FIG. 6 is an equivalent circuit diagram of the switching element T1. It is assumed that the gate-source voltage VGS increases in a very small voltage ΔVGS through charging the gate of the T1 by a gate driver. Thus, the motor current ID increases to ΔID, and a counter electromotive force Ec (=L*dID/dt) is generated by the inductance L of the motor. The electrical charge ΔQ charged in the gate-drain capacitance CGD is expressed by the equation 5.

$$\Delta Q = CGD * (\Delta VGS + \Delta ID * Ra + Ec) \tag{5}$$

Here, Ra is an armature resistance. The capacitance Cm of CGD seen from the gate terminal is expressed by the equation 6.

$$Cm = \Delta Q / \Delta VGS = CGD * (1 + \Delta ID * Ra / \Delta VGS + Ec / \Delta VGS) \tag{6}$$

The capacitance Cm is "Millar capacitance" and is in appearance a capacitance generated by the fact that voltage change of both ends of the capacitance CGD is far greater than ΔVGS. When the gate driver charges and discharges the gate charge of FET via a gate resistor RG, the capacitance which can be seen from the driver side is not CGD but Cm. When the inductance L of the motor is large, the capacitance Cm becomes a value greater than CGD. At the time of the ON/OFF operation, even when the gate driver charges and discharges in the gate of the T1, the gate-source voltage VGS hardly changes. However, Miller effect is effective only when the drain potential VDS of the T1 can be between the grounding potential level (GND) and the power supply voltage (VB) and can freely change. At this time, since the T1 is in a pinch-off region, it is valid that ID=Gm*VGS, while Gm is the transmission conductance of the T1. From this equation it is understood that when the VGS is nearly constant, the ID does not change and is nearly constant.

Figure 5:
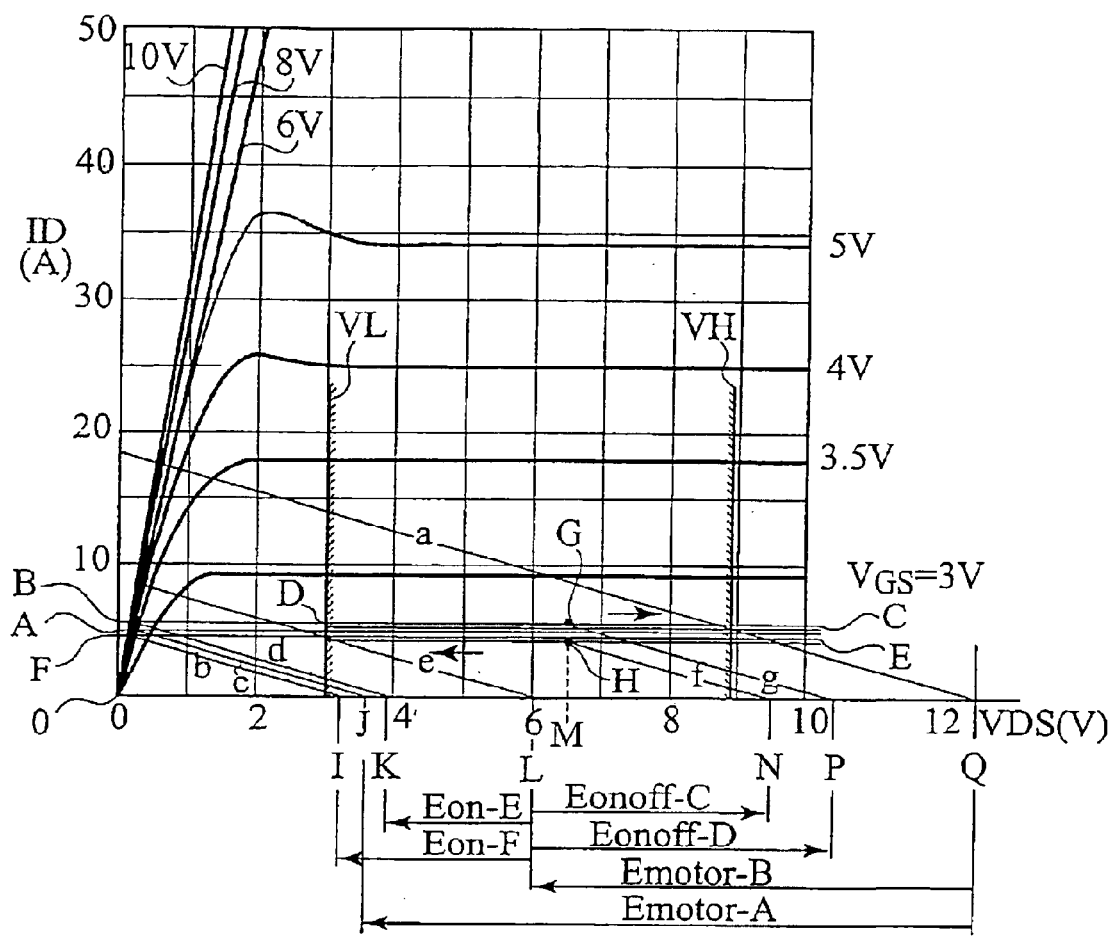
FIG. 5 is static characteristic curves with a load line of a semiconductor switching element T1 of a current limiting circuit 7 of the jamming protection device according to the first embodiment.

The minus input terminal voltages of the comparator CMP3 of the time the transistor T32 is turned on and off are represented by the lower reference voltage VL and the upper reference voltage VH in FIG. 5, respectively. From the circuit in FIG. 3, the lower reference voltage VL is 3.03 V and the upper reference voltage VH is 8.82 V. When the operating point of the T1 moves rightward on the horizontal line passing through the point B of FIG. 5 so that the drain voltage VDS becomes greater than the upper reference voltage VH, the CMP3 output becomes high level. The T1 is turned on. In an actual circuit, the T1 is turned on for a little while after the operating point exceeds the VH due to a delay of the circuit. In FIG. 5, the T1 is turned on at the point C where the VDS exceeds 10 V. The VDS decreases toward the grounding potential level. When the VDS becomes lower than the lower reference voltage VL, the output of the CMP3 becomes low level. The T1 is again turned off. Thus, the T1 continues the ON/OFF operation as long as the output of the CMP2 is at a low level.

2-2-3. Decrease of ID due to ON/OFF Operation

Next, it is explained that the drain current ID gradually decreases while the ON/OFF operation is continued. When the ON/OFF operation is begun, the drain voltage VDS of the T1 is regulated by the reference voltages VL and VH. The operating point of the T1 vibrates between the point C and the point D of FIG. 5. The mean value of the VDS at this time corresponds to the point G. The point G corresponds to almost the middle point between the point C and the point D. The point G is the DC operating point of the T1. On the contrary, a line segment CD is the AC operating line. In FIG. 5, the straight line a is the load curve a of the T1 When the motor 5 stops, and the power supply VB is 12.5 V. The slope of the load curve a is decided by the armature resistance Ra. The load curves b to g are parallel to the load curve a. The abscissas VDS of the load curves b to g represent the magnitudes of voltage drops in the motor 5 by the motor current ID.

First, the condition immediately before the jamming occurs is considered. The operating point of the T1 of this time is the point A Where the motor counter electromotive force is Emotor–A and the drain-source voltage is VDSon, equation 7 is valid.

$$VB = VDSon + Ra * ID + Emotor - A \tag{7}$$

Next, considered is the condition immediately after the jamming occurs where the ON/OFF operation has just begun. The ID is composed of an AC element IDA that fluctuates in synchronization with the ON/OFF operation and a DC element IDD that corresponds to an element other than the IDA. That is, the ID has a relationship of ID=IDA+IDD. When the IDD changes, the counter electromotive force Eonoff is generated by the motor inductance L. The magnitude of the Eonoff is found from equation 8.

$$Eonoff = L * d(IDD)/dt \tag{8}$$

Where the mean value of the drain-source voltage VDS of the T1 in the ON/OFF operation is the VDSonoff, the VDSonoff corresponds to VDS of the point G in FIG. 5. It is assumed that the rotational speed of the motor 5 does not change during one cycle of the ON/OFF operation. Since the ID also does not change, equation 9 is valid.

$$VB = VDSonoff + Ra * ID + Emotor - A + Eonoff \tag{9}$$

By subtracting both sides of the equation 9 from both sides of the equation 7, equation 10 can be obtained.

$$0 = VDSon - VDSonoff - Eonoff \quad Eonoff = VDSon - VDSonoff \tag{10}$$

Here, VDSon is the drain-source voltage of the continuous ON time and is approximately 0.3 V. The VDSonoff is the voltage of point G and is about 6.5 V. Thus, Eonoff becomes a minus value, −6.2 V, by equation 10. Since Eonoff becomes a minus value, it is understood from equation 8 that the IDD decreases.

2-2-4. Realization of Minimum Load Before Reverse Rotation (Prevention of Malfunction Due to Driving on a Rough and Bumpy Road)

The DC element IDD of the ID, while performing the ON/OFF operation, decreases from the operating point G toward an operating point H. The Iref-f decreases following the IDD. When the IDD reaches the point H, the CMP2 is reversed from low level to high level. The operating point of the T1 moves from point H to point F. The T1 operates the continuous ON. During the continuous ON, the ID increases to reach at the point B via the point A, and the T1 begins the ON/OFF operation again. Since the Iref-s does not change, the plus input terminal voltage of the CMP2 does not change. The point A is fixed, and with this fixing, the points B to F do not change. Consequently, the current value of the current ID is limited to a predetermined region while the ON/OFF operation and the continuous ON-state are alternately repeated.

The mean value of the current ID limited to this predetermined region is maintained at a value slightly greater than a current value of the ID which is in a condition immediately before the current limiting operation mode begins. This is significant in two ways.

The first is that since the motor torque is proportional to the current, the motor torque can be limited to a predetermined region. Thus, the jamming load can be limited.

The second is that possible malfunctions in the power window reversing occurring due to driving on a rough and bumpy road although the actual jamming is not occurring can be prevented. When the power window is operated during driving on a rough and bumpy road, due to the vertical movements of a vehicle body, the driving force of the power window changes. Momentarily the driving force of the power window increases, and with this increase the motor speed decreases. The ID increases. The T1 is turned off. There is a possibility that the current limiting operation mode begins. However, even if the current limiting operation mode begins, the driving force of the power window at the time immediately before the mode began is maintained. When the load due to the vertical movements of the vehicle body disappears, the motor speed can be restored to the original speed. Erroneous reversing can be avoided. However, it is a premise that the driving force of the power window does not change. This premise is valid in most of cases. By characteristics described above, the minimum load, of the driving force of the power window before the reverse rotation can be realized under the condition that erroneous reversing does not occur according to an increase in the momentary driving force due to driving on a rough and bumpy road.

2-2-5. Changes in ON/OFF Operation Time and Continuous ON Time With Decrease of Motor Speed Next, the equation 7 and the equation 9 are generalized. Once a period of time elapses after the jamming occurs, the motor speed decreases. Since the motor counter electromotive force is in proportion to the motor speed, where the motor counter electromotive force of that time is Emotor–B shown in FIG. 5, Emotor–B is smaller than Emotor–A. When the T1 becomes the continuous ON in the decreased rotational speed, that is, in a counter electromotive force of the magnitude of Emotor–B, the increase rate of the ID becomes greater than that before the jamming occurs, so that a counter electromotive force Eon is generated by the inductance L of the motor 5. It is given that Eon=L*dID/dt. The Eon does not exist in equation 7, and where equation 7 is rewritten employing it, equation 11 is given.

$$VB=VDSon+Ra*ID+Emotor-B+Eon \quad (11)$$

Where it is assumed that the motor speed does not change in the continuous ON and the ON/OFF operation, the equation 12 is given by the equation 9 of the ON/OFF operation corresponding to the equation 11, by replacing Emotor–A of equation 9 with Emotor–B,. Equation 13 is given by equation 11 and equation 12.

$$VB=VDSonoff+Ra*ID+Emotor-B+Eonoff \quad (12)$$

$$Eon-Eonoff=VDSonoff-VDSon=6.5\ V-0.3\ V=6.2\ V \quad (13)$$

Since the sign of Eon is plus and the sign of Eonoff is minus, the equation 13 means that the sign of the counter electromotive force Eon of the continuous ON time is opposite to the sign of the counter electromotive force Eonoff of the ON/OFF operation time, and that the sum of the absolute values of both parties becomes constant. That is, the sum of the absolute values is equal to the difference of the VDSonoff and the VDSon (VDSonoff–VDSon). The difference in the VDSonoff and the VDSon is constant regardless of the motor speed. As the motor speed decreases, Emotor–B decreases. The absolute value of Eonoff becomes smaller. The absolute value of Eon becomes greater. That is, when the motor speed decreases, the decreasing rate of the ID at the ON/OFF operation time is reduced. The increasing rate of the ID of the continuous ON time becomes greater.

Further, as seen in FIG. 5, the Eonoff-C at the point H when it get out of the ON/OFF operation is smaller than the Eonoff-D at the point G immediately after it begins the ON/OFF operation. This indicates that the decrease rate of the motor current ID gradually decreases during the ON/OFF operation. That Eon–E is smaller than Eon–F in FIG. 5 indicates that the increase rate of the motor current ID gradually decreases during the continuous ON.

2-2-6. Cycle of ON/OFF Operation

When the T31 is turned on, the gate charge of the T1 is discharged through the R32, and the gate-source voltage VGS of the T1 begins to decrease. Since ID=Gm*VGS, the ID begins to decrease. Due to the decrease in the ID, the counter electromotive force Ec by the inductance L of the motor 5 is generated, and at the same time the voltage drop by the armature resistance Ra decreases although the voltage drop is small. The voltage drop of the motor 5 is reduced only by the drop ΔVM (=Ec+Ra*ΔID). The ΔID represents the decreasing of the ID. The counter electromotive force Ec is found from Ec=L*ΔID/Δt. It is assumed that the motor speed does not change during one cycle of the ON/OFF operation.

The drain voltage VDS of the T1 (which is equal to the drain-source voltage since the source is grounded) begins to increase by a reduction ΔVM of the voltage drop of the motor 5. The gate-drain voltage of the T1 expands by only ΔVM. The gate-drain capacitance CGD is charged to raise the gate-drain voltage by only ΔVM. By this charging since an electrical charge is supplied to the gate, even when an electrical charge is discharged through the R32, the gate charge does not decrease. Consequently, the gate-source voltage VGS shows hardly any substantial decrease. This is the Miller effect.

As the discharging through the R32 continues, the VDS increases. When it exceeds the reference voltage VH, the T31 is turned off. Current flows into the gate of the T1 via the resistors R31 and R32 from the power supply unit VB. The gate of the T1 begins to be charged. When the gate-source voltage VGS begins to increase by the charging of the gate, the ID increases. The gate charge is absorbed by Miller effect similarly to the case where the gate charge is discharged. Thus, the gate-source voltage VGS shows hardly any substantial changes. That is, the electrical charge charged via the R31 and the R32 is canceled by Miller effect. As the charging of the gate progresses, the VDS reduces. When it falls below the reference voltage VL, the CMP3 output becomes low. The T1 begins the OFF state.

The amount of electrical charge for supplying, or canceling electrical charge to the gate of the T1 by Miller effect is determined by the reference voltages VL and VH and is a constant amount. The time required for the gate circuit to charge and then discharge such amount of electrical charge corresponds to one cycle of the ON/OFF operation. The charging time of the gate is determined by the power supply voltage VB and the gate resistors R31+R32, and the discharging time is determined by the gate resistor R32. That is, the cycle of the ON/OFF operation is determined by the reference voltages VL and VH, the power supply voltage VB, and the gate resistors R31 and R32. Therefore, the cycle of the ON/OFF operation can be changed by changing the gate resistor, more specifically, the resistor R32.

3. Explanation of Jamming Determination Circuit 6
3-1. Circuit Construction of Jamming Determination Circuit 6

The jamming determination circuit 6 of FIG. 3 includes a 16 pulse counter 6 whose input terminal is connected to the output terminal of the CMP3 of the current limiting circuit 7 and which is reset when it does not count for 80μ second.

3-2. Explanation of Operation of Jamming Determination Circuit 6

In the jamming protection device, first, the jamming is detected by the current detection circuit 2. Then, the current limitation is performed by the current limiting circuit 7 so that the motor current ID is maintained in a predetermined region. Finally, it is determined whether or not the jamming has occurred by the jamming determination circuit 6. This determination method is explained. When the motor speed decreases by the jamming, the ON/OFF operation time of the T1 is prolonged, and the continuous ON time of the T1 is shortened. Utilizing this characteristic, it is determined whether or not the jamming has occurred. There are three following specific determination methods.

(a) The ratio of the continuous ON time to the ON/OFF operation time is detected, and when the ratio reaches a predetermined value, it is determined that the jamming has occurred. The continuous ON time and the ON/OFF operation time are measured on the CMP2 output. That the output of the CMP2 is high level means the continuous ON, and that it is low-level means the ON/OFF operation. Thus, the output of the CMP2 is averaged as an analogue signal so that the aiming ratio can be measured.

(b) The time of the continuous ON or the ON/OFF operation is measured, and when the time reaches a predetermined value, it is determined that the jamming has occurred. The time of the high level or the low level of the output of the CMP2 is measured to make the determination.

(c) The number of the ON state or the OFF state during the ON/OFF operation is counted, and when the number reaches a predetermined value, it is determined that the jamming has occurred. As shown in FIG. 3, the number of rising to the high level of the output of the CMP3 is counted, and when the number reaches 16 pulses, it is determined that the jamming has occurred. The counter 6 does not count the ON state including the continuous ON time, the counter 6 is reset when pulses are interrupted for a predetermined time. In FIG. 3, if the CMP3 output does not change for 80 μs, the counter 6 is reset. The criterion of the rotational speed on the determination of the jamming is set to about 60% decreased the rotational speed before the jamming occurs. This criterion of the rotational speed is a value of a level that does not occur by a drop of the rotational speed due to a shocking load fluctuation generated through a rough and bumpy road.

3-2-1. Setting Predetermined Value for Jamming Determination

The following is a summary of a setting method of the predetermined value for the jamming determination.

(i) The predetermined value for the jamming determination is set to a level which is not generated by a drop in the motor rotational speed due to a shocking fluctuation by driving on a rough and bumpy road.

(ii) Since the ON/OFF operation time depends on the OFF delay time of the T1 and the responsibility of the OP AMP employed in the CMP1, supposing normal values of these characteristics, the number of the ON/OFF times corresponding to the above predetermined value is determined to set the number of the pulses need the counter 6 to output a signal.

(iii) When it is necessary to regulate the predetermined value for the jamming determination since the OFF delay time of the T1 and the OP AMP responsibility vary widely, the gate series resistance R32 is changed to change the cycle of the ON/OFF operation. Thus, fixing the number of the pulses for the counter 6 to output a signal becomes possible even if the OFF delay time of the T1 and the responsibility of the OP AMP vary widely. Fixing the number of the pulses for the counter 6 to output a signal is convenient in the case where this circuit is made on an IC chip.

3-2-2. Change of Motor Speed in ON/OFF Operation Time

The ON/OFF operation time is prolonged and the continuous ON time is shortened due to the reduction of the motor speed. There is the assumption that the motor speed hardly changes during one cycle of the ON/OFF operation. This is proved by a fact in which the motor 5 keeps pressing the power window by a constant force even at the ON/OFF operation time. Since the voltage between the motor terminals at the ON/OFF operation is VB minus VDSonoff (VB−VDSonoff), equation 14 is given where the motor output is Pm.

$$Pm=(VB-VDSonoff)*ID-Ra*ID^2=(VB-VDSonoff-Ra*ID)*ID=(Emotor-Eonoff)*ID \quad (14)$$

The following is clear from the equation 14.

(i) The motor outputs a nearly constant output regardless of its rotational speed during the time of the ON/OFF operation.

(ii) In the ON/OFF operation, the motor output reduces only to VDSonoff*ID compared with that at the continuous ON.

That is, the motor outputs a constant output even during the ON/OFF operation and drives the power window. This means that the motor 5 keeps pressing the power window and the motor speed constantly links with the velocity of the power window. Since the movement of the power window is slow it hardly changes in one cycle of the ON/OFF operation. Thus, the motor speed also hardly changes in the one ON/OFF cycle so that the assumption is valid.

As explained above, it is possible to provide the jamming protection device in which the motor current can be limited so that the jamming of a foreign object is quickly determined without an error.

Second Embodiment

Figure 7:
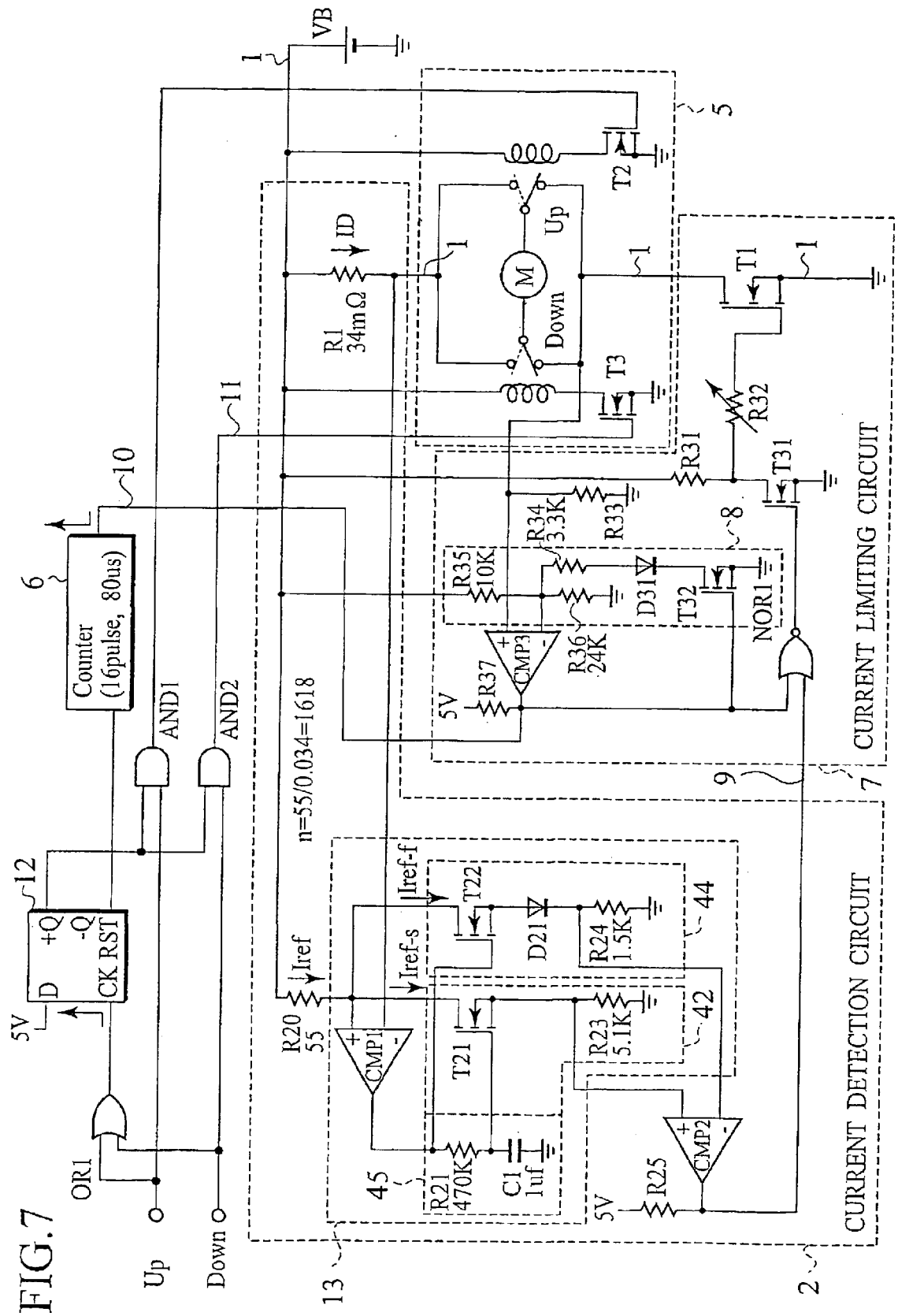
FIG. 7 is a circuit diagram of a jamming protection device according to a second embodiment.

In the jamming protection device according to the second embodiment as shown in FIG. 7, the current following circuit 13 differ from the current following circuit 3 of the first embodiment of FIG. 3. In the current following circuit 13, the fast charge discharge circuit 43 and the resistor R28 are removed from the current following circuit 3, and with these changes, the resistance value of the resistor R21 is changed in order to maintain the time constant of the slow charge discharge circuit 45.

These changes result in a case in which the time constant of the fast charge discharge circuit 43 of FIG. 3 is made to be zero and the following speed of the fast following current Iref-f is made to be infinity. Thus, while the operation of the jamming protection device of the second embodiment is basically the same as that of the jamming protection device of the first embodiment circuit of FIG. 3, the operation of the current following circuit 13 in particular can also be interpreted as follows.

The fast charge discharge circuit 43 is gone, and a variation of the fast following current Iref-f flowing in the fast source follower circuit 44 constantly becomes 1/n of a variation of the motor current ID including the ON/OFF operation time, and the voltage variation generated between both ends of the resistor R24 corresponds to the voltage variation generated between both ends of the shunt resistor R1 as the following equation 15 where $\Delta$Iref-f and $\Delta$ID are each variation of Iref-f and ID respectively.

$$\Delta iref\text{-}f*R24/(\Delta ID*R1)=R24/(n*R1)=1.5K\ \Omega/(1618*0.034\Omega)=27 \quad (15)$$

That is, a voltage variation produced by amplifying, by 27.3, the voltage variation of the shunt resistor R1 which is proportional to a variation of the motor current ID is generated between both sides of the resistor R24, and a voltage obtained by averaging this voltage variation by an integrating circuit composed of the R21 and the C1 is generated between both ends of the R23. The respective voltages generated are compared by the CMP2 in the operation.

Third Embodiment

Figure 8:
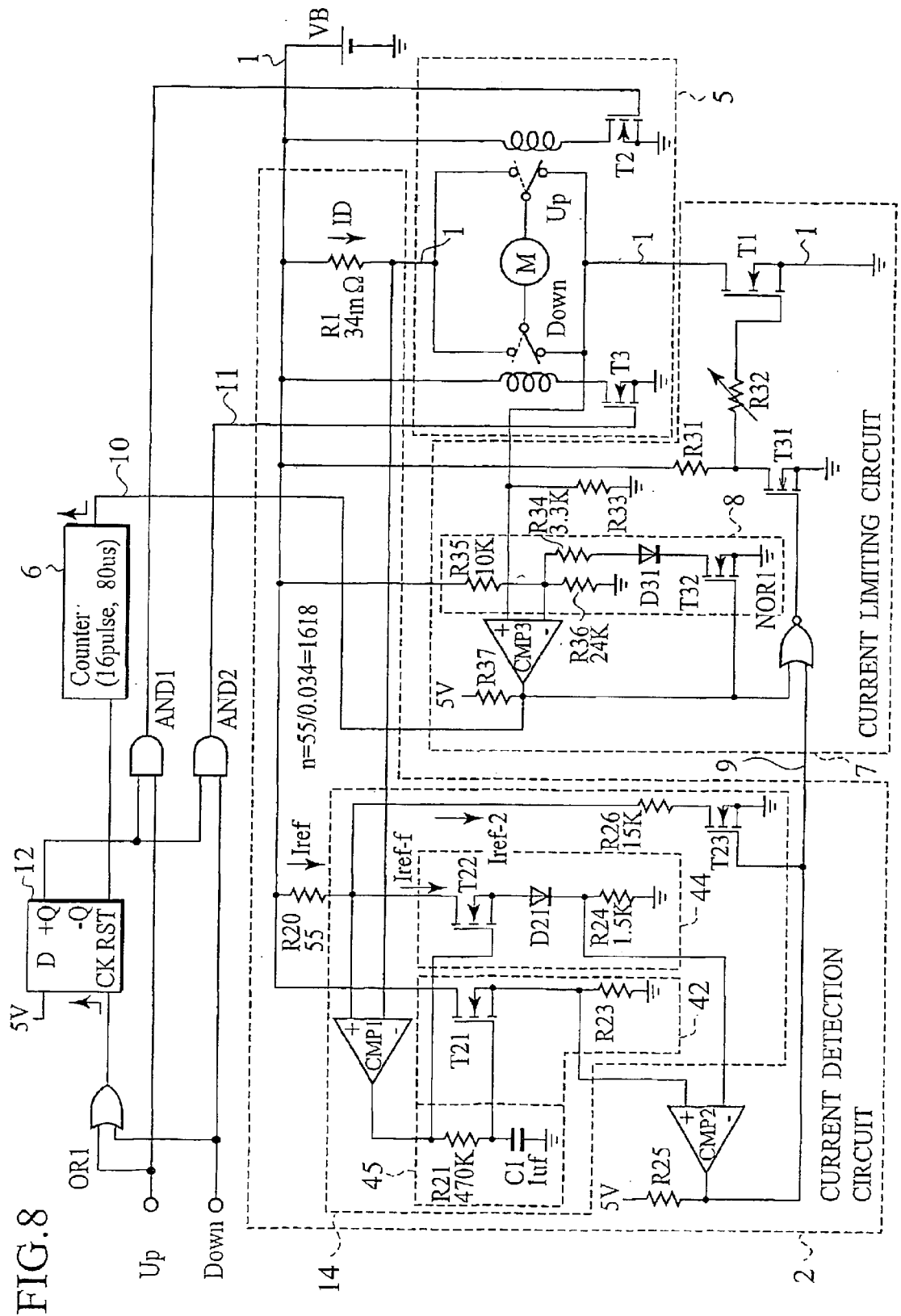
FIG. 8 is a circuit diagram of a jamming protection device according to a third embodiment.

In the power window jamming protection device according to the third embodiment as shown in FIG. 8, the current following circuits 13 and 14 differ, compared with the jamming protection device according to the second embodiment of FIG. 7. There are two different points in these circuits as follows.

(a) The drain of the transistor T21 is directly connected not to the reference resistor R20 but to the power supply VB.

(b) Added are a resistor R26 connected to the plus input terminal of the CMP1 and a transistor T23 in which the drain is connected to the resistor R26, the source is grounded, and the gate is connected to the output terminal of the CMP2. (Operations of Jamming Protection Device of Third Embodiment)

The motor current ID is converted into a voltage by the shunt resistor R1. Since the CMP1 is controlled so that its plus input terminal voltage and minus input terminal voltage are constantly equal, the reference current Iref flowing in the reference resistor R20 is in proportion to the ID, and thus it is given that Iref*n=ID. Accordingly, where the magnitude of the change in the Iref of the time the motor current ID changes only $\Delta$ID is $\Delta$ Iref, it is given that $\Delta$Iref*n=$\Delta$ID.

When jamming is not occurring, since the transistor T23 is on, the current element Iref-2 of the Iref flows via the R26 and the T23. That is, it is given that Iref=Iref-f+Iref-2. Since the Iref-2 cannot change, a change $\Delta$Iref of Iref is all reflected in the Iref-f so that a voltage change $\Delta$VR24 expressed by equation 16 is generated in the resistor R24 in which the Iref-f flows.

$$\Delta VR24=\Delta Iref*R24=(\Delta ID/n)*R24 \quad (16)$$

When the ratio with respect to the voltage change $\Delta$VR1 (=$\Delta$ID*R1) generated in the shunt resistor R1 is calculated, it is clear that the voltage change of both ends of the shunt resistor R1 is amplified 27.3 times to be generated between both ends of the resistor R24 as shown in equation 17.

$$\Delta VR24/\Delta VR1=(R24/R1)/n=(1.5K\ \Omega/34\ m\Omega)/1618=27.3 \quad (17)$$

Although there is a voltage difference generated by adding up the forward voltage drop of the diode D21 and the gate-source voltage of the T22 between the output of the CMP1 and the ungrounded side potential of the R24, since this voltage difference can be deemed as a constant value, the output change of the CMP1 is equal to the change in the ungrounded side potential of the R24. Thus, the magnitude of the change in the ungrounded side potential of the capacitor C1 corresponds to the magnitude obtained by averaging the magnitudes of the changes in the ungrounded side potential of the R24, $\Delta$VR24, by a time constant R21*C1. The ungrounded side potential of the capacitor C1 is reflected in the source of the transistor T21, that is, the plus input terminal of the CMP2, except for a difference in a dc voltage. On the other hand, the ungrounded side potential of the R24 is inputted to the minus input terminal of the CMP2. However, the dc voltage difference of 0.7 V that is the magnitude of the forward voltage drop of the diode D21 is added between the plus input terminal and the minus input terminal.

As the above-described circumstances are reorganized, the magnitude of change of the ID, $\Delta$ID, is converted into a voltage to become $\Delta$VR1 by the shunt resistor R1. The $\Delta$VR1 is multiplied by 27.3 to become $\Delta$VR24 and is added to the minus input terminal of the CMP2. The current-voltage conversion ratio of this time ($\Delta$VR24/$\Delta$ID) is expressed by equation 18.

$$\Delta VR24/\Delta ID=27.3*R1*\Delta ID/\Delta ID=27.3*34\ m\ \Omega=928\ mV/A \quad (18)$$

The mean value of the $\Delta$VR24 is added to the plus input terminal of the CMP2, and the dc voltage difference of 0.7 V is added between the plus input terminal and the minus input terminal thereof.

A pulsating current element is contained in the motor current ID. Where the total amplitude of the pulsating current is 0.5A, the magnitude of voltage fluctuation of 928 mV*0.5 A=464 mV is contained in $\Delta$VR24. That is, since there is a fluctuation of +/−232 mV in one side amplitude, when a voltage increase of 0.7 V−0.232 V=0.468 V is generated, the CMP2 output changes from high level to low level. That is, 0.468 V becomes the jamming detection voltage. When 0.468 V is converted into the ID, it becomes 0.5 A (=0.468 V/R24*n). When the ID increases by 0.5 A, the CMP2 output reverses.

When the CMP2 output becomes low level, the transistor T23 is turned off, and the current Iref-2 disappears. At this time since the ID does not change, the reference current Iref does not change. Thus, the Iref-f increases by only the magnitude of Iref-2 disappeared. Therefore, the voltage drop of the R24 increases, and the minus input terminal voltage of the CMP2 increases. Its increase rate becomes Iref-2*R24. When the CMP2 output becomes low level, the ON/OFF operation begins, and the ID decreases. When the magnitude of reduction of Iref due to the decrease in the ID exceeds Iref-2, the CMP2 again changes to high level, and the ID is in the continuous ON and begins to increase. When the CMP2 output becomes high level, the T23 is turned on, the Iref-2 flows, for such magnitude the Iref-f decreases, and the CMP2 minus terminal voltage decreases only by Iref-2*R24. When the magnitude of increase of the Iref due to the increase in the ID exceeds the Iref-2, the CMP2 changes to low level. When the CMP2 output becomes low level, since the FET T1 has an OFF delay, the ID increases during this delay. Accordingly, the ID has to decrease by a magnitude including not only the Iref-2 but also the magnitude of ID increase due to the delay while the CMP2 is in its low level.

The maximum value of the motor current ID during the motor current ID limiting in which the ON/OFF operation and the continuous ON are repeated becomes a value obtained by adding the jamming detection value 0.5 A (0.468 V) to the ID mean value before the jamming. The minimum current value is determined by the magnitude of the Iref-2. Thus, the ID mean value of the current limiting operation time can be arbitrarily set by regulating the value of the Iref-2.

The above is the operations of the circuit of FIG. 8, and differences from the circuit of FIG. 3 are summarized as follows.

(i) The Iref-f of FIG. 3 is not exactly a change in the ID itself. The ΔIref-f*n is not equal to the ΔID. The voltage difference generated between both ends of the resistor R22 indicates that there is a gap between the ID and the Iref Therefore, the voltage drop ΔVR24 generated in the resistor R24 by the ΔIref-f does not correctly indicate the ΔID. It may be greater or smaller than the ΔID. That is, the amplitude of ΔVR24 becomes greater than a magnitude corresponding to the ΔID. Thus, the jamming determination value becomes substantially small, and the ON/OFF operation is easily begun. This means that occasions at which a malfunction occurs due to a shocking load fluctuation due to driving on a rough and bumpy road or the like increase.

On the other hand, in FIG. 8, ΔVR24 correctly represents ΔID, and thus influence due to a gap from the ΔID is not produced.

(ii) In the circuit of FIG. 3, at the ON/OFF operation time, the fluctuation of the CMP1 output becomes greater so that saturation occurs at high level and low level. The gap of the CMP2 minus input terminal voltage from the ΔID becomes greater, and the CMP2 minus input terminal voltage comes to be different from the change of the ID. Since the CMP2 plus input terminal voltage does not change and the ΔID does not correspond to the change in the CMP2 minus input terminal voltage even when the minus input terminal voltage is compared with the plus input terminal voltage and is controlled, the ID increases gradually when the motor speed comes to decrease during the current limiting operation.

On the other hand, in FIG. 8, since the change in the motor current is reflected on the CMP2 minus terminal voltage, a peak value of a motor current ID during the current limiting operation is maintained constant.

(iii) In FIG. 3, the ON/OFF operation time is determined by the OFF delay of the T1, the response delay of the CMP1, and the motor speed. Among these, the influence of the response delay time of the CMP1 is large. As shown in FIG. 8, although control employing Iref-2 is possible, there is a sufficient ON/OFF operation time even at Iref-2=0 A. If the Iref-2 is employed, the ON/OFF operation time becomes too long, which is not preferable from the viewpoint of control. That is, the ON/OFF operation time cannot be controlled from outside. However, in the method of FIG. 7 in which the following speed of the Iref-f is made infinity, control employing the Iref-2 is possible.

On the other hand, in FIG. 8, although it is the same as the circumstance of FIG. 3 that the delay of the T1 and the motor speed become primary factors to determine the ON/OFF operation time, the response delay of the CMP1 does not influence it. Further, by employing the Iref-2, the ON/OFF operation time can be controlled so that it becomes a substantially arbitrary value. When the Iref-2 is increased, the ON/OFF operation time becomes longer, and thus the minimum value of the ID can be decreased. Since, at the current limiting time, the maximum value of the ID is kept constant and the minimum value can be controlled; the mean current value of the ID at the current limiting time can be set to a desired value.

(iv) In FIG. 3 and FIG. 7, the Iref-s, as a part of the Iref, flows being connected with the potential of the C1. When the ID increases as the jamming occurs, although the electrical potential of the C1 hardly increases, still it is not zero. The Iref-s increases corresponding to the magnitude of an increase of the C1 potential and only by that magnitude, the magnitude of increase of the Iref-f decreases. That is, the detection sensibility is dulled only by that magnitude. On the other hand, in FIG. 8, although the increase in the C1 potential occurs at the same time as jamming, since the increase in C1 does not relate to the Iref, the increase of Iref-f is not restrained by the increase of C1. Thus, reduction in detection sensibility due to the increase in the C1 potential disappears, and more correct control can be realized.

As understood from the facts described above, the circuit of FIG. 8 is superior to that of FIG. 3 as a control system for jamming protection.

Fourth Embodiment

Figure 9:
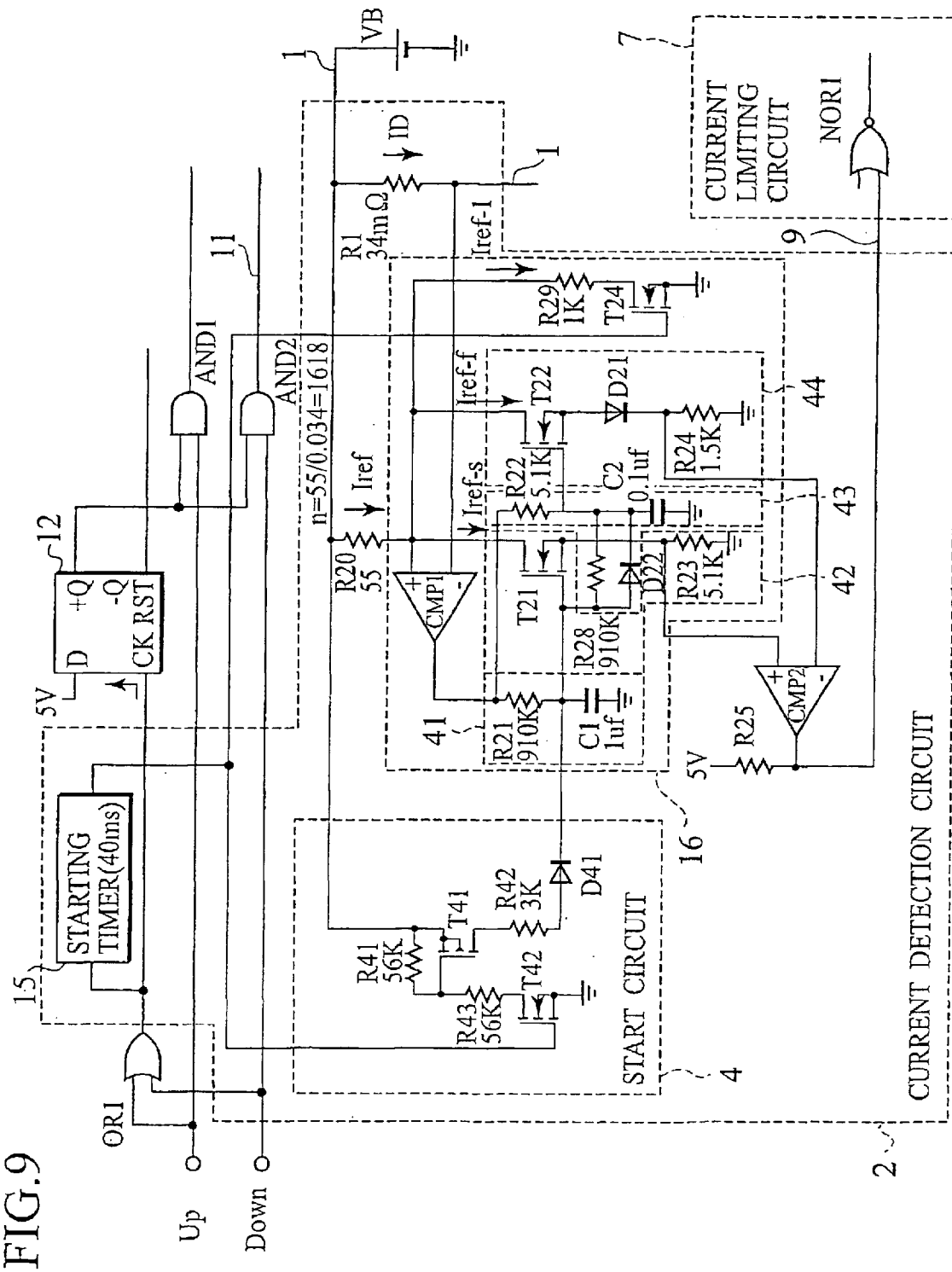
FIG. 9 is a circuit diagram of a jamming protection device according to a fourth embodiment.

In the jamming protection device according to the fourth embodiment as shown in FIG. 9, the current detection circuit 2 is different compared to the jamming protection device according to the first embodiment of FIG. 3. The mention of the current limiting circuit 7, the motor 5 and the jamming determination circuits 6 are simplified or omitted in FIG. 9. There are two different points in the current detection circuit 2 as follows.

(a) The current following circuit 16 differs from the current following circuit 3. In the current following circuit 16, added to the current following circuit 3 are a resistor R29 connected to the plus input terminal of the CMP1, a transistor T24 in which the drain is connected to the resistor R29, the source is grounded, and the gate is connected to the output terminal of a starting timer 15, and a diode D22 in which the anode is connected to the capacitor C1 and the cathode is connected to the capacitor C2.

(b) Added are the starting timer 15 whose input terminal is connected to the input terminal of WINDOW-UP (UP) and a start circuit 4 connected to the output terminal of the starting timer 15 and the current following circuit 16.

The start circuit 4 includes an n type MOS FET T42 whose gate is connected to the starting timer 15 and whose source is grounded, a resistor R43 connected to the drain of the T42, p type MOS FET T41 whose gate is connected to the resistor R43 and whose source is connected to the plus terminal of the power supply unit VB, a resistor R41 connected between the gate and the source of the T41, a resistor R42 connected to the drain of the T41, and a diode D41 whose anode is connected to the resistor R42 and whose cathode is connected to the gate of the T21.

(Operations Jamming Protection Device of Fourth Embodiment)

A rush current masking period is provided in order that the ON/OFF operation is not performed by a rise of the motor starting current ID (rush current) when the motor is started by a WINDOW-UP (UP) or WINDOW-DOWN (DOWN) signal. It is preferable to operate a jamming protection function immediately after the motor 5 starts from the point of view of a safety device. In a method in which a pulse sensor is employed since resolution for pulses is poor and time is needed for pulses to become stable, it is difficult to operate the jamming protection function immediately after the motor starts. Since the responses are fast in a current detection method of the fourth embodiment, it is possible to operate the jamming protection function immediately after starting, and therefore a superior function than that of a pulse sensor method can be realized as a safety device.

(Motor 5 Rotates During Rush Current Masking Period)

When the WINDOW-UP signal or the WINDOW-DOWN signal is generated, the starting timer 15 is operated, the transistor T24 in the current detection circuit 2 is turned on, and the rush reference current Iref-1 flows only for the rush current masking period. The magnitude of the rush reference current Iref-1 is determined by the power supply voltage VB and the resistor R29. The T42 of the start circuit 4 is turned on, and the T41 is turned on. Thus, the capacitors C1 and C2 are charged nearly to the voltages determined by the R42 and R22. The Iref-1 is set so that the value obtained by multiplying the total reference current by n is greater than the rush current as the motor current ID. That is, the Iref-1 is set so that the expression 19 is valid.

$$\text{(maximum rush current as the } ID) < n^*(Iref\text{-}s + Iref\text{-}f + Iref\text{-}1) \quad (19)$$

Thus, since the CMP1 output becomes low level during the rush current masking period, the charging current flows in the course from the power supply voltage VB to the transistor T41, to the resistor R42 therefrom, to the diode D41, to the capacitors C1 and the diode D22, to the capacitors C2 and the resistor R22, to the CMP1 output, and to the grounding. The electrical potentials of the capacitors C1 and C2 are expressed as equation 20 and equation 21.

$$(C1 \text{ potential}) = (VB - 2*0.7(V) - (CMP1\text{output}))*R22/(R42 + R22) + 0.7(V) + (CMP1\text{output}) \quad (20)$$

$$(C2 \text{ potential}) = (VB - 2*0.7(V) - (CMP1\text{output}))*R22/(R42 + R22) + (CMP1\text{output}) \quad (21)$$

The forward voltage drop of the diode is set to 0.7 V. The power supply voltage VB is 12.5 V, CMP output low level is 2 V, R42 is 3K Ω, and R22 is 5.1KΩ. Thus it is given that C1 potential is 8.3 V and C2 potential is 7.7 V. When the rush current masking period ends and the starting timer 15 stops, the T43 and T41 are turned off. At this time if the motor current decreases so that the CMP1 output remains in low level, the electrical charge of the C1 and C2 is discharged in the course from the diode D22 to the resistor R22 and to the CMP1 output so as to immediately begin a following operation. Thus, in this state, when the jamming occurs, the jamming is instantly detected so that the motor 5 can be stopped.

(Motor 5 Does Not Rotate After WINDOW-UP Signal is Inputted)

In this case, since motor lock current as the motor current ID begins to flow when the starting timer 15 stops, the CMP1 output becomes, high level, and the C2 potential is instantly charged to the high level output of the CMP1 via the resistor R22. Since the C1 is charged by a long time constant, the electrical potential of the C1 hardly increases. Therefore, the minus input terminal voltage becomes greater than the plus input terminal voltage in the CMP2, and the CMP2 output becomes low level. The T1 performs the ON/OFF operation. The continuous ON does not begin. Thus the jamming determination is immediately performed so that the reversal operation is performed.

Even when the motor rotates after generating the WINDOW-UP signal, in the case where the CMP1 output is high level at the starting timer 15 stopping, the ON/OFF operation begins immediately. When the ON/OFF operation and the continuous ON are continued, if the motor current ID starts to decrease, a normal operation begins so that the motor continues rotating. If the motor current ID increases due to jamming, a jamming determination is performed so that the motor is operated to reverse. It is necessary that the R41 and R22 are set to resistance values so that the reversing does not occur when the jamming is not occurring.

First Modification of Fourth Embodiment

Figure 10:
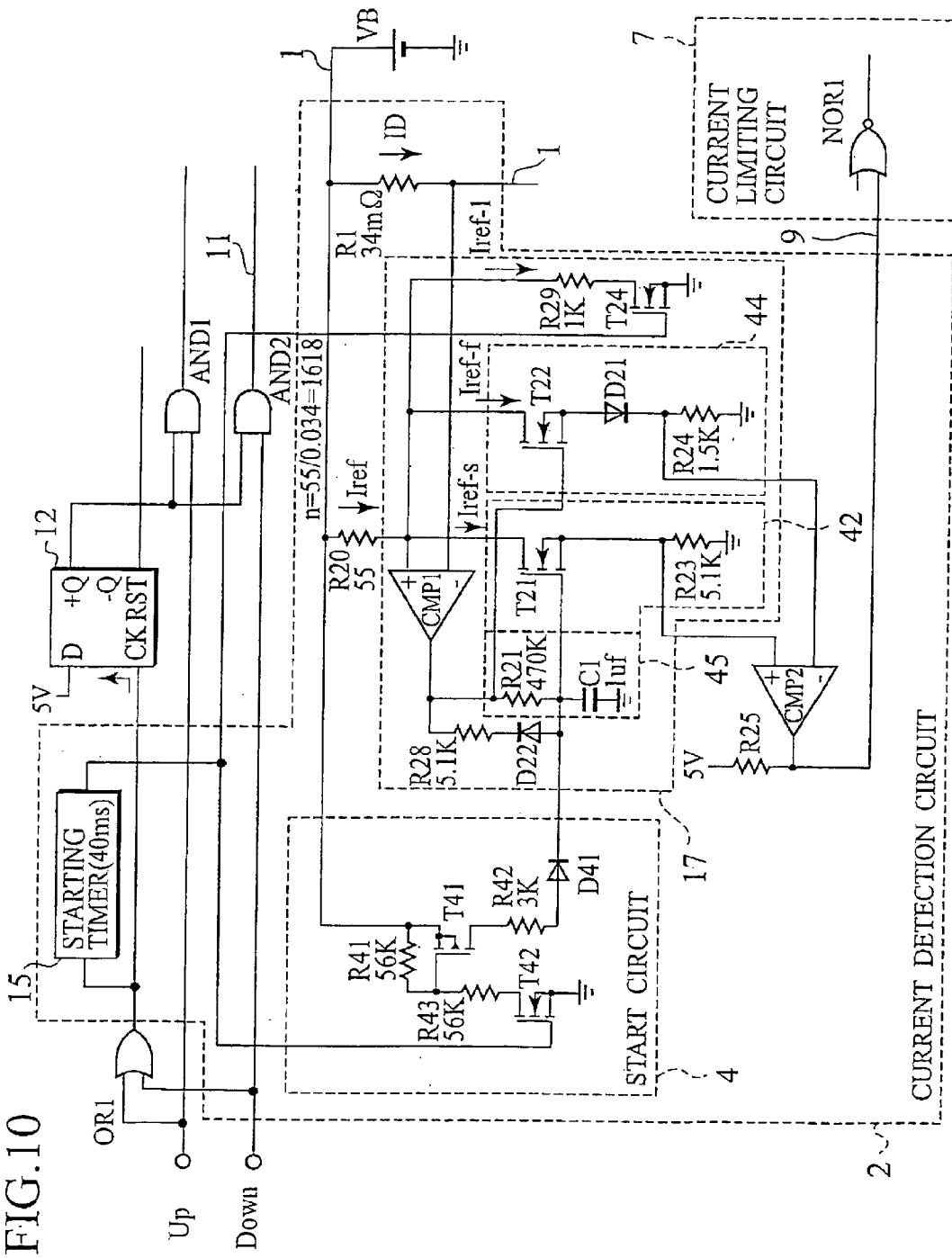
FIG. 10 is a circuit diagram of a jamming protection device according to a modified example 1 of the fourth embodiment.

In the jamming protection device according to the first modified of the fourth embodiment as shown in FIG. 10, the current detection circuit 2 is different from the current detection circuit 2 of the jamming protection device of the second embodiment of FIG. 7. There are two different points in the current detection circuits 2 as follows.

(a) The current following circuit 17 differs from the current following circuit 13. In the current following circuit 17, added to the current following circuit 13 are the resistor R29 connected to the plus input terminal of the CMP1, the transistor T24 in which the drain is connected to the resistor R29, the source is grounded, and the gate is connected to the output terminal of the starting timer 15, a diode D22 whose anode is connected to the capacitor C1, and a resistor R28 connected between the cathode of the diode D22 and the output terminal of the CMP1.

(b) Added are the starting timer 15 whose input terminal is connected to the input terminal of the WINDOW-UP (UP) and the start circuit 4 connected to the output terminal of the starting timer 15 and the current following circuit 17.

Thus, the circuit of FIG. 10 can realize a similar function with respect to the circuit of FIG. 7, similar to the circuit of FIG. 9 which realizes the jamming protection function just after the starting with respect to the circuit of FIG. 7.

(Second Modification of Fourth Embodiment)

Figure 11:
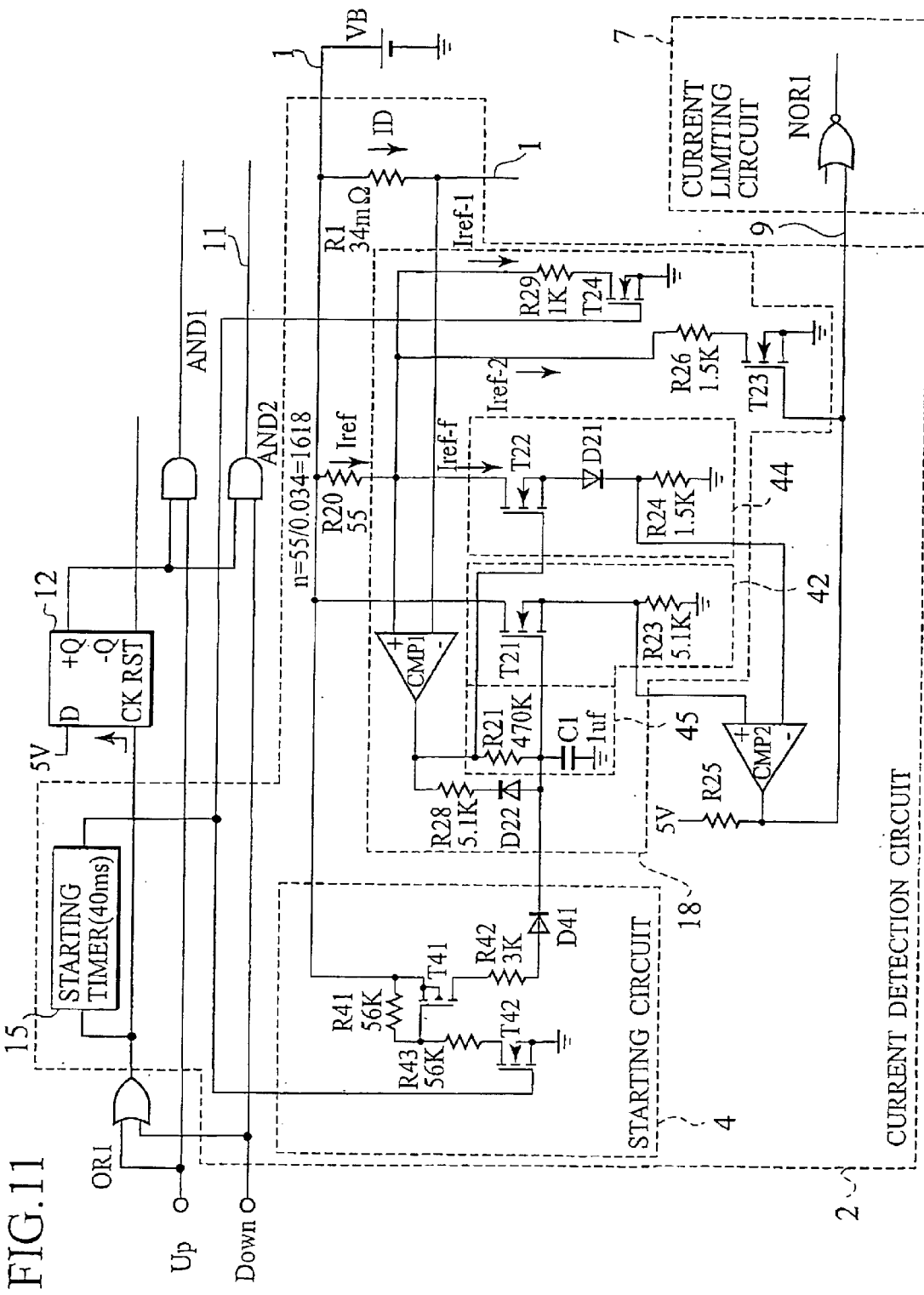
FIG. 11 is a circuit diagram of a jamming protection device according to a modified example 2 of the fourth embodiment.

In the jamming protection device according to the second modified of the fourth embodiment as shown in FIG. 11, the current detection circuit 2 is different compared with the jamming protection device according to the third embodiment of FIG. 8. There are two different points in the current detection circuits 2 as follows.

(a) The current following circuit 18 differs from the current following circuit 14. In the current following circuit 18, added to the current following circuit 14 are the resistor R29 connected to the plus input terminal of the CMP1, the transistor T24 in which the drain is connected to the resistor R29, the source is grounded, and the gate is connected to the output terminal of the starting timer 15, a diode D22 whose anode is connected to the capacitor C1, and the resistor R28 connected between the cathode of the diode D22 and the output terminal of the CMP1.

(b) Added are the starting timer 15 whose input terminal is connected to the input terminal of the WINDOW-UP (UP) and the start circuit 4 connected to the output terminal of the starting timer 15 and the current following circuit 18.

Thus, FIG. 11 can realize a similar function with respect to FIG. 8, similar to FIG. 9 which realizes the jamming protection function just after the starting with respect to FIG. 8.

Fifth Embodiment

Figure 12:
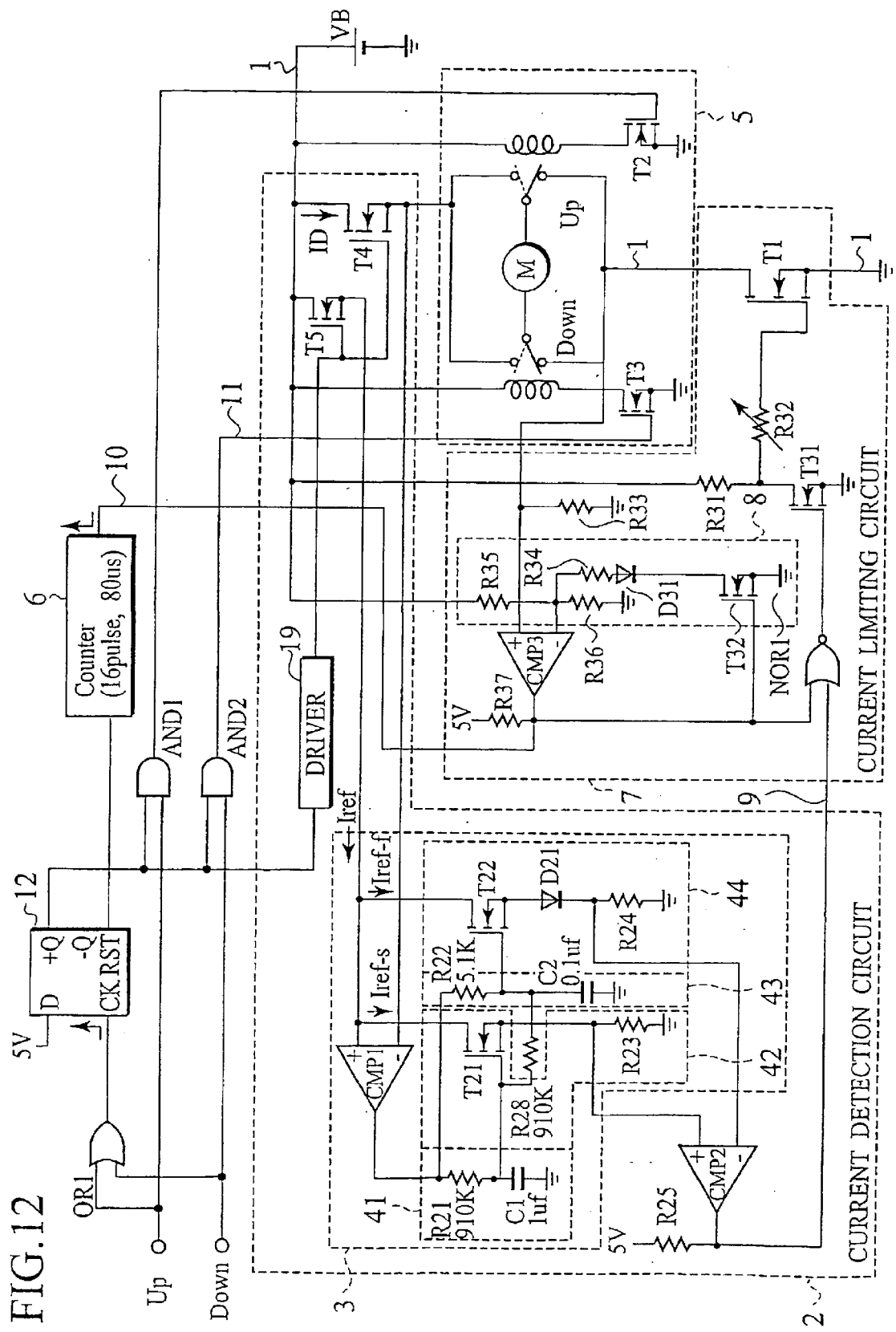
FIG. 12 is a circuit diagram of a jamming protection device according to a fifth embodiment.

In the jamming protection device according to the fifth embodiment as shown in FIG. 12, the current detection circuit 2 is different compared with the jamming protection device according to the first embodiment of FIG. 3. There is a point of difference in the current detection circuit 2 as follows.

The resistor R1 is removed, and instead of the R1, the drain and source terminals of the main FET T4 are connected. Similarly, the resistor R20 is removed, and instead of the R20, the drain and source of the reference FET T5 are connected. The driver 19 whose output terminal is connected to the gates T4 and T5 is provided. The T4 and T5 are composed of n type MOS FETs. The current detection circuit 2 has a multi-source FET instead of the multi-resistor. The multi-source FET is composed of a main FET T4 and a reference FET T5. Regarding the current sensing ratio (n) of the multi-source FET, the ratio n of the ON resistance that is the source-drain resistance of the reference FET T5 to the ON resistance that is the source-drain resistance of the main FET T4 is set to a value that exceeds 1 and preferably is 100 or greater, similar to the multi-resistor. The motor current ID flows in the main FET T4. The reference current Iref is controlled so that the reference current Iref meeting the condition of ID=n*Iref flows in the reference FET T5.

In the case where the main FET T4 is arranged in a high side of the motor 5, it is necessary for the source potential VSA of the main FET T4 and the source potential VSB of the reference FET T5 to meet the condition, VSA=VSB, in order to satisfy the condition of ID=n*Iref. When the motor is normally rotating, if the motor current ID changes by the fluctuation of the driving force of the window glass, the source potential VSA of the main FET also changes. By controlling the reference current Iref, the condition, VSA=VSB, is maintained.

Next, in a method of detecting the abnormal current generated by the jamming, similar to FIG. 3, the reference current Iref is divided into two current elements whose following speeds are different. The fast following current Iref-f correctly reflects changes in the motor current ID. By causing the fast following current Iref-f to flow in the resistor R24 whose resistance value is greater than the ON resistance of the reference FET T5, a change in the motor current ID is converted into a voltage. By this conversion of voltage, the fluctuation obtained by amplifying a minute fluctuation obtained by converting a change in the motor current ID into a voltage by the ON resistance of the main FET T4 can be detected.

When the jamming occurs, although the fast following current Iref-f increases following the motor current ID, the slow following current Iref-s hardly changes. Thus, a difference is generated between the mean value of the fast following current Iref-f and the slow following current Iref-s, causing a quantitative relationship that the mean of Iref-f is greater than Iref-s. When this quantitative difference exceeds a preset value, the abnormal current detection signal 9 is generated. As a result, by this signal 9, the multi-source FET T4 and T5 in a high side of the motor 5 or the semiconductor-switching element (FET or bipolar transistor) T1 of the current limiting circuit 7 in a low side (ground side) of the motor M is turned off.

Thereafter, while jamming occurs, the multi-source FET (T4 and T5) or the semiconductor-switching element T1 repeats the ON/OFF operation and the continuous ON operation. By repeating the ON/OFF operation and the continuous ON operation, increment of the motor current ID can be restrained. The function of the current detection circuit 2 is the same as that of the circuit of the multi-resistor of FIG. 3.

Sixth Embodiment

Figure 13:
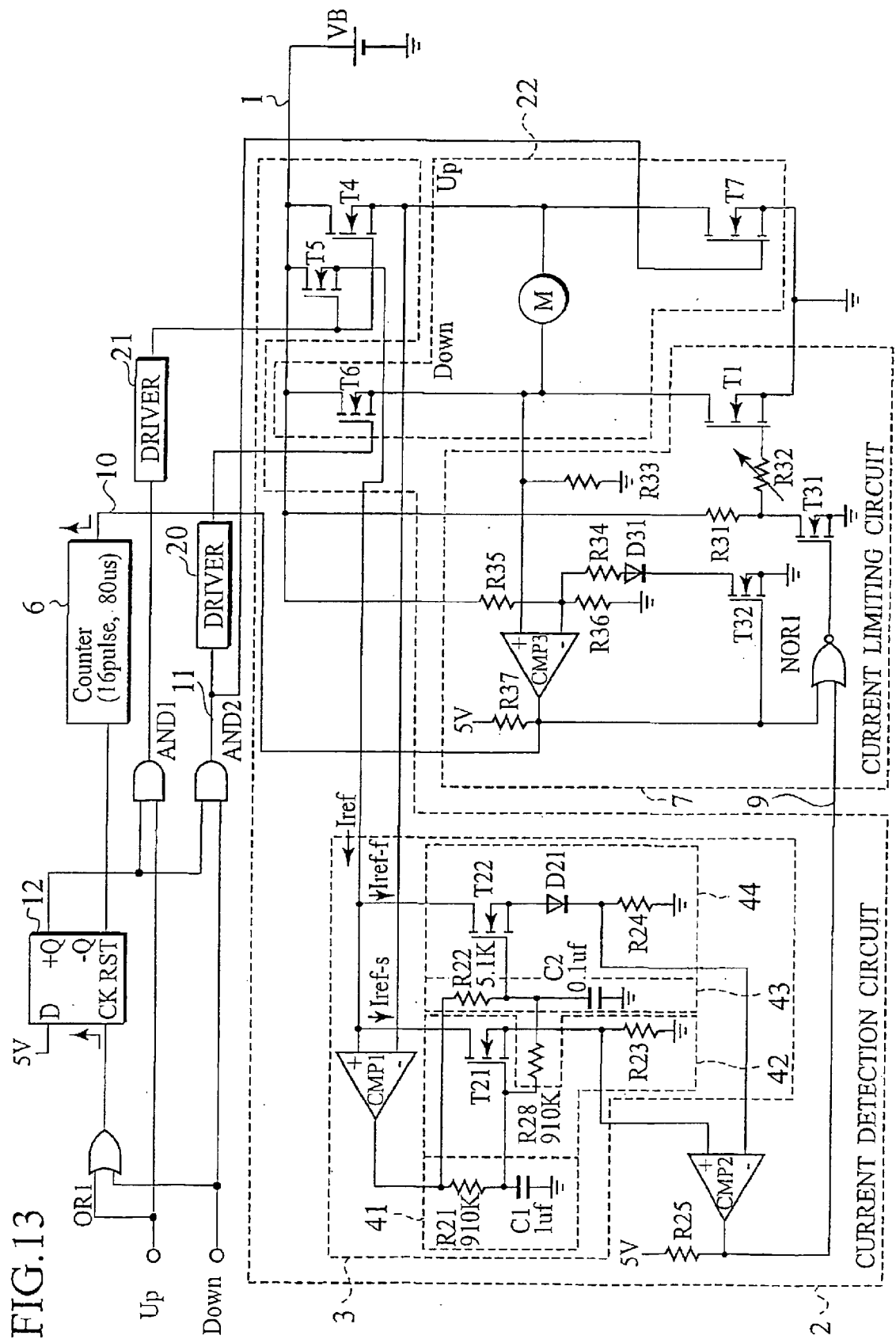
FIG. 13 is a circuit diagram of a jamming protection device according to a sixth embodiment.

In the jamming protection device according to the sixth embodiment as shown in FIG. 13, the motors 5 and 22 are different compared with the jamming protection device according to the fifth embodiment of FIG. 12. The operation, of WINDOW-UP is the same as that of FIG. 12. The operation of WINDOW-DOWN is operated employing the transistors T6 and T7.

The normal/reverse rotation circuit 22 rotates the motor in a direction in which the window is closed by inputting a signal of WINDOW-UP and rotates the motor in a direction in which the window is opened by inputting a signal of WINDOW-DOWN. Further,.in the case where the WINDOW-DOWN signal is inputted via the signal line 11, the normal/reverse rotation circuit 5 reverses the rotation of the motor M from, the direction in which the window is closed to the direction in which the window is opened. An H-bridge circuit is composed of the normal/reverse rotation circuit 22. The H-bridge circuit has four FETs (T1, T4, T6, and T7). The current detection circuit 2 and the current limiting circuit 7 may be constituted employing the transistor T4 at a high side among the four FETs (T1, T4, T6, and T7). It is also possible that the current detection circuit 2 is constituted employing the transistor T4 at the high side and the current limiting circuit 7 is constituted employing the transistor T1 at the low side.

The function is the same as that of the circuit of FIG. 12.

First Verified Example

In first verified example, the following operation of the current following circuit 16 of the current detection circuit 2 of the power window jamming protection device shown in FIG. 3 and FIG. 9 according to the fourth embodiment is explained since it was measured. The power supply voltage VB is 12.5 V here.

FIG. 14(a) shows signal waveforms of the case where a power window ascent is begun in the power window jamming protection device according to the fourth embodiment. The horizontal axis shows time, and one division of the scale thereon corresponds to 50 m second. The vertical axis shows the motor current ID, the voltage of the output terminal of the CMP1, and the voltages of the capacitors C1 and C2. The unit of the vertical axis is shown in the right side of the motor current ID (2 A/div, 6 A) and the like in the graph. (2 A/div, 6 A) means that one division corresponds to 2 A, and that the current of the fourth division in a total of eight divisions is 6 A. Similarly, the voltage of the output terminal of the CMP1 is expressed by (2 V/div, 6 V), one division corresponds to 2 V, and the voltage of the fourth division in a total of eight divisions is 6 V. Also in the following graphs, the vertical axes are expressed by a similar notational system.

FIG. 14(b) is a graph in which the second division and its vicinity on the time axis of FIG. 14(a) are expanded 5 times. FIGS. 15(a), (b) are also graphs in which the second division and its vicinity on the time axis of FIG. 14(a) are expanded 10 times and 50 times. FIGS. 16(a), (b) are graphs in which the third division and its vicinity on the time axis of FIG. 14(a) are expanded 10 times and 50 times. FIGS. 17(a), (b) are graphs in which the vicinity of a portion around the eleventh division exceeding the tenth division on the time axis of FIG. 14(a) is expanded 10 times and 50 times.

As understood from these graphs, at the time of starting, there is the rush current masking period of 40 m second, and thereafter the C1 and C2 instantly follow the ID. When the ID is decreasing, the C1 is greater than the C2. The electrical potential difference, C1 minus C2, is generated between both ends of the resistor R28. The resistor R28 prevents the separation of the potentials of the C1 and C2.

Particularly, as seen in FIGS. 16(a), (b), it is understood that the fluctuation of the ID corresponds to the fluctuation of the C2 well. On the other hand, it is understood that the C1 smoothly changes while following an ID's tendency of leaning to the right, which can be observed in the graph as a whole.

Second Verified Example

In second verified example, the following operation of the current following circuit 16 of the current detection circuit 2 of the jamming protection device shown in FIG. 3 and FIG. 9 according to the fourth embodiment is explained since it was measured. There is a modification in which the diode D21 is omitted. The power supply voltage VB is 12.5 V.

FIGS. 18(a), (b) show signal waveforms when the power window ascent is begun. The horizontal axis shows time, and one division of the scale thereon corresponds to 200 m second. The vertical axis shows the motor current ID, the voltage of the output terminal (OUT) of the CMP1, and the voltages of the capacitors C1 and C2.

As understood from these graphs, the C1 cannot immediately follow with the ID waveform. However, C1 waveform plus C2 waveform forms the Iref waveform, the Iref waveform follows the ID waveform immediately after the rush current masking period (40 m second) ends. The amplitude of the output of the CMP1 does not reach high level or low level. However, it means that the C2 cannot follow all the changes in the ID only for the magnitude of swing of the output of the CMP1. The magnitude of the amplitude of the output of the CMP1 corresponds to the magnitude of a gap between the ID and the Iref represented by the C2.

Third Verified Example

In third verified example, the following operation of the current following circuit 16 of the current detection circuit 2 of the jamming protection device shown in FIG. 3 and FIG. 9 according to the fourth embodiment is explained since it was measured. That is, measurement conditions are the same as those of first verified example.

FIG. 19(a) shows signal waveforms of the case where the jamming occurs. FIG. 19(b) shows waveforms in which the CMP1 output (CMP1OUT) is deleted from the waveforms of FIG. 19(a). The horizontal axis shows time, and one division of the scale thereon corresponds to 200 m second. The vertical axis shows the motor current ID, the voltage of the output terminal (OUT) of the CMP1, and the voltages of the capacitors C1 and C2.

As understood from these graphs, the C1 and the C2 instantly begin the following operation immediately after the rush current masking period (40 m second) ends. The waveform of the C2 seems to correspond to the waveform of the C1.

Jamming is determined, and the ID and the like are shut off on the ninth division on the time abscissa. During the time from the occurrence of the jamming to the shutting off of the ID and the like, the electrical potential of the C1 hardly changes. It is deemed that a satisfactory evaluating potential is formed.

Fourth Verified Example 4

In fourth verified example, the ON/OFF operation and the continuous ON of the semiconductor switching element T1 of the current limiting circuit 7 of the jamming protection device shown in FIG. 3 and FIG. 9 according to the fourth embodiment is explained as it was measured. The power supply voltage VB is 12.5 V.

Figure 21:
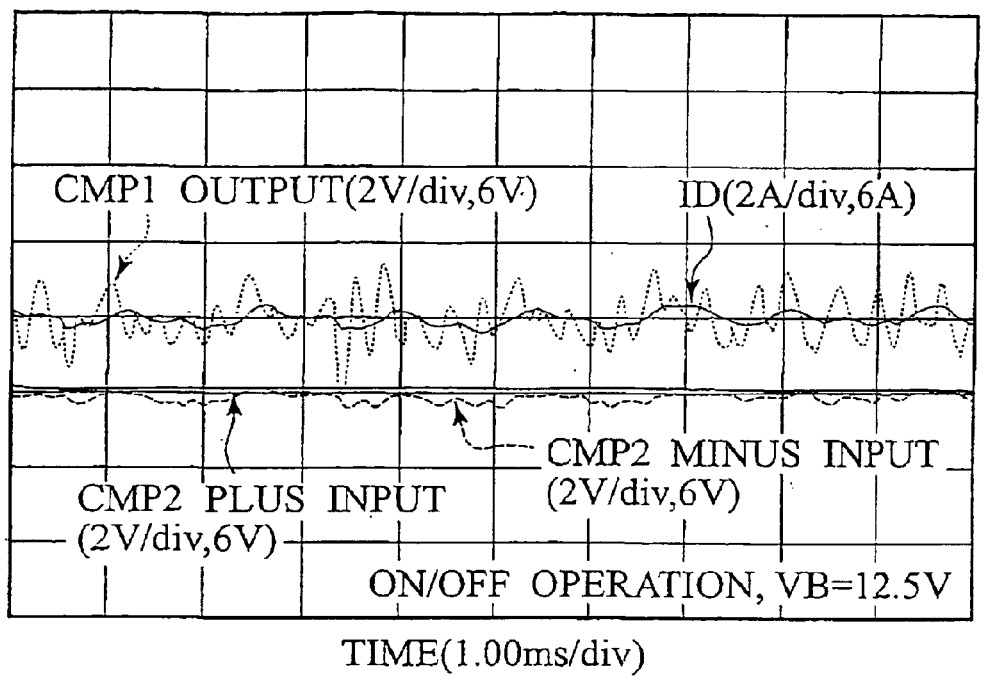
Figure 22:
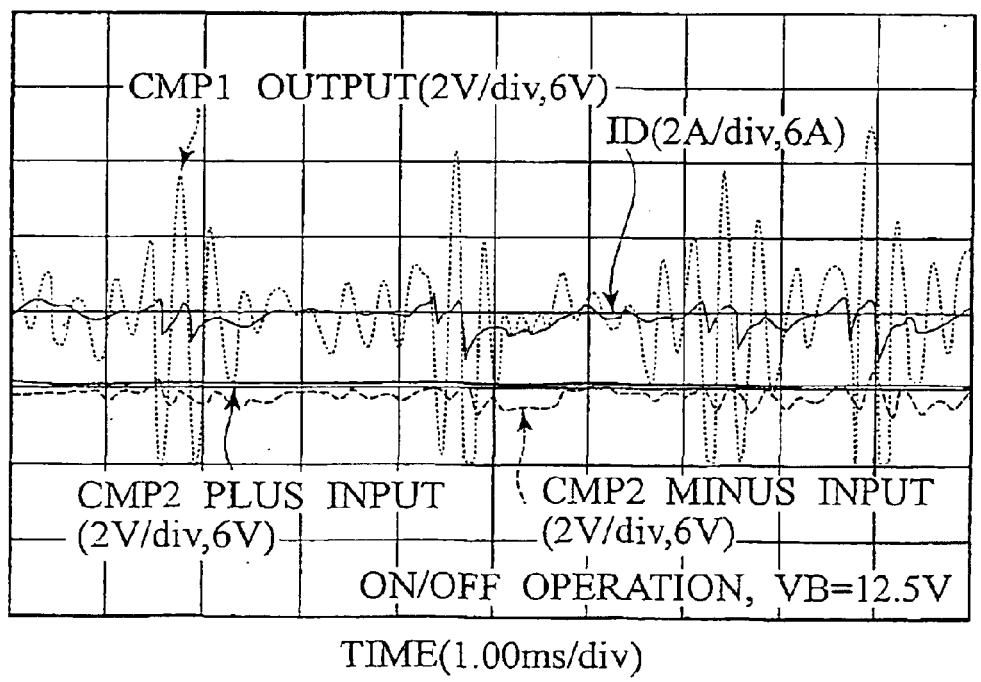
Figure 23:
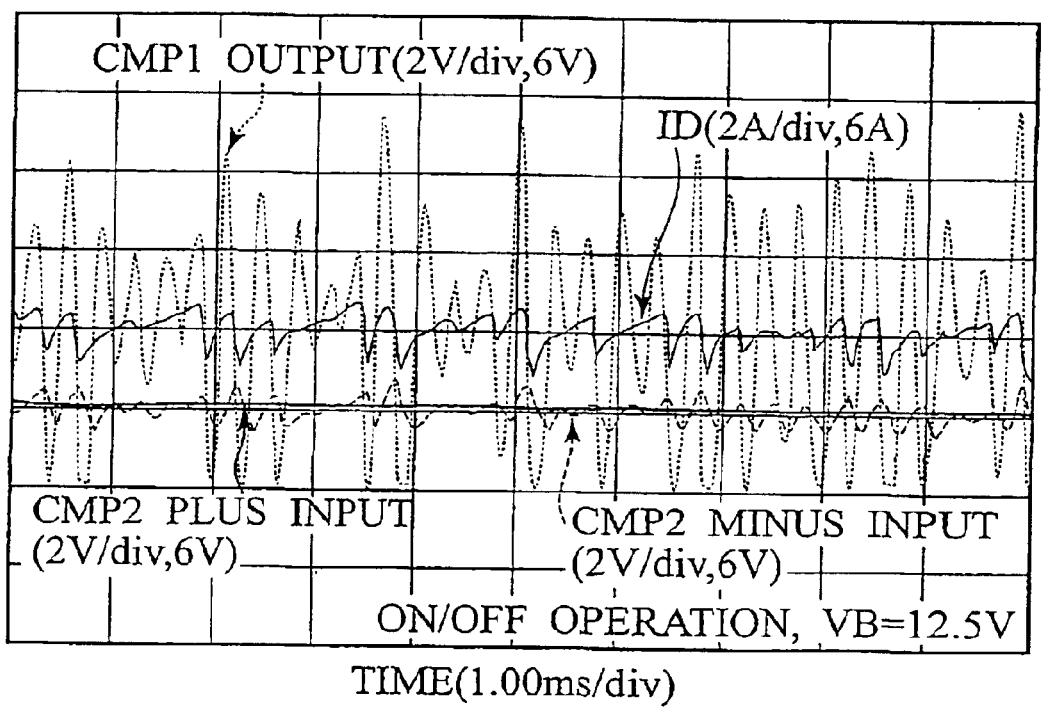
Figure 25:
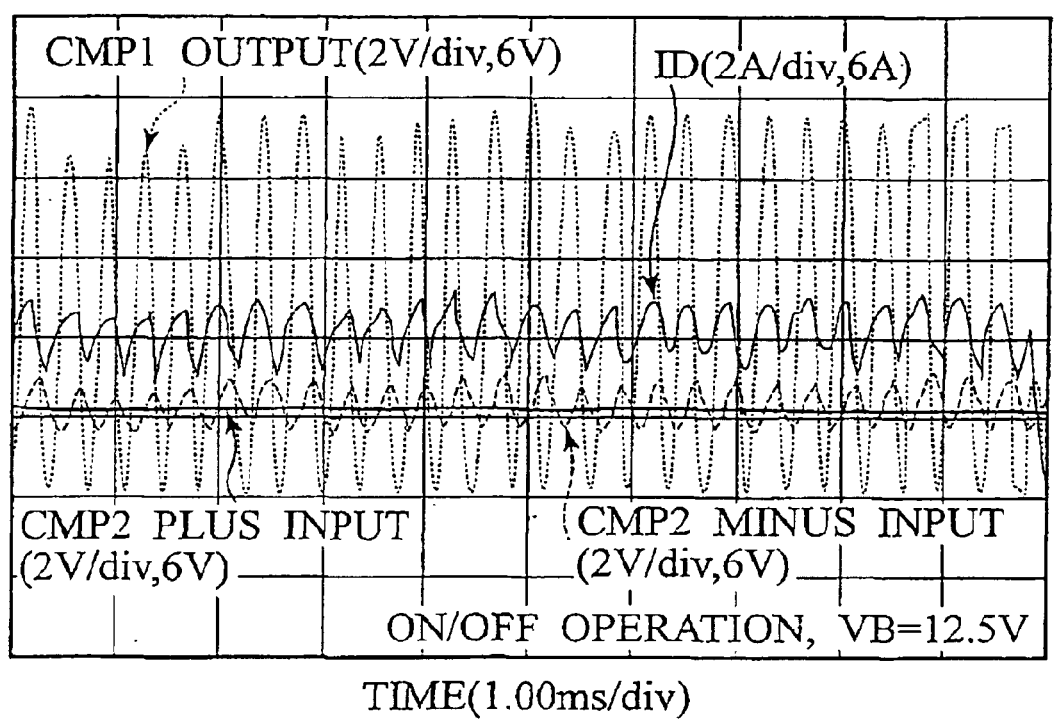
Figure 28:
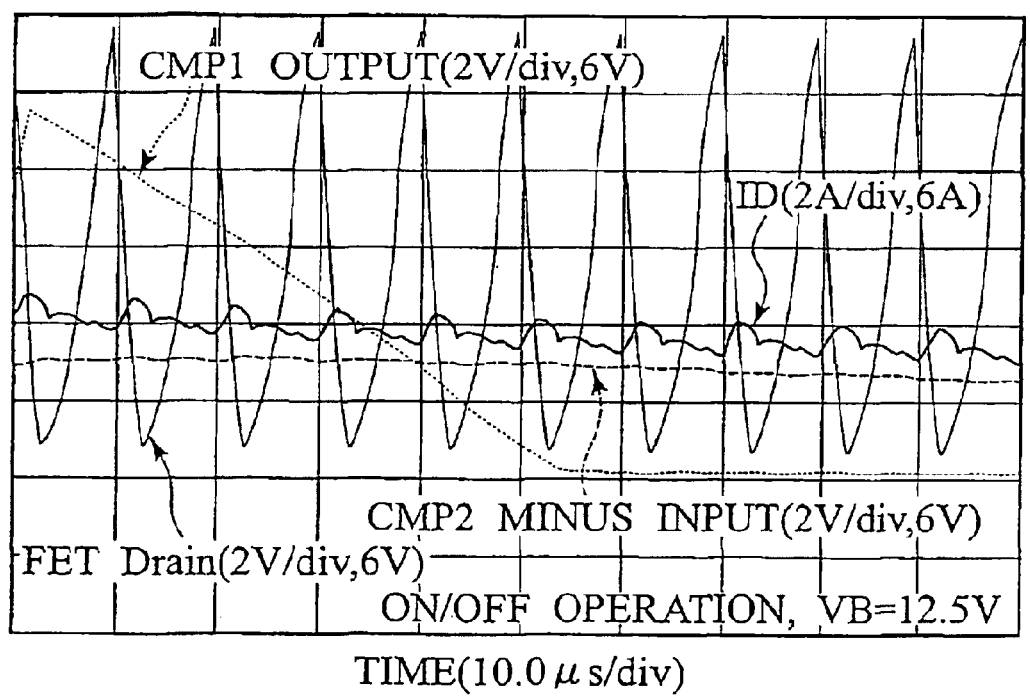

FIGS. 20(a), (b) are graphs in which the vicinity indicated by FIG. 20 on the time axis of FIG. 19(a) is expanded 200 times. FIG. 21 is a graph in which the vicinity indicated by FIG. 21 on the time axis of FIG. 19(a) is expanded 200 times. FIG. 22 is a graph in which the vicinity indicated by FIG. 22 on the time axis of FIG. 19(a) is expanded 200 times. FIG. 23 is a graph in which the vicinity indicated by FIG. 23 on the time axis of FIG. 19(a) is expanded 200 times. FIGS. 24(a), (b) are graphs in which the vicinity indicated by FIG. 24 on the time axis of FIG. 19(a) is expanded 200 times. FIG. 25 to FIGS. 29(a), (b) are graphs in which the vicinities indicated by FIGS. 20 to 29 on the time axis of FIG. 19(a) are expanded. That is, FIG. 20 shows waveforms which are created 200 m second earlier than a time the T1 is turned off due to the jamming determination. FIG. 21 shows waveforms, which are created 100 m second earlier than that time. FIG. 22 shows waveforms, which are created 80 m second earlier than that time. FIG. 23 shows waveforms, which are created 40 m second earlier than that time. FIG. 24 shows waveforms, which are created 20 m second earlier than that time. FIGS. 25, 26 show waveforms, which are created when the T1 is turned off. FIG. 27 shows waveforms, which are created $500\mu$ second earlier than that time. FIG. 28 shows waveforms, which are created $400\mu$ second earlier than that time. FIG. 29 shows waveforms, which are created $250\mu$ second earlier than that time.

In FIG. 20, the jamming has not occurred yet. It is understood that the waveform of the CMP2 minus input well corresponds to the waveform of the ID of FIG. 20(b). The CMP2 plus input is flat and smooth, being of a constant value. Thus, it is understood that a following operation is performed. The CMP2 minus input is set at lower than the CMP2 plus input.

In FIG. 21, the jamming has occurred. The electrical potential of the CMP2 minus input increases and approaches the electrical potential of the CMP2 plus input, which does not fluctuate.

In FIG. 22, also, jamming has occurred. A case has occurred where with respect to the electrical potential of the CMP2 plus input which does not fluctuate, the electrical potential of the CMP2 minus input increases and becomes greater than the electrical potential of the CMP2 plus input. This reversal in magnitude occurs two times continuously at a narrow interval. By this reversal in magnitude, the ON/OFF operation of the T1 takes place and the CMP1 output largely swings.

Figure 4:
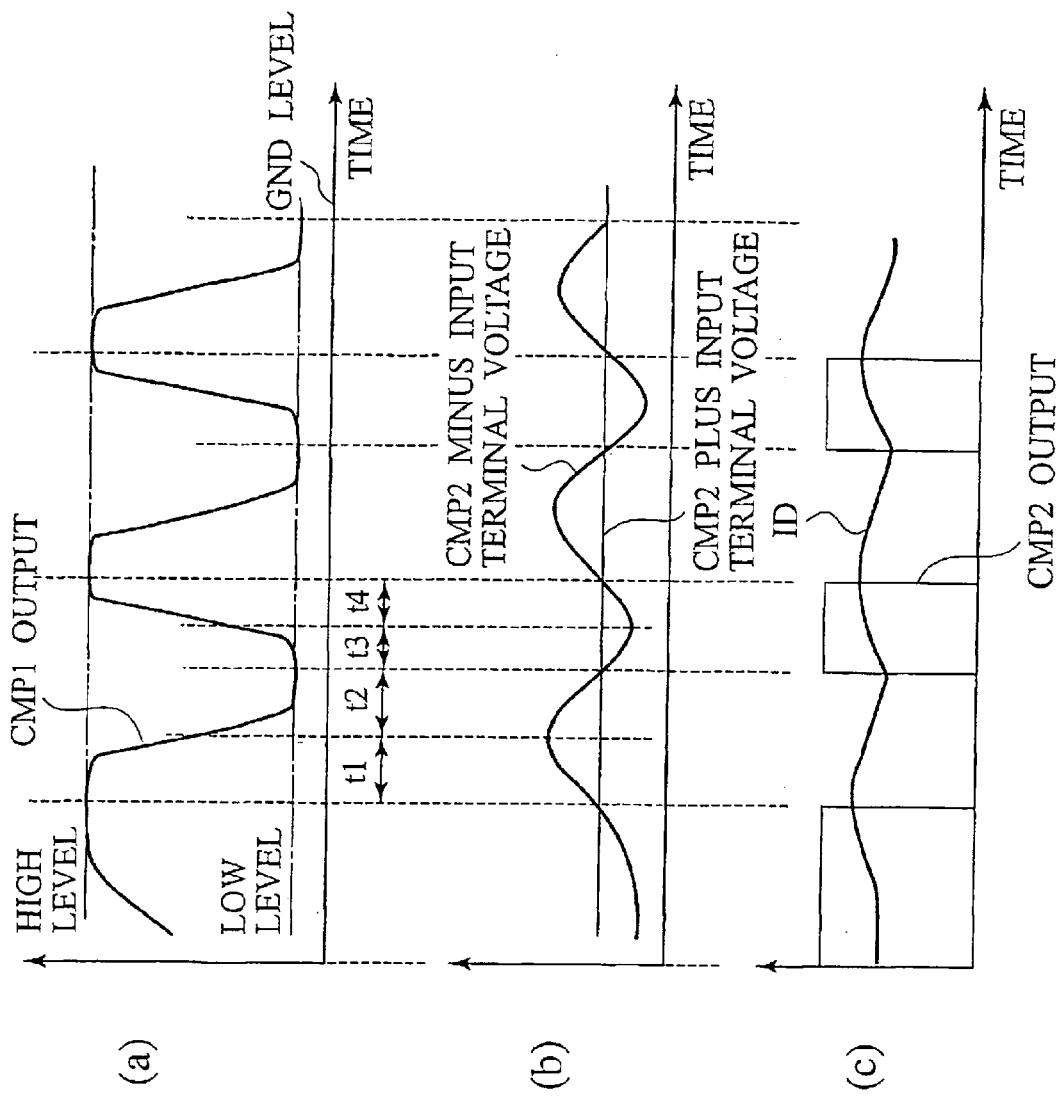
FIGS. 4(a) to 4(c) are graphs for explaining an ON/OFF operation of a current detection circuit 2 of the jamming protection device according to the first embodiment.

In FIG. 23, also, the jamming has occurred. A case has occurred at frequent, constant intervals where with respect to the electrical potential of the CMP2 plus input which does not fluctuate, the electrical potential of the CMP2 minus input further increases and becomes greater than the electrical potential of the CMP2 plus input. By this reversal in magnitude, the ON/OFF operation of the T1 takes place and the CMP1 output swings at largely the same intervals. Regarding a following performance of the CMP2 minus input with respect to the waveform of the ID, the gap in phase as explained in FIG. 4 is observed.

In FIG. 24, also, the jamming has occurred. FIG. 24(b) shows a graph in which the time axis of FIG. 24(a) is expanded 10 times. With respect to the electrical potential of the CMP2 plus input which does not fluctuate, the electrical potential of the CMP2 minus input further increases, so that the tendency explained in FIG. 4 can be observed. A fine saw tooth shaped waveform region of the waveform of the ID is the ON/OFF operation time, and a region of ascent waveform which is sandwiched by the region is the continuous ON time. The number of saw-teeth is counted every in saw-tooth shaped waveform region by the jamming determination circuit 6. The number of counts is 13, 10, and 7, and if any of these falls below 16, which is the criterion, the determination of the jamming is not made.

In FIG. 25 and FIG. 26, also, the jamming has occurred, and at last the determination of the jamming is made. FIGS.

26(*a*) (*b*) show graphs in which the time axis of FIG. 25 is expanded 10 times. With respect to the electrical potential of the CMP2 plus input which does not fluctuate, the electrical potential of the CMP2 minus input further increases, so that the tendency explained in FIG. 4 can be observed. The ID is increasing even though the CMP2 plus input has not changed compared with the beginning of the ON/OFF operation. The number of saw-teeth is counted in every saw-tooth shaped waveform region by the jamming determination circuit 6. The number of counts is 16 and 16, and all of these reach 16, which is the criterion, the determination of the jamming is made by the first 16 counts.

By using FIG. 27, the tendency explained in FIG. 4 is explained in detail. The CMP1OUT swings from high level to low level and is saturated. Thus, the C2 is not following the changes of the ID by the off delay of the T1. Even when the CMP2 minus input exceeds the CMP2 plus input, the T1 is not turned off instantly for the off delay of the T1. The off delay depends on the gate-source voltage of the T1 being lifted to the power supply voltage VB and to be saturated during the continuous ON. The off delay is the time during which the gate-source voltage decreases from the power supply voltage VB to the threshold voltage of the T1. On the other hand, there is no delay to turn on the T1 because the gate-source voltage at the ON/OFF operation hardly differs from the gate-source voltage at the continuous ON.

The period in which the CMP2 minus input is greater than the CMP2 plus input (t1+t2 in FIG. 4) is determined by the off delay of the T1, the responsibility of the CMP1, and the decrement rate of the ID. The period in which the CMP2 plus input is greater than the CMP2 minus input (t3+t4) is determined by the responsibility of the CMP1 and the increment rate of the ID.

With reference to FIG. 28 and FIG. 29, the tendency shown in FIG. 5 is explained. The lower reference voltage VL (=3.03 V) and the upper reference voltage VH (=8.82 V) of FIG. 5 are observed as the reference voltage of FIG. 29. The reference voltage is the minus input terminal voltage of the CMP3. The intersection point of the waveform of the reference voltage and the waveform of the drain voltage (FET drain) of the T1 determines the timing of the reversals of the output of the CMP3 as shown in FIG. 29(*b*). The waveform of the FET drain is overshooting.

Fifth Verified Example

In fifth verified example, the following operation of the current following circuit 18 of the current detection circuit 2 of the jamming protection device shown in FIG. 11 of the modified example 2 of the fourth embodiment is explained since it was measured. The power supply voltage VB is 12.5 V here.

FIG. 30(*a*) shows waveforms in the case where the following operation is performed in the jamming protection device of the second verified example of the fourth embodiment. FIG. 30(*b*) shows waveforms in the case where the following operation is performed in the jamming protection device according to the fourth embodiment for the purpose of comparison. The horizontal axis shows time, and one division of the scale thereon corresponds to 1 m second. This comparison was performed by obtaining data on the same power window, at the same window glass position, and at the same timing without the jamming. When the comparison is made regarding the CMP2 minus input, it is understood that fluctuations in FIG. 30(*a*) are smaller than those in FIG. 30(*b*) and that it is separated from the CMP2 plus input. Since it is separated from the CMP2 plus input, it is deemed that it is tougher against a malfunction due to a momentary fluctuation in the driving force. The waveform of the CMP2 minus input in FIG. 30(*a*) coincides better to the waveform of the ID.

Sixth Verified Example

In sixth verified example, also, the ON/OFF operation and the continuous ON of the semiconductor switching element T1 of the current limiting circuit 7 of the jamming protection device shown in FIG. 8 and FIG. 11 of the modified example 2 of the fourth embodiment is explained as it was measured. The power supply voltage VB is 12.5 V.

Figure 31:
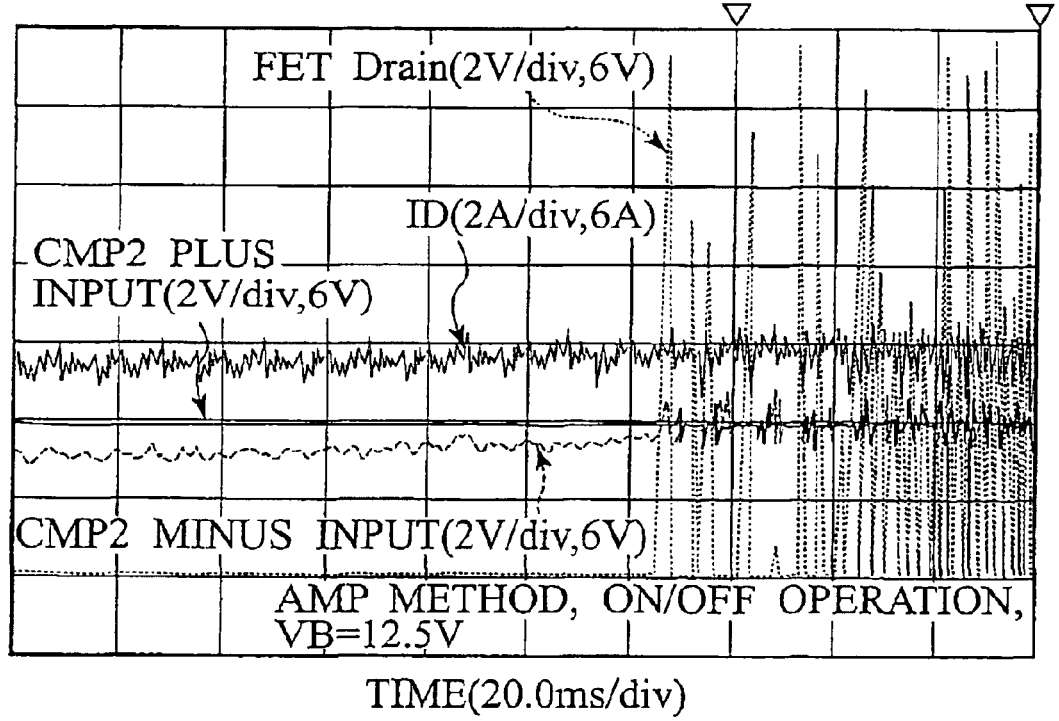

At the timing as the right end of FIG. 31, the jamming is determined. FIGS. 32(*a*), (*b*) are graphs in which vicinity indicated by FIG. 32 on the time abscissa of FIG. 31 is expanded 20 times. FIGS. 33(*a*), (*b*) are graphs in which vicinity indicated by FIG. 33 on the time abscissa of FIG. 31 is expanded 200 times. FIGS. 34(*a*), (*b*) are graphs in which the vicinity indicated by FIG. 34 on the time abscissa of FIG. 31 is expanded 20 times. The ON/OFF operation time is determined by the off delay time of the T1 and the resistor R32. It can be observed that with respect to the electrical potential of the CMP2 plus input which does not fluctuate, the electrical potential of the CMP2 minus input gradually increases and that FET drain voltage begins to vibrate. Differently from the tendency explained in FIG. 4, the timing of the increment and decrement of the ID coincides to the timing of the increment and the decrement of the CMP2 minus input. Compared with the beginning of the ON/OFF operation, the ID is increasing even though the CMP2 plus input is not changing. The number of saw teeth is counted in every saw-tooth shaped waveform region by the jamming determination circuit 6. The number of counts is 18 and 18 in FIG. 33, and these have reached 16, which is the criterion. The determination of the jamming has already been made by the first 16 counts.

Seventh Verified Example

Figure 35:
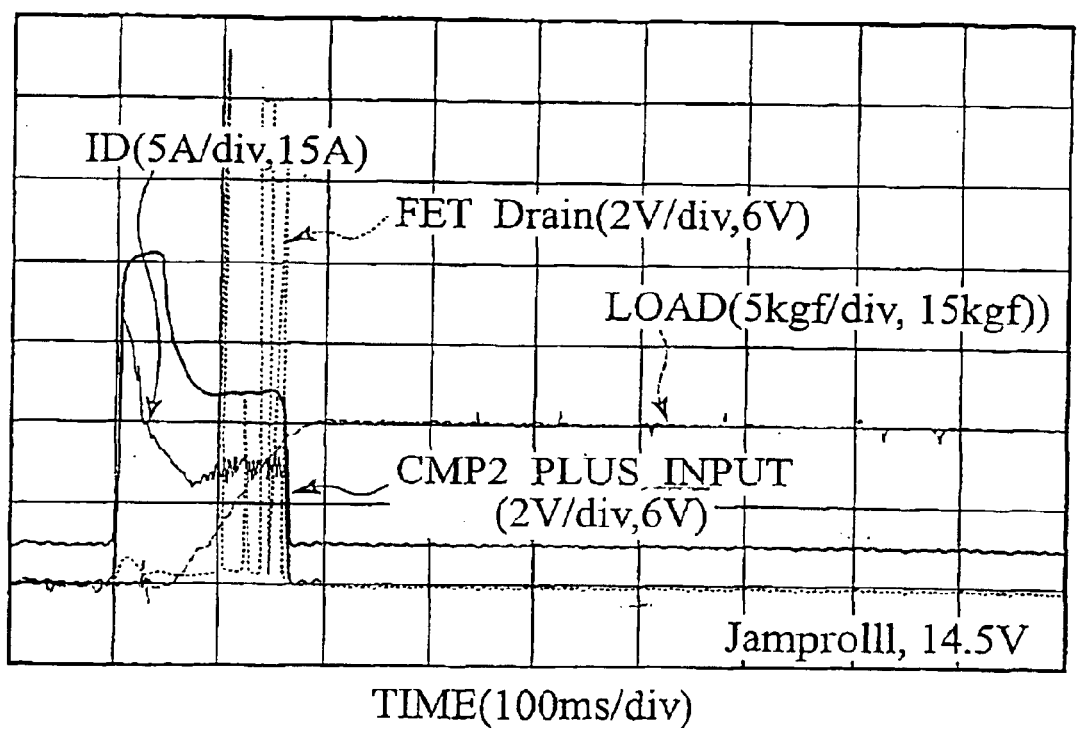
FIG. 35 shows signal waveforms of the case where jamming has occurred immediately after the beginning of power window ascent of a jamming protection device according to operation verifying example 7.

In seventh verified example, the jamming protection operation of the jamming protection device shown in FIG. 8 and FIG. 11 of the modified example 2 of the fourth embodiment is explained since it was measured. The power supply voltage VB is 14.5 V here. FIG. 35 shows signal waveforms of the case where the jamming occurs immediately after the power window ascent. The horizontal axis of FIG. 35 shows time, and one division of the scale thereon corresponds to 100 m second. The vertical axis shows the motor current ID, a load applied to a foreign object jammed, and the drain voltage of the FET T1, and the CMP2 plus input voltage. The load applied to the foreign object jammed is limited to approximately 98 N as the maximum.

The subject application claims benefit of the earlier filing dates of Japanese Patent Application No. 2001-103860 filed on Apr. 2, 2001 under the Paris Convention, the entire contents of which are incorporated by reference herein.

Various modifications will become possible for those skilled in the art after receiving the teachings of the present disclosure without departing from the scope thereof.

What is claimed is:

1. A jamming protection device for a moving member driven by a motor (5), wherein the motor (5) is able to rotate in reverse directions and is supplied with a motor current (ID) by a power supply unit (VB), the jamming protection device comprising:

a current detection circuit (2) being connectable to one of a plus terminal and a minus terminal of the power supply unit (VB), configured to conduct the motor current (ID) and to detect an increment of the motor current (ID) as a result of a jamming event; and a current limiting circuit (7) configured to conduct the motor current (ID) start a current limiting operation in which the motor current (ID) is decreased and increased within a predetermined region when the increment of the motor current (ID) exceeds a predetermined value.

2. The jamming protection device of claim 1, wherein said current limiting circuit (7) comprises a semiconductor-switching element (T1), wherein the motor current (ID) is decreased by an ON/OFF operation of the semiconductor switching element (T1) for a period that depends on a reduction of the motor speed due to the jamming, and the motor current (ID) is increased by a continuous ON operation of the semiconductor switching element (T1).

3. The jamming protection device of claim 2, wherein said current detection circuit (2) comprises a main element (R1, T4) having a main resistance configured to conduct the motor-current (ID), a reference element (R20, T5) having a reference resistance configured to conduct a reference current (Iref), the reference resistance being n times as much as the main resistance, and a current following circuit (3) coupled to both the main element (R1, T4) and the reference element (R20, Y5) to conduct the reference current (Iref) and to set the reference current (Iref) at one over n (1/n) of the motor current (ID) constantly.

4. The jamming protection device of claim 3, wherein the main element (R1, T4) includes a shunt resistor (R1), and the reference element (R20, T5) includes a reference resistor (R20).

5. The jamming protection device of claim 3, wherein the main element (R1, T4) includes a main field effect transistor (T4), and the reference element (R20, T5) includes a reference field effect transistor (T5).

6. The jamming protection device of claim 3, wherein one end of the main element (R1, T4) is connectable in series to the motor (5) and the current limiting circuit (7), the other end of the main element (R1, T4) is connectable to one of the plus terminal and the minus terminal of the power supply unit (VB) and further connectable to one end of the reference element (R20, T5), the other end of the reference element (R20, T5) connects to the current following circuit (3), and the current following circuit (3) is connectable to the other of the plus terminal and the minus terminal of the power supply unit (VB).

7. The jamming protection device of claim 5, wherein a drain of the main field effect transistor (T4) is connectable to the plus terminal of the power supply unit (VB), a drain of the reference field effect transistor (T5) connects to the drain of the main field effect transistor (T4), a source of the reference field effect transistor (T5) connects to the current following circuit (3), the current following circuit (3) is connectable to the minus terminal of the power supply unit (VB), and wherein gates of the main field effect transistor (T4) and the reference field effect transistor (T5) connect to each other and are connectable to a driver (19, 21), wherein the driver (19, 21) drives the main field effect transistor (T4) and the reference field effect transistor (T5).

8. The jamming protection device of claim 3, wherein the current following circuit (3) includes a slow following circuit (41 and 42) configured to conduct a slow following current (Iref-s), wherein a time constant of the slow following circuit (41 and 42) is several times longer than a period from an occurrence of the jamming event to a start of reverse rotation of the motor (5), and a fast following circuit (43 and 44) configured to conduct a fast following current (Iref-f), wherein a time constant of the fast following circuit (43 and 44) is much smaller than that of the slow following circuit (41 and 42), and wherein the fast following current (Iref-f) is equal to a difference between the reference current (Iref) and the slow following current (Iref-s), wherein the slow following circuit (41 and 42) and the fast following circuit (43 and 44) are connected with each other in parallel.

9. The jamming protection device of claim 8, wherein the current following circuit (3) comprises a first comparator (CMP1) configured to detect a difference between voltage drops across the main element (R1, T4) and the reference element (R20, T5), the slow following circuit (41 and 42) comprises a slow charge discharge circuit (41) coupled to an output of the first comparator (CMP1) and the ground, the slow charge discharge circuit (41) including a first resistor (R21) coupled to the output of the first comparator (CMP1) and a first capacitor (C1) coupled in series to the first resistor (R21) and to the ground, and wherein the slow following circuit (41 and 42) converts the slow following current (Iref-s) to a potential of the first capacitor (C1), and the fast following circuit (43 and 44) comprises a fast charge discharge circuit (43) coupled to the output of the first comparator (CMP1) and the ground, and further coupled in parallel to the slow charge discharge circuit (41), the fast charge discharge circuit (43) including a second resistor (R22) coupled to the output of the first comparator (CMP1) and a second capacitor (C2) coupled in series to the second resistor (R22) and to the ground, wherein the fast charge discharge circuit (43) is coupled to the first capacitor (C1) through a high resistor (R28) and has a fast time constant smaller than a slow time constant of the slow charge discharge circuit (41), and wherein the fast following circuit (43 and 44) converts the fast following current (Iref-f) to a potential of the second capacitor (C2).

10. The jamming protection device of claim 9, wherein the slow following circuit (41 and 42) comprises a slow source follower circuit (42) including a first field effect transistor (T21) and a third resistor (R23) coupled to a source of the first field effect transistor (T21), a gate of the first field effect transistor (T21) being coupled to the first capacitor (C1) and the first field effect transistor (T21) being configured to conduct the slow following current (Iref-s), and wherein the fast following circuit (43 and 44) comprises a fast source follower circuit (44) including a second field effect transistor (T22) and a fourth resistor (R24) configured to conduct the fast following current (Iref-f), a gate of the second field effect transistor (T22) being coupled to the second capacitor (C2).

11. The jamming protection device of claim 8, wherein the current following circuit (13) comprises a first comparator (CMP1) configured to detect a difference between a voltage drop across the main element (R1, T4) and a voltage drop across the reference element (R20, T5), wherein the slow following circuit (42 and 45) comprises
a slow charge discharge circuit (45) coupled to an output of the first comparator (CMP1) and the ground, the slow charge discharge circuit (41) including a first resistor (R21) coupled to the output of the first comparator (CMP1) and a first capacitor (C1) coupled in series to the first resistor (R21) and to the ground,
a slow source follower circuit (42) including a first field effect transistor (T21), a gate of the first field effect transistor (T21) being coupled to the first capacitor (C1), and
a third resistor (R23) coupled to a source of the first field effect transistor (T21),
wherein the first field effect transistor (T21) is configured to conduct the slow following current (Iref-s) and the slow following circuit converts the slow following current (Iref-s) to a potential of the first capacitor (C1), and
wherein the fast following circuit (44) comprises
a fast source follower circuit (44) including a second field effect transistor (T22), wherein a gate of the second field effect transistor (T22) is coupled to the output of the first comparator (CMP1), and the fast following circuit (44) has a time constant almost equal to zero, and
a fourth resistor (R24),
wherein the fast source follower circuit (44) and the fourth resistor (R24) are configured to conduct the fast following current (Iref-f).

12. The jamming protection device of claim 1, wherein a mean value of the motor current (ID) in the period of the current limiting operation is restrained to be slightly greater than that of the motor current (ID) just before the jamming event by the predetermined value.

13. The jamming protection device of claim 10, wherein said current detection circuit (2) comprises a second comparator (CMP2) configured to compare a first source potential of the first field effect transistor (T21) with an evaluating potential, the evaluating potential being smaller than a second source potential of the second field effect transistor (T22) by a jamming detection voltage and
wherein the semiconductor switching element (T1) performs the ON/OFF operation to decrease the motor current (ID) when the evaluating potential is greater than the first source potential, and performs the continuous ON operation to increase the motor current when the evaluating potential is smaller than the first source potential.

14. The jamming protection device of claim 13, wherein a period of the ON/OFF operation is dependent on an off delay time of the semiconductor switching element (T1) and a decrement rate of the motor current (ID) during the ON/OFF operation, and a period of the continuous ON operation is dependent on an increment rate of the motor current (ID) during the continuous ON operation.

15. The jamming protection device of claim 13, wherein the fast source follower circuit (44) comprises a diode (D21) coupled in series to a source of the second field effect transistor (T22), and wherein the jamming detection voltage is equal to a forward voltage drop of the diode (D21).

16. The jamming protection device of claim 13, wherein said current limiting circuit (7) comprises
a reference voltage circuit (8) configured to generate an upper reference voltage (VH) and a lower reference voltage (VL), and
a third comparator (CMP3) configured to compare a voltage drop across the semiconductor switching element (T1) with one of the upper reference voltage (VH) and the lower reference voltage (VL),
and wherein the ON/OFF operation comprises turning off the semiconductor switching element (T1) to increase the voltage drop across the semiconductor switching element (T1) until the voltage drop across the semiconductor switching element (T1) is above the upper reference voltage (VH), turning on the semiconductor switching element (T1) to decrease the voltage drop across the semiconductor switching element (T1) until the voltage drop across the semiconductor switching element (T1) is below the lower reference voltage (VL), and repeating the steps of turning off and on the semiconductor switching element (T1).

17. The jamming protection device of claim 16, wherein the semiconductor switching element (T1) is a field effect transistor, and
wherein the lower reference voltage (VL) is greater than a ground level but lower than the upper reference voltage (VH) and the upper reference voltage (VH) is lower than the supply voltage (VB) so that a Miller effect constantly occurs in a gate capacitance of the semiconductor switching element (T1), wherein an inductance of the motor (M) during the current limiting operation contributes to a Miller capacitance, and wherein the Miller capacitance facilitates minimizing a variation of the motor current and motor torque.

18. The jamming protection device of claim 13, wherein the current limiting circuit (7) is configured such that the motor (M) generates a motor output during the ON/OFF operation, thereby applying a driving force to the moving member to maintain the same speed of the moving member, which improves an ability of restoring from a short term overload caused by driving on a rough road without malfunctions.

19. The jamming protection device of claim 13, wherein a jamming determination circuit (6) determines whether a jamming event has occurred by detecting a ratio of a period of the ON/OFF operation to a period of the continuous ON operation, or measuring either the period of the ON/OFF operation or the period of the continuous ON operation.

20. The jamming protection device of claim 19, wherein the jamming determination circuit (6) measures the period of the ON/OFF operation by counting a number of an ON state or an OFF state during the ON/OFF operation.

21. The jamming protection device of claim 20, wherein the semiconductor switching element (T1) is a field effect transistor, the current limiting circuit (7) includes a variable resistor (R32) coupled in series to a gate of the semiconductor switching element (T1) for adjusting the period of the ON/OFF operation.

22. The jamming protection device of claim 13, wherein a jamming determination circuit (6) determines whether a jamming event has occurred by detecting a reduction of a rotational speed of the motor (M) and determining whether the reduction of the rotational speed of the motor (M) is greater than a possible reduction of the rotational speed of the motor (M) at a momentary change without jamming.

23. The jamming protection device of claim 9, wherein said current detection circuit (2) comprises a start circuit (4) configured to start a rush current masking period and to detect the jamming immediately after starting to drive the moving member, and wherein the first capacitor (C1) is charged during the rush current masking period and is discharged via the output of the first comparator (CMP1) for a period in which the output of the first comparator (CMP1) is low level after the rush current masking period.

24. The jamming protection device of claim 11, wherein said current detection circuit (2) comprises a start circuit (4) configured to start a rush current masking period and to detect the jamming immediately after starting to drive the moving member, wherein the ON/OFF operation of the motor (M) starts at an end of the rush current masking period if the motor (M) fails to rotate because of jamming.

25. A jamming protection device for a moving member driven by a motor (5), wherein the motor (5) is able to rotate in reverse directions and is supplied with a motor current (ID) by a power supply unit (VB), the jamming protection device comprising:

a current detection circuit (2) being connectable to one of a plus terminal and a minus terminal of the power supply unit (VB), configured to conduct the motor current (ID) and to detect an increment of the motor current (ID) as a result of a jamming event, comprising a main element (R1, T4) having a main resistance configured to conduct the motor current (ID), a reference element (R20, T5) having a reference resistance configured to conduct a reference current (Iref), the reference resistance being n times as much as the main resistance, and a current following circuit (14) coupled to both the main element (R1, T4) and the reference element (R20, T5) to conduct the reference current (Iref) and to set the reference current (Iref) at one over n (1/n) of the motor current (ID) constantly, including a comparator (CMP1) configured to detect a difference between voltage drops across the main element (R1, T4) and the reference element (R20, T5), a slow following circuit (42 and 45), including a slow charge discharge circuit (45) coupled to an output of the comparator (CMP1) and the ground, the slow charge discharge circuit (45) including a first resistor (R21) coupled to the output of the comparator (CMP1) and a capacitor (C1) coupled in series to the first resistor (R21) and to the ground, and a slow source follower circuit (42) including a first field effect transistor (T21) and a second resistor (R23) coupled to a source of the first field effect transistor (T21), a gate of the first field effect transistor (T21) being coupled to the capacitor (C1) and a drain of the first field effect transistor (T21) being coupled to one of the plus terminal and minus terminal of the power supply unit (VB), and a fast following circuit (44) coupled in parallel to the slow following circuit (42 and 45), the fast following circuit (44) including a second field effect transistor (T22) and a third resistor (R24) configured to conduct a fast following current (Iref-f), a gate of the second field effect transistor (T22) being coupled to the output of the comparator (CMP1);

and a current limiting circuit (7) configured to conduct the motor current (ID) and to start a current limiting operation in which the motor current (ID) is decreased and increased within a predetermined region when the increment of the motor current (ID) exceeds a predetermined value, including a semiconductor-switching element (T1), wherein the motor current (ID) is decreased by an ON/OFF operation of the semiconductor switching element (T1)-for a period that depends on a reduction of the motor speed due to the jamming, and the motor current (ID) is increased by a continuous ON operation of the semiconductor switching element (T1), wherein the motor current (ID) is converted to a motor voltage and a displacement of the motor voltage is amplified to generate a source potential at the second field effect transistor (T22), and wherein the current limiting circuit (7) limits the motor current (ID) by switching the semiconductor-switching element (T1) between the ON/OFF operation and the continuous ON operation when the current detection circuit (2) detects that the source potential at a moment is greater than a mean value of the source potential over a long period by another predetermined value.

26. The jamming protection device of claim 25, wherein a gate of the second field effect transistor (T22) directly connects to the output of the comparator (CMP1), and wherein a voltage drop across the third resistor (R24) due to the fast following current (Iref-f) reflects the source potential at a moment, and a voltage drop across the second resistor (R23) due to the slow following current (Iref-s) reflects the mean value of the source potential over a long period.

27. The jamming protection device of claim 25, wherein a decrement of the motor current (ID) in the ON/OFF operation of the semiconductor-switching element (T1) is as much as a part (Iref-2) of the reference current (Iref) flowing in the reference element (R20) in the continuous ON operation of the semiconductor-switching element (T1).

* * * * *

UNITED STATES PATENT AND TRADEMARK OFFICE
CERTIFICATE OF CORRECTION

PATENT NO. : 6,867,563 B2
DATED : March 15, 2005
INVENTOR(S) : Shunzou Ohshima

It is certified that error appears in the above-identified patent and that said Letters Patent is hereby corrected as shown below:

Column 29,
Line 5, "(ID) start" should read -- (ID) and to start --.
Line 21, "motor-current" should read -- motor current --.
Line 28, "(R20, Y5)" should read -- (R20, T5) --.

Column 31,
Line 41, "voltage and" should read -- voltage, and --.

Column 34,
Line 17, "(T1)-for" should read -- (T1) for --.

Signed and Sealed this

Twenty-eighth Day of June, 2005

JON W. DUDAS
*Director of the United States Patent and Trademark Office*